(12) United States Patent
Enomoto et al.

(10) Patent No.: US 10,371,419 B2
(45) Date of Patent: Aug. 6, 2019

(54) VEHICLE AIR CONDITIONER WITH PROGRAMMED FLOW CONTROLLER

(71) Applicant: DENSO CORPORATION, Kariya, Aichi-pref. (JP)

(72) Inventors: Norihiko Enomoto, Kariya (JP); Nobuharu Kakehashi, Kariya (JP); Michio Nishikawa, Kariya (JP); Yoshiki Katoh, Kariya (JP); Kengo Sugimura, Kariya (JP); Takashi Yamanaka, Kariya (JP); Masamichi Makihara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 901 days.

(21) Appl. No.: 14/895,005

(22) PCT Filed: Jun. 3, 2014

(86) PCT No.: PCT/JP2014/002915
§ 371 (c)(1),
(2) Date: Dec. 1, 2015

(87) PCT Pub. No.: WO2014/196186
PCT Pub. Date: Dec. 11, 2014

(65) Prior Publication Data
US 2016/0109163 A1    Apr. 21, 2016

(30) Foreign Application Priority Data

Jun. 6, 2013  (JP) .................................. 2013-119789
Dec. 26, 2013  (JP) .................................. 2013-268578

(51) Int. Cl.
*F25B 13/00*   (2006.01)
*B60H 1/00*   (2006.01)
(Continued)

(52) U.S. Cl.
CPC .......... *F25B 13/00* (2013.01); *B60H 1/00899* (2013.01); *F25B 25/005* (2013.01); *F25B 30/02* (2013.01); *F25B 2339/047* (2013.01)

(58) Field of Classification Search
CPC .... B60H 2001/003; B60H 2001/00307; B60H 2001/00928; B60H 1/00342
See application file for complete search history.

(56) References Cited

U.S. PATENT DOCUMENTS 7,096,680 B2 *   8/2006   Sugesawa ............ B60H 1/3205
                                                                    62/133
9,879,891 B2 *   1/2018   Kowsky ............. B60H 1/00342
(Continued)

FOREIGN PATENT DOCUMENTS

JP      H07012778 U    3/1995
JP      H09286225 A    11/1997
(Continued)

OTHER PUBLICATIONS

International Search Report and Written Opinion (in Japanese with English Translation) for PCT/JP2014/002915, dated Sep. 2, 2014; ISA/JP.

*Primary Examiner* — Jianying C Atkisson
*Assistant Examiner* — Meraj A Shaikh
(74) *Attorney, Agent, or Firm* — Harness, Dickey & Pierce, P.L.C.

(57) ABSTRACT

A vehicle air conditioning apparatus includes: at least one processor programmed to control a flow rate of at least one of a heat medium and outside air flowing through a heat medium-to-outside air heat exchanger such that a temperature of blast air cooled in an air-cooling heat exchanger is adjusted toward a first target temperature, and to control a flow rate of a refrigerant discharged from a compressor such that a temperature of blast air, which has been adjusted in at least one of the air-cooling heat exchanger and an air-heating (Continued)

heat exchanger and which is blown out into a vehicle interior, is adjusted toward a second target temperature. Accordingly, a surface temperature of the air-cooling heat exchanger and the temperature of the blast air into the vehicle interior can be properly controlled.

20 Claims, 30 Drawing Sheets

(51) Int. Cl.
*F25B 25/00* (2006.01)
*F25B 30/02* (2006.01)

(56) References Cited

U.S. PATENT DOCUMENTS

| | | | |
|---|---|---|---|
| 2002/0014330 A1* | 2/2002 | Guyonvarch | B60H 1/00007 165/202 |
| 2004/0035130 A1 | 2/2004 | Amaral et al. | |
| 2004/0050086 A1 | 3/2004 | Amaral et al. | |
| 2004/0050089 A1 | 3/2004 | Amaral | |
| 2004/0089003 A1 | 5/2004 | Amaral et al. | |
| 2004/0089014 A1 | 5/2004 | Amaral et al. | |
| 2011/0072841 A1 | 3/2011 | Arai et al. | |
| 2011/0113800 A1* | 5/2011 | Sekiya | B60H 1/00278 62/151 |
| 2012/0160470 A1* | 6/2012 | Misumi | B60H 1/3207 165/287 |
| 2012/0222438 A1 | 9/2012 | Osaka et al. | |
| 2012/0222441 A1 | 9/2012 | Sawada et al. | |
| 2012/0238197 A1* | 9/2012 | Katagiri | B60H 1/00842 454/152 |
| 2012/0255319 A1 | 10/2012 | Itoh et al. | |
| 2015/0128632 A1 | 5/2015 | Kishita et al. | |
| 2015/0159933 A1 | 6/2015 | Itoh et al. | |

FOREIGN PATENT DOCUMENTS

| | | |
|---|---|---|
| JP | H09318195 A | 12/1997 |
| JP | H11301254 A | 11/1999 |
| JP | 2000-108640 A | 4/2000 |
| JP | 2004-050874 A | 2/2004 |
| JP | 2004515394 A | 5/2004 |
| JP | 2010-012949 A | 1/2010 |
| JP | 2011073536 A | 4/2011 |
| JP | 2011-105150 A | 6/2011 |
| JP | 2011111140 A | 6/2011 |
| JP | 2011112312 A | 6/2011 |
| JP | 2012225637 A | 11/2012 |
| JP | 2013001160 A | 1/2013 |
| JP | 2013002710 A | 1/2013 |

* cited by examiner

ASSIST HEAT PUMP MODE, ENGINE-HEATING HEAT PUMP MODE, DEVICE HEATING MODE, AND THERMAL MASS-USING HEATING MODE

FIG. 29 OUTSIDE AIR HEAT-ABSORBING HEAT PUMP MODE

FIG. 31  ENGINE-HEATING HEAT PUMP MODE

ENGINE HEAT-ABSORBING HEAT PUMP MODE

ENGINE-HEATING HEAT PUMP MODE

ENGINE WASTE HEAT-DIRECT USE MODE

VEHICLE AIR CONDITIONER WITH PROGRAMMED FLOW CONTROLLER

CROSS-REFERENCE TO RELATED APPLICATIONS

This application is a U.S. National Phase Application under 35 U.S.C. 371 of International Application No. PCT/JP2014/002915 filed on Jun. 3, 2014 and published in Japanese as WO 2014/196186 A1 on Dec. 11, 2014. This application is based on and claims the benefit of priority from Japanese Patent Applications Nos. 2013-119789 filed on Jun. 6, 2013, and 2013-268578 filed on Dec. 26, 2013. The entire disclosures of all of the above applications are incorporated herein by reference.

TECHNICAL FIELD

This disclosure relates to a vehicle air conditioning apparatus.

BACKGROUND ART

In the related art, PTL 1 discloses a vehicle air conditioning apparatus in which blast air blown into a vehicle interior is cooled in an evaporator, and is heated in a condenser.

The evaporator is a heat exchanger that evaporates a low-pressure side refrigerant of a refrigeration cycle, and cools the blast air by exchanging heat between the low-pressure side refrigerant and the blast air. The condenser is a heat exchanger that condenses a high-pressure side refrigerant of the refrigeration cycle, and heats the blast air by exchanging heat between the high-pressure side refrigerant and the blast air.

In the related art, the refrigeration cycle is controlled to control the temperature of blown out air into the vehicle interior.

PRIOR ART LITERATURE

Patent Literature

PTL 1: JP 2012-225637 A

SUMMARY OF THE INVENTION

In the related art, the blast air into the vehicle interior exchanges heat with a refrigerant of the refrigeration cycle in the evaporator and the condenser, and thus, when the refrigerant leaks from the evaporator and the condenser, the refrigerant also leaks into the vehicle interior.

In the related art, an exterior heat exchanger responsible for the condensation or evaporation of the refrigerant is disposed in the foremost portion of a vehicle. For this reason, also in a slight collision that does not cause damage to major machines (a frame, a drive mechanism, a motor, and the like) of the vehicle body, the exterior heat exchanger may be broken. As a result, costs for repair involving refilling of the refrigerant are increased, and the emission of the refrigerant with a high warming potential to the atmosphere causes environmental destruction, which is a problem.

This disclosure is made in light of this problem, and an object of this disclosure is to provide a vehicle air conditioning apparatus configured to make blast air into a vehicle interior exchange heat, which is capable of properly controlling the temperature of a heat exchanger for exchanging heat of the blast air into the vehicle interior without emitting the refrigerant even in a slight collision.

To achieve the above-described object, a first aspect of the present disclosure including:

a first pump and a second pump that take in and discharge a heat medium;

an adjusting heat exchanger that adjusts a temperature of the heat medium by causing the heat medium to undergo heat exchange;

a heat medium-to-air heat exchanger that adjusts a temperature of blast air into a vehicle interior by exchanging heat between the heat medium, the temperature of which has been adjusted in the adjusting heat exchanger, and the blast air;

a heat medium-to-outside air heat exchanger that exchanges sensible heat between the heat medium, the temperature of which has been adjusted in the adjusting heat exchanger, and outside air; and a heat exchanger adjustment unit that adjusts a flow rate of at least one of the heat medium and the outside air flowing through the heat medium-to-outside air heat exchanger in such a way that a temperature related to a temperature of the blast air, which has been adjusted in the heat medium-to-air heat exchanger, approaches a first target temperature.

Accordingly, the temperature of the heat medium-to-air heat exchanger can be properly controlled.

To achieve the above-described object, a second aspect of the present disclosure including:

a first pump and a second pump that take in and discharge a heat medium;

an adjusting heat exchanger that adjusts a temperature of the heat medium by causing the heat medium to undergo heat exchange;

a heat medium-to-air heat exchanger that adjusts a temperature of blast air into a vehicle interior by exchanging heat between the heat medium, the temperature of which has been adjusted in the adjusting heat exchangers, and the blast air;

a heat transfer device that includes a circulation flow path for the heat medium and transfers heat with the heat medium, the temperature of which has been adjusted in the adjusting heat exchanger; and a heat medium flow rate adjustment unit that adjusts the flow rate of the heat medium flowing through the heat transfer device in such a way that a temperature related to a temperature of the blast air, which has been adjusted in the heat medium-to-air heat exchanger, approaches a first target temperature.

Accordingly, the temperature of the heat medium-to-air heat exchanger can be properly controlled.

To achieve the above-described object, a third aspect of the present disclosure including:

a first pump and a second pump that take in and discharge a heat medium;

an adjusting heat exchanger that adjusts a temperature of the heat medium by causing the heat medium to undergo heat exchange;

a heat medium-to-air heat exchanger that adjusts the temperature of blast air into a vehicle interior by exchanging heat between the heat medium, the temperature of which has been adjusted in the adjusting heat exchanger, and the blast air;

a heat medium-to-outside air heat exchanger that exchanges sensible heat between the heat medium, the temperature of which has been adjusted in the adjusting heat exchanger, and outside air; and a heat exchanger adjustment unit that adjusts at least one of a flow rate and the temperature of the heat medium flowing through the heat medium-to-air heat exchanger in such a way that a temperature related to a temperature of the blast air, which has been adjusted in the heat medium-to-air heat exchanger, a temperature related to a surface temperature of the heat medium-to-air heat exchanger, or a temperature related to the temperature of the heat medium flowing through the heat medium-to-air heat exchanger approaches a first target temperature.

Accordingly, the temperature of the heat medium-to-air heat exchanger can be properly controlled.

To achieve the above-described object, a fourth aspect of the present disclosure including:

a first pump and a second pump that take in and discharge a heat medium;

an adjusting heat exchanger that adjusts a temperature of the heat medium by causing the heat medium to undergo heat exchange;

a heat medium-to-air heat exchanger that adjusts the temperature of blast air into a vehicle interior by exchanging heat between the heat medium, the temperature of which has been adjusted in the adjusting heat exchanger, and the blast air;

a heat transfer device that includes a circulation flow path for the heat medium and transfers heat with the heat medium, the temperature of which has been adjusted in the adjusting heat exchanger; and a heat exchanger adjustment unit that adjusts at least one of a flow rate and the temperature of the heat medium flowing through the heat medium-to-air heat exchanger in such a way that a temperature related to a temperature of the blast air, which has been adjusted in the heat medium-to-air heat exchanger, a temperature related to a surface temperature of the heat medium-to-air heat exchanger, or a temperature related to the temperature of the heat medium flowing through the heat medium-to-air heat exchanger approaches a first target temperature.

Accordingly, the temperature of the heat medium-to-air heat exchanger can be properly controlled.

To achieve the above-described object, a fifth aspect of the present disclosure including:

a first pump and a second pump that take in and discharge a heat medium;

a compressor that takes in and discharges a refrigerant;

a condenser that condenses the refrigerant and heats the heat medium by exchanging heat between the refrigerant discharged from the compressor and the heat medium circulated by the second pump;

a decompression unit that decompresses and expands the refrigerant flowing from the condenser;

an evaporator that evaporates the refrigerant and cools the heat medium by exchanging heat between the refrigerant decompressed and expanded by the decompression unit and the heat medium circulated by the first pump;

an air-cooling heat exchanger that cools blast air into a vehicle interior by exchanging sensible heat between the heat medium cooled in the evaporator and the blast air;

an air-heating heat exchanger that heats the blast air by exchanging sensible heat between the heat medium heated in the condenser and the blast air;

a heat medium-to-outside air heat exchanger that exchanges sensible heat between the heat medium heated in the condenser and outside air such that the heat medium radiates heat to the outside air, a refrigerant flow rate adjustment unit that adjusts the flow rate of the refrigerant discharged from the compressor in such a way that a temperature related to a temperature of the blast air cooled in the air-cooling heat exchanger approaches a first target temperature;

a heat exchanger adjustment unit that adjusts a flow rate of at least one of the heat medium and the outside air flowing through the heat medium-to-outside air heat exchanger; and an air-volume ratio adjustment units that adjusts an air volume ratio between a volume of blast air, which has been cooled in the air-cooling heat exchanger and passes through the air-heating heat exchanger, and a volume of blast air, which has been cooled in the air-cooling heat exchanger and does not pass through the air-heating heat exchanger, in such a way that a temperature related to a temperature of the blast air, which has been adjusted in at least one heat exchanger of the air-cooling heat exchanger and the air-heating heat exchanger and which is blown out into the vehicle interior, approaches a second target temperature.

Accordingly, the temperature of the blast air, the temperature of which has been adjusted in at least one of the air-cooling heat exchanger and the air-heating heat exchanger and which is blown out into the vehicle interior, can be properly controlled.

In this disclosure, the temperature related to the temperature of blast air, the temperature of which has been adjusted in the heat medium-to-air heat exchanger, represents the temperature of blast air, the temperature of which has been adjusted in the heat medium-to-air heat exchanger, a temperature related to the surface temperature of the heat medium-to-air heat exchanger, a temperature related to the temperature of the heat medium flowing through the heat medium-to-air heat exchanger, or the like.

EMBODIMENTS FOR CARRYING OUT INVENTION

Figure 1:
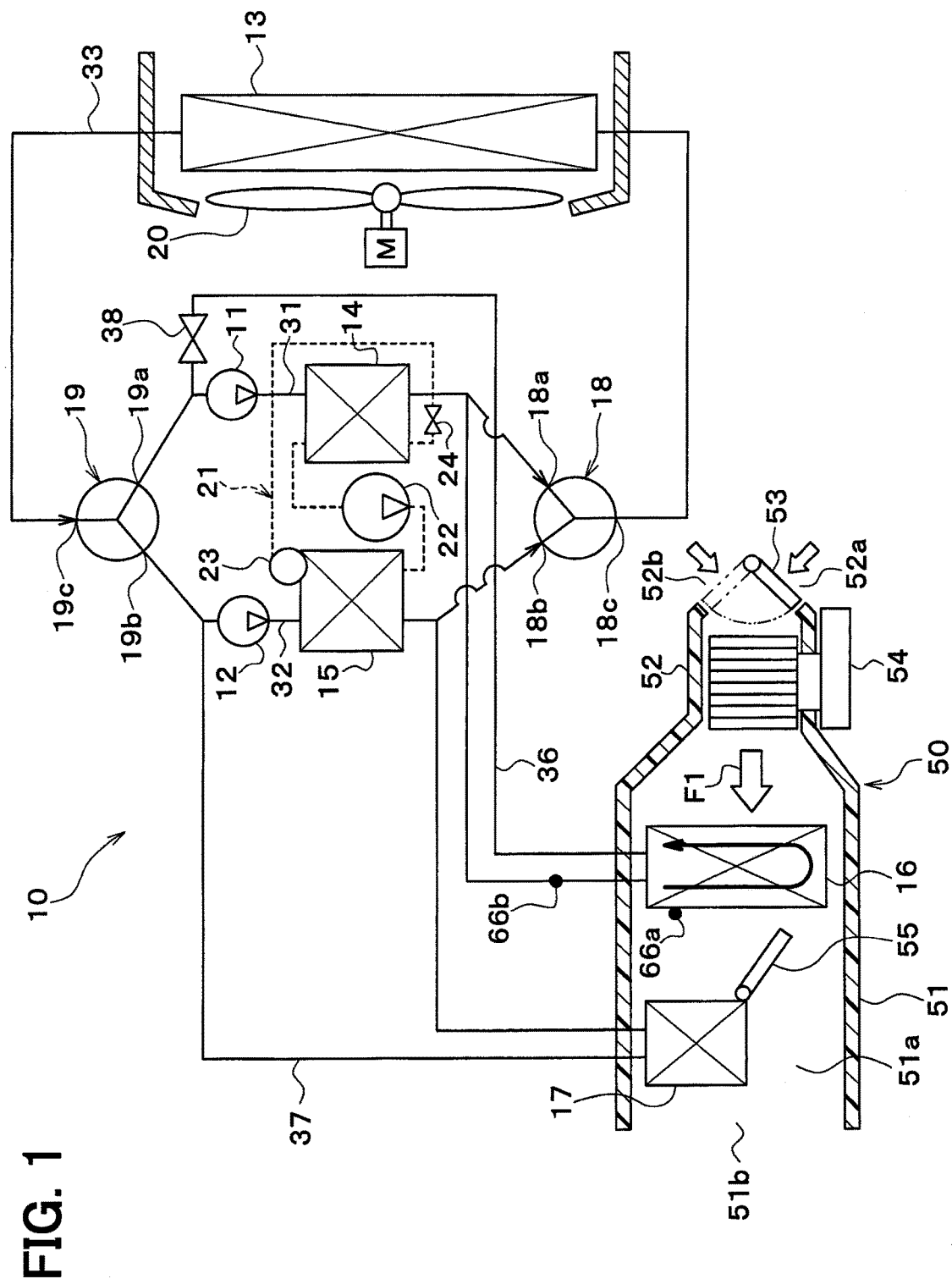
FIG. 1 is a diagram illustrating the entire configuration of a vehicle heat management system in a first embodiment.

The inventor of the application examines a vehicle air conditioning apparatus that is configured not to emit a refrigerant even in a slight collision. That is, an evaporator and a condenser exchange heat between the refrigerant of a refrigeration cycle and coolant, an air-cooling heat exchanger exchanges sensible heat between the coolant cooled in the evaporator and blast air into a vehicle interior, and thus the blast air is cooled. In other words, the inventor examines the vehicle air conditioning apparatus (hereinafter, which is referred to as a study example) that heats the blast air by exchanging sensible heat between the coolant heated in the condenser and blast air into the vehicle interior using an air-heating heat exchanger.

In the study example, the evaporator and the condenser do not exchange heat between the blast air into the vehicle interior and the refrigerant, and thus, even if the refrigerant leaks from the evaporator or the condenser, the refrigerant can be prevented from leaking into the vehicle interior. An exterior heat exchanger disposed in the foremost portion of a vehicle is replaced with a heat exchanger using the coolant. For this reason, the refrigerant is not emitted even in a slight collision, an increase in repair costs can be restricted, and environmental destruction can be prevented.

However, a system configuration in the study example is considerably different from that in the related art. Accordingly, even when the refrigeration cycle is controlled similarly to the related art, the temperature of air to be blown into the vehicle interior cannot be properly controlled, which is a problem.

In the study example, a proper control of the surface temperature of the air-cooling heat exchanger is needed. That is, when the surface temperature of the air-cooling heat exchanger is lower than a freezing point, condensate adhering to a surface of the air-cooling heat exchanger freezes, and frost formation (frost) occurs. As a result, the air passages of the air-cooling heat exchanger are blocked, the blowing rate of blast air into the vehicle interior decreases, and air conditioning performance deteriorates. In contrast, when the temperature of the air-cooling heat exchanger is higher than a predetermined temperature, condensate adhering to a surface of the air-cooling heat exchanger evaporates, and the humidity of the blast air increases. Accordingly, foggy windows occur, or a nasty smell occurs because fungi, fine particulates, and the like melt into the condensate are mixed into vapor. As a result, there is a possibility that the comfortableness of occupants deteriorates.

Hereinafter, specific embodiments of a vehicle air conditioning apparatus capable of properly controlling the temperature of a heat exchanger that exchanges heat between blast air into a vehicle interior and coolant will be described with reference to the accompanying drawings while the aforementioned points are taken into consideration. In this embodiments to be given hereinbelow, the same reference signs will be assigned to the same or equivalent portions.

(First Embodiment)

A vehicle heat management system 10 illustrated in FIG. 1 is used to adjust the temperature of various devices of a vehicle or the temperature of a vehicle interior to a proper temperature. In this embodiment, the heat management system 10 is applied to a hybrid vehicle that obtains a vehicle-travel drive force from an engine (internal combustion engine) and a traveling electric motor.

The hybrid vehicle in this embodiment is a plug-in hybrid vehicle that is capable of charging a battery mounted in the vehicle (in-vehicle battery) with electrical power supplied from an external power source (commercial power source) while the vehicle is parked. For example, a lithium-ion battery can be used as the battery.

A drive force output from the engine is used not only to make the vehicle to travel but also to operate a generator. Electrical power generated by the generator, and electrical power supplied from an external power source can be stored in the battery. The electrical power stored in the battery is supplied to various vehicle-mounted devices including electric components constituting the heat management system 10, in addition to the traveling electric motor.

As illustrated in FIG. 1, the heat management system 10 includes a first pump 11; a second pump 12; a radiator 13; a coolant cooler 14; a coolant heater 15; a cooler core 16; a heater core 17; a first switching valve 18; and a second switching valve 19.

The first pump 11 and the second pump 12 are motor-driven pumps that take in and discharge coolant (heat medium). The coolant is a fluid which is used as a heat medium. In this embodiment, liquid containing at least ethylene glycol, dimethylpolysiloxane, or a nanofluid, or antifreezing liquid is used as the coolant.

The radiator 13, the coolant cooler 14, the coolant heater 15, the cooler core 16, and the heater core 17 are coolant circulation devices (heat medium circulation device) through which the coolant flows.

The radiator 13 is a coolant-to-outside air heat exchanger (heat medium-to-outside air heat exchanger) that exchanges heat (exchanges sensible heat) between the coolant and air outside of the vehicle (hereinafter, which is referred to as outside air). When the coolant with a temperature higher than or equal to an outside air temperature flows through the radiator 13, the coolant is capable of radiating heat to the outside air. When the coolant with a temperature lower than or equal to an outside air temperature flows through the radiator 13, the coolant is capable of absorbing heat from the outside air. In other words, the radiator 13 is capable of serving as both a radiator that causes the coolant to radiate heat to the outside air, and a heat absorber that causes the coolant to absorb heat from the outside air.

The radiator 13 includes a coolant-circulating flow path, and is a heat transfer device that transfers heat between the outside air and the coolant with a temperature that is adjusted by the coolant cooler 14 or the coolant heater 15.

An outside blower 20 is a motor-driven blower (outside air blower) that blows the outside air to the radiator 13. The radiator 13 and the outside blower 20 are disposed in a foremost portion of the vehicle. For this reason, while the vehicle travels, a headwind can blow against the radiator 13.

The coolant cooler 14 and the coolant heater 15 are coolant temperature-adjusting heat exchangers (adjusting heat exchangers) that adjust the coolant temperature by making the coolant exchange heat. The coolant cooler 14 is a coolant-cooling heat exchanger (heat medium-cooling heat exchanger) that cools the coolant. The coolant heater 15 is a coolant-heating heat exchanger (heat medium-heating heat exchanger) that heats the coolant.

The coolant cooler 14 is a low-pressure side heat exchanger (heat medium heat absorber) that causes the low-pressure side refrigerant of a refrigeration cycle 21 to absorb heat from the coolant by exchanging heat between the low-pressure side refrigerant and the coolant. The coolant cooler 14 serves as an evaporator of the refrigeration cycle 21.

The refrigeration cycle 21 is a vapor compression type freezer that includes: a compressor 22; the coolant heater 15; a receiver 23; an expansion valve 24; and the coolant cooler 14. In this embodiment, the refrigeration cycle 21 uses a fluorocarbon refrigerant as the refrigerant, and constitutes a subcritical refrigeration cycle in which the high pressure-side refrigerant pressure does not exceed a critical pressure of the refrigerant.

The compressor 22 is an electric compressor that is driven by electrical power from the battery, and takes in, compresses, and discharges the refrigerant of the refrigeration cycle 21. The coolant heater 15 is a condenser that condenses (changes latent heat of) the high-pressure side refrigerant by exchanging heat between the coolant and the high-pressure side refrigerant discharged from the compressor 22.

The receiver 23 is a gas-liquid separator that separates gas-liquid two-phase refrigerant flowing from the coolant heater 15 into gas-phase refrigerant and liquid-phase refrigerant, and causes the separated liquid-phase refrigerant to flow to the expansion valve 24. The expansion valve 24 is a decompression unit that decompress and expands the liquid-phase refrigerant flowing from the receiver 23.

The coolant cooler 14 is an evaporator that evaporates (changes latent heat of) low-pressure refrigerant decompressed and expanded by the expansion valve 24 by exchanging heat between the low-pressure refrigerant and the coolant. The gas-phase refrigerant evaporated by the coolant cooler 14 is taken in and compressed by the compressor 22.

The radiator 13 cools the coolant using the outside air, and in contrast, the coolant cooler 14 cools the coolant using the low-pressure refrigerant of the refrigeration cycle 21. For this reason, the temperature of the coolant cooled in the coolant cooler 14 can be decreased compared to the temperature of the coolant cooled in the radiator 13. Specifically, the radiator 13 is not capable of cooling the coolant down to a temperature that is lower than an outside air temperature, and in contrast, the coolant cooler 14 is capable of cooling the coolant down to a temperature that is lower than an outside air temperature.

The cooler core 16 and the heater core 17 are heat medium-to-air heat exchangers which adjust the temperature of blast air into the vehicle interior by exchanging heat between the blast air and the coolant with a temperature adjusted by the coolant cooler 14 and the coolant heater 15.

The cooler core 16 is an air-cooling heat exchanger that cools blast air into the vehicle interior by exchanging heat (sensible heat) between the coolant and the blast air into the vehicle interior. The heater core 17 is an air-heating heat exchanger that heats blast air into the vehicle interior by exchanging heat (sensible heat) between the coolant and the blast air into the vehicle interior.

The first pump 11 is disposed on a first-pump flow path 31. The coolant cooler 14 is disposed on a discharge side of the first pump 11 on the first-pump flow path 31.

The second pump 12 is disposed on a second pump flow path 32. The coolant heater 15 is disposed on a discharge side of the second pump 12 on the second pump flow path 32.

The radiator 13 is disposed on a radiator flow path 33. The cooler core 16 is disposed on a cooler-core flow path 36. The heater core 17 is disposed on a heater-core flow channel 37.

The first-pump flow path 31, the second pump flow path 32, and the radiator flow path 33 are connected to the first switching valve 18 and the second switching valve 19. The first switching valve 18 and the second switching valve 19 are switching units which switch the flow of the coolant.

The first switching valve 18 includes a first inlet port 18a and a second inlet port 18b as inlet ports of the coolant, and a first outlet port 18c as an outlet port of the coolant. The second switching valve 19 includes a first outlet port 19a and a second outlet port 19b as outlet ports of the coolant, and a first inlet port 19c as an inlet port of the coolant.

One end of the first-pump flow path 31 is connected to the first inlet port 18a of the first switching valve 18. In other words, a coolant outlet side of the coolant cooler 14 is connected to the first inlet port 18a of the first switching valve 18.

One end of the second pump flow path 32 is connected to the second inlet port 18b of the first switching valve 18. In other words, a coolant outlet side of the coolant heater 15 is connected to the second inlet port 18b of the first switching valve 18.

One end of the radiator flow path 33 is connected to the first outlet port 18c of the first switching valve 18. In other words, a coolant inlet side of the radiator 13 is connected to the first outlet port 18c of the first switching valve 18.

The other end of the first-pump flow path 31 is connected to the first outlet port 19a of the second switching valve 19. In other words, a coolant intake side of the first pump 11 is connected to the first outlet port 19a of the second switching valve 19.

The other end of the second pump flow path 32 is connected to the second outlet port 19b of the second switching valve 19. In other words, a coolant intake side of the second pump 12 is connected to the second outlet port 19b of the second switching valve 19.

The other end of the radiator flow path 33 is connected to the first inlet port 19c of the second switching valve 19. In other words, a coolant outlet side of the radiator 13 is connected to the first inlet port 19c of the second switching valve 19.

Each of the first switching valve 18 and the second switching valve 19 is structured to be capable of arbitrarily or selectively switching communication between the inlet ports and the outlet ports.

Specifically, the first switching valve 18 switches between a state in which the coolant discharged from the first pump 11 is allowed to flow to the radiator 13, a state in which the coolant discharged from the second pump 12 is allowed to flow to the radiator 13, and a state in which the coolant discharged from the first pump 11 and the second pump 12 is not allowed to flow to the radiator 13.

The second switching valve 19 switches between a state in which the coolant is allowed to flow to the first pump 11 from the radiator 13, a state in which the coolant is allowed to flow to the second pump 12 from the radiator 13, and a state in which the coolant is not allowed to flow to the first pump 11 and the second pump 12 from the radiator 13.

Each of the first switching valve 18 and the second switching valve 19 is capable of adjusting a valve opening. Accordingly, each of the first switching valve 18 and the second switching valve 19 is capable of adjusting a flow rate of the coolant flowing through the radiator 13.

The first switching valve 18 and the second switching valve 19 are capable of mixing the coolant discharged from the first pump 11 with the coolant discharged from the second pump 12 at an arbitrary flow rate ratio, and allowing the mixed coolant to flow to the radiator 13.

One end of the cooler-core flow path 36 is connected to a coolant intake side of the first pump 11 on the first-pump flow path 31. The other end of the cooler-core flow path 36 is connected to a coolant outlet side of the coolant cooler 14 on the first-pump flow path 31.

An opening-and-closing valve 38 is disposed on the radiator flow path 36. The opening-and-closing valve 38 is a flow path opening and closing unit that opens and closes the radiator flow path 36.

One end of a heater-core flow channel 37 is connected to a coolant intake side of the second pump 12 on the second pump flow path 32. The other end of the heater-core flow channel 36 is connected to a coolant outlet side of the coolant heater 15 on the second pump flow path 32.

The cooler core 16 and the heater core 17 are accommodated in a case 51 of an interior air conditioning unit 50 of the vehicle air conditioning apparatus.

The case 51 forms an air passage of blast air into the vehicle interior, and is molded of resin (for example, polypropylene) having elasticity to some extent, and good strength. An inside air-to-outside air switching box 52 is disposed on the uppermost stream side of an air flow in the case 51. The inside air-to-outside air switching box 52 is an inside and outside air introduction unit that switches the introduction of air between inside air (vehicle interior air) and outside air (vehicle exterior air).

The inside air-to-outside air switching box 52 is provided with an inside air intake port 52a and an outside air suction port 52b. The inside air is introduced into the case 51 through the inside air intake port 52a, and the outside air is introduced into the case 51 through the outside air suction port 52b. An inside and outside air switching door 53 is disposed in the inside air-to-outside air switching box 52.

The inside and outside air switching door 53 is an air volume-ratio changing unit that changes an air volume ratio between the volume of inside air introduced into the case 51 and the volume of outside air introduced into the case 51. Specifically, the inside and outside air switching door 53 changes an air volume ratio between the inside air volume and the outside air volume by continuously adjusting the respective opening areas of the inside air intake port 52a and the outside air suction port 52b. The inside and outside air switching door 53 is driven by an electric actuator (not illustrated).

An inside blower 54 (blower) is disposed on a downstream side of the air flow in the inside air-to-outside air switching box 52. The inside blower 54 is an air blowing unit that blows air (inside air and outside air), which is taken in through the inside air-to-outside air switching box 52, into the vehicle interior. The inside blower 54 is a motor-driven blower in which an electric motor drives a centrifugal multi-blade fan (sirocco fan).

The cooler core 16 and the heater core 17 are disposed on a downstream side of the air flow of the inside blower 54 in the case 51.

A heater core bypass passage 51a is provided on a downstream side of the air flow of the cooler core 16 inside the case 51. The heater core bypass passage 51a is an air passage through which air passing through the cooler core 16 is allowed to pass without passing through the heater core 17.

An air mix door 55 is disposed between the cooler core 16 and the heater core 17 inside the case 51.

The air mix door 55 is an air-volume ratio adjustment unit that continuously changes an air volume ratio between air flowing to the heater core 17 and air flowing to the heater core bypass passage 51a. The air mix door 55 is a plate-like turnable door, a slidable door, or the like, and is driven by an electric actuator (not illustrated).

The temperature of blown out air into the vehicle interior changes according to the air volume ratio between the volume of air passing through the heater core 17 and the volume of air passing through the heater core bypass passage 51a. Accordingly, the air mix door 55 is a temperature adjustment unit that adjusts the temperature of blown out air into the vehicle interior.

On the downstream most portion of the air flow in the case 51, an outlet port 51b which blows the blast air into the vehicle interior, which is space to be air-conditioned, is disposed. Specifically, a defroster outlet port, a face outlet port, and a foot outlet port are provided as the outlet ports 51.

Air conditioning wind is blown out toward the inner surface of the front windshield glass of the vehicle through the defroster outlet port. Air conditioning wind is blown out toward the upper half of an occupant through the face outlet port. Air conditioning wind is blown out toward the feet of an occupant through the foot outlet port.

An outlet port mode door (not illustrated) is disposed on an upstream side of the air flow of the outlet port 51b. The outlet port mode door is an outlet port mode switching unit that switches between outlet port modes. The outlet port mode door is driven by an electric actuator (not illustrated).

A face mode, a bi-level mode, a foot mode, and a foot and defroster mode are examples of the outlet port mode which is switched by the outlet port mode door.

The face mode is an outlet port mode in which the face outlet port is fully opened, and air is blown out toward the upper half of an occupant in the vehicle interior through the face outlet port. The bi-level mode is an outlet port mode in which both the face outlet port and the foot outlet port are opened, and air is blown out toward the upper half and the feet of an occupant in the vehicle interior.

The foot mode is an outlet port mode in which the face outlet port is fully opened, the defroster outlet port is opened by a small amount, and air is blown out through mainly the foot outlet port. The foot and defroster mode is an outlet port mode in which the foot outlet port and the defroster outlet port are opened to the same extent, and air is blown out through both the foot outlet port and the defroster outlet port.

The first switching valve 18 and the second switching valve 19 will be described in detail with reference to FIGS. 2 to 7. The first switching valve 18 and the second switching valve 19 have the same basic structure, and the point of difference therebetween is that an inlet port of the coolant and an outlet port of a fluid are reversely disposed.

Figure 2:
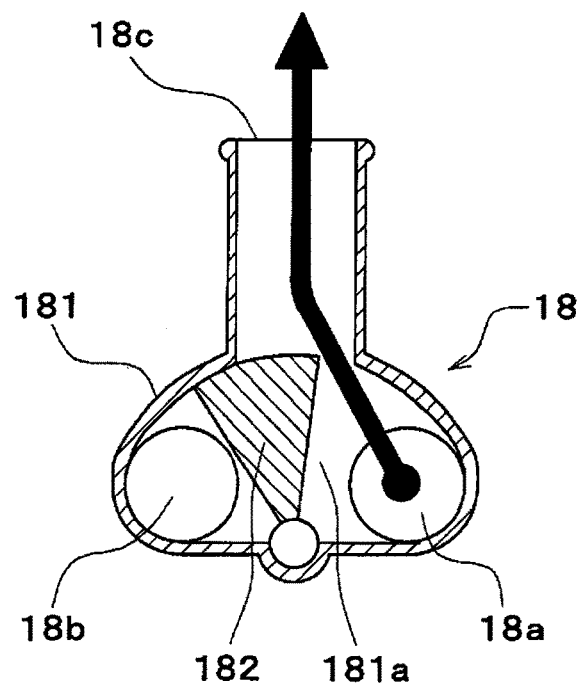
FIG. 2 is a cross-sectional view of a first switching valve in the first embodiment.

As illustrated in FIG. 2, the first switching valve 18 includes a main body 181 in which the first inlet port 18a, the second inlet port 18b, and the first outlet port 18c are provided. A communication flow path 181a is provided inside the main body 181, and the first inlet port 18a and the first outlet port 18c communicate with each other, and the second inlet port 18b and the first outlet port 18c communicate with each other through the communication flow path 181a.

A door-type valve body 182 is disposed on the communication flow path 181a, and switches communication between the first inlet port 18a and the first outlet port 18c, and between the second inlet port 18b and the first outlet port 18c.

When the valve body 182 rotates to the position illustrated in FIG. 2, the first inlet port 18a communicates with the first outlet port 18c, and communication is shut off between the second inlet port 18b and the first outlet port 18c. Accordingly, the coolant flowing in through the first inlet port 18a flows out through the first outlet port 18c, and the coolant flowing in through the second inlet port 18b does not flow out through the first outlet port 18c.

The valve body 182 is capable of adjusting the flow rate of coolant flowing from the first inlet port 18a to the first outlet port 18c by adjusting the opening of the first outlet port 18c while closing the second inlet port 18b.

Figure 3:
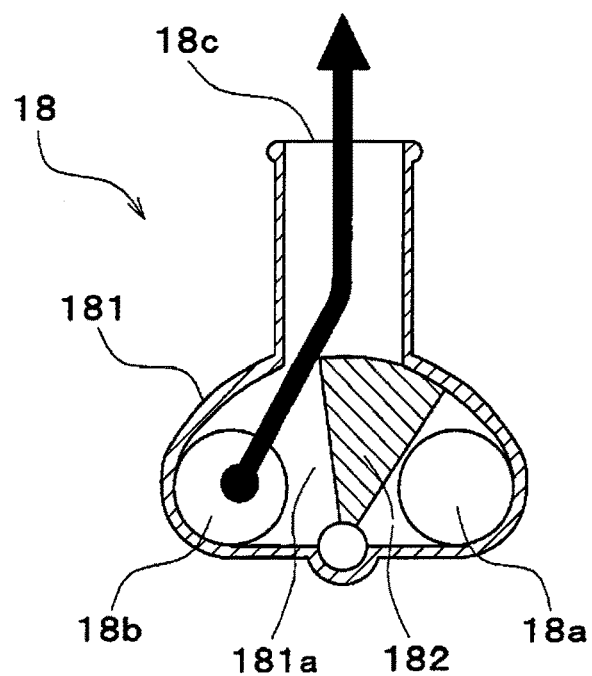
FIG. 3 is another cross-sectional view of the first switching valve in the first embodiment.

When the valve body 182 rotates to the position illustrated in FIG. 3, communication is shut off between the first inlet port 18a and the first outlet port 18c, and the second inlet port 18b communicates with the first outlet port 18c. Accordingly, the coolant flowing in through the first inlet port 18a does not flow out through the first outlet port 18c, and the coolant flowing in through the second inlet port 18b flows out through the first outlet port 18c.

The valve body 182 is capable of adjusting the flow rate of coolant flowing from the second inlet port 18b to the first outlet port 18c by adjusting the opening of the side while closing the first inlet port 18a.

Figure 4:
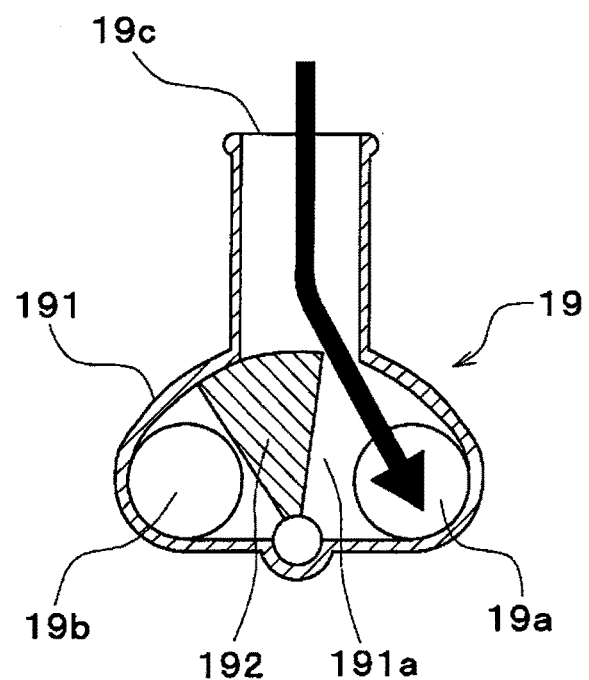
FIG. 4 is a cross-sectional view of a second switching valve in the first embodiment.

As illustrated in FIG. 4, the second switching valve 19 includes a main body 191 in which the first outlet port 19a, the second outlet port 19b, and the first inlet port 19c are provided. A communication flow path 191a is provided inside the main body 191, and the first outlet port 19a and the first inlet port 19c communicate with each other, and the second outlet port 19b and the first inlet port 19c communicate with each other through the communication flow path 191a.

A door-type valve body 192 is disposed on the communication flow path 191a, and switches communication between the first outlet port 19a and the first inlet port 19c, and between the second outlet port 19b and the first inlet port 19c.

When the valve body 192 rotates to the position illustrated in FIG. 4, the first outlet port 19a communicates with the first inlet port 19c, and communication is shut off between the second outlet port 19b and the first inlet port 19c. Accordingly, the coolant flowing in through the first inlet port 19c does not flow out through the second outlet port 74b, but flows through the first outlet port 19a.

The valve body 192 is capable of adjusting the flow rate of coolant flowing from the first inlet port 19c to the first outlet port 19a by adjusting the opening of the first inlet port 19c while closing the second outlet port 19b.

Figure 5:
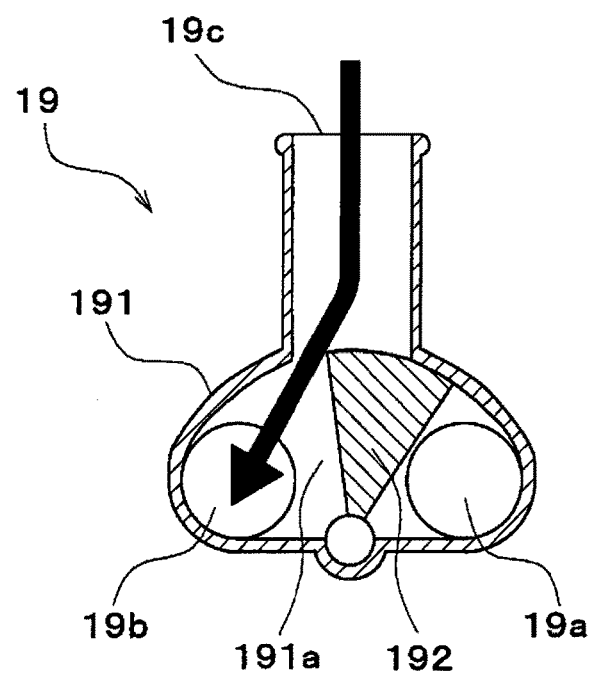
FIG. 5 is another cross-sectional view of the second switching valve in the first embodiment.

When the valve body 192 rotates to the position illustrated in FIG. 5, communication is shut off between the first outlet port 19a and the first inlet port 19c, and the second outlet port 19b communicates with the first inlet port 19c. Accordingly, the coolant flowing in through the first inlet port 19c does not flow out through the first outlet port 19a, but flows through the second outlet port 74b.

The valve body 192 is capable of adjusting the flow rate of coolant flowing from the first inlet port 19c to the second outlet port 19*b* by adjusting the opening of the first inlet port 19*c* while closing the first outlet port 19*a*.

The valve body 182 of the first switching valve 18 and the valve body 192 of the second switching valve 19 are driven to independently rotate by independent electric motors. The valve body 182 of the first switching valve 18 and the valve body 192 of the second switching valve 19 may be driven to rotate in conjunction with each other by a common electric motor.

The cooler core 16 will be described in detail with reference to FIG. 6. The cooler core 16 includes: a first heat exchange core portion 161*a*; a second heat exchange core portion 162*a*; a first upper tank unit 161*b*; a first lower tank port 161*c*; a second upper tank unit 162*b*; and a second lower tank unit 162*c*.

The first heat exchange core portion 161*a*, the first upper tank unit 161*b*, and the first lower tank port 161*c* form an upstream region of an air flow F1 in the cooler core 16, and the second heat exchange core portion 162*a*, the second upper tank unit 162*b*, and the second lower tank unit 162*c* form a downstream region of the air flow F1 in the cooler core 16.

The first upper tank unit 161*b* is positioned above the first heat exchange core portion 161*a*. The first lower tank unit 161*c* is positioned below the first heat exchange core portion 161*a*. The second upper tank unit 162*b* is positioned above the second heat exchange core portion 162*a*. The second lower tank unit 162*c* is positioned below the second heat exchange core portion 162*a*.

Each of the first heat exchange core portion 161*a* and the second heat exchange core portion 162*a* includes multiple tubes 163 which extend in a vertical direction. A coolant passage is formed inside each of the tubes 163, and the coolant flows through the coolant passage. Air passages are formed in spaces between the multiple tubes 163, and air passes through the air passages. Fins 164 are disposed between the multiple tubes 163. The fins 164 are connected to the tubes 163.

Each of the heat exchange core portions 161*a* and 162*a* has a laminated structure in which the tubes 163 and the fins 164 stack up on top of each other. The tubes 163 and the fins 164 are alternately disposed in a laminated manner in each of the heat exchange core portions 161*a* and 162*a* in a rightward and leftward direction. The fins 164 may be eliminated.

Figure 6:
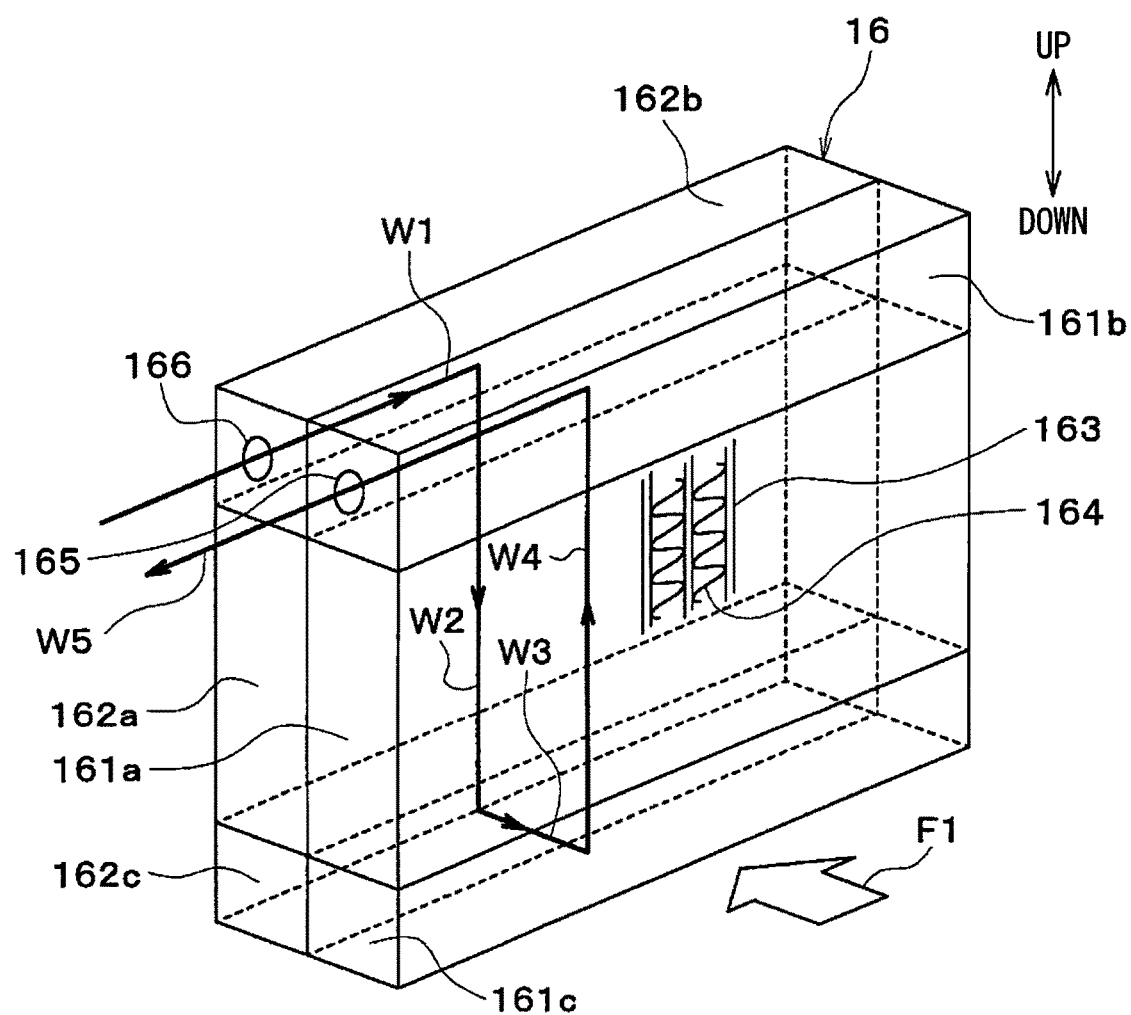
FIG. 6 is a schematic perspective view of a cooler core in the first embodiment.

For illustrative purposes, FIG. 6 illustrates only a portion of the laminated structure in which the tubes 163 and the fins 164 stack up on top of each other, and actually, the tubes 163 and the fins 164 are stack up on top of each other in the entire region of each of the first heat exchange core portion 161*a* and the second heat exchange core portion 162*a*. The blast air of the inside blower 54 passes through gap portions formed in the laminated structure.

The tube 163 is a flat tube, the sectional shape of which is flat along an air flowing direction. The fin 164 is a corrugated fin that is formed by bending a thin plate in the shape of waves, and is joined to a flat outer surface of the tube 163 and increases an air side heat transfer area.

The coolant passages formed by the tubes 163 of the first heat exchange core portion 161*a* are independent of the coolant passages formed by the tubes 163 of the second heat exchange core portion 162*a*. A coolant passage space formed by the first upper tank unit 161*b* is independent of that formed by the second upper tank unit 162*b*. A coolant passage space formed by the first lower tank unit 161*c* communicates with that formed by the second lower tank unit 162.

A coolant outlet port 165 is provided in the first upper tank unit 161*b*. A coolant inlet port 166 is provided in the second upper tank unit 162*b*.

Accordingly, the second upper tank unit 162*b* serves to distribute a refrigerant flow to the multiple tubes 163 of the second heat exchange core portion 162*a*, and the second lower tank unit 162 serves to collect a flow of the refrigerant from the multiple tubes 163 of the second heat exchange core portion 162*a*. The first lower tank unit 161*c* serves to distribute a refrigerant flow to the multiple tubes 163 of the first heat exchange core portion 161*a*, and the first upper tank unit 161*b* serves to collect a flow of the refrigerant from the multiple tubes 163 of the first heat exchange core portion 161*a*.

A specific material of each of the configuration components of the cooler core, that is, a specific material of each of the tubes 163, the fins 164, the first upper tank unit 161*b*, the first lower tank unit 161*c*, the second upper tank unit 162*b*, and the second lower tank unit 162*c* of the cooler core is preferably aluminum that is metal having good heat conductivity or good brazing properties.

When each of the components is made of aluminum, the entire configuration components of the cooler core 16 can be integrally brazed and assembled together.

When the entire coolant flow channel of the cooler core 16 is specifically described, the coolant flows into the second upper tank unit 162*b* through the coolant inlet port 166 as illustrated by arrow W1 in FIG. 6, flows downwards through the multiple tubes 163 of the second heat exchange core portion 162*a* as illustrated by arrow W2, and then flows into the second lower tank unit 162.

The coolant of the second lower tank unit 162 moves to the first lower tank unit 161*c* as illustrated by arrow W3. The coolant of the first lower tank unit 161*c* flows upwards through the multiple tubes 163 of the first heat exchange core portion 161*a* as illustrated by arrow W4, flows into the first upper tank unit 161*b*, and then flows out through the coolant outlet port 165.

Figure 7:
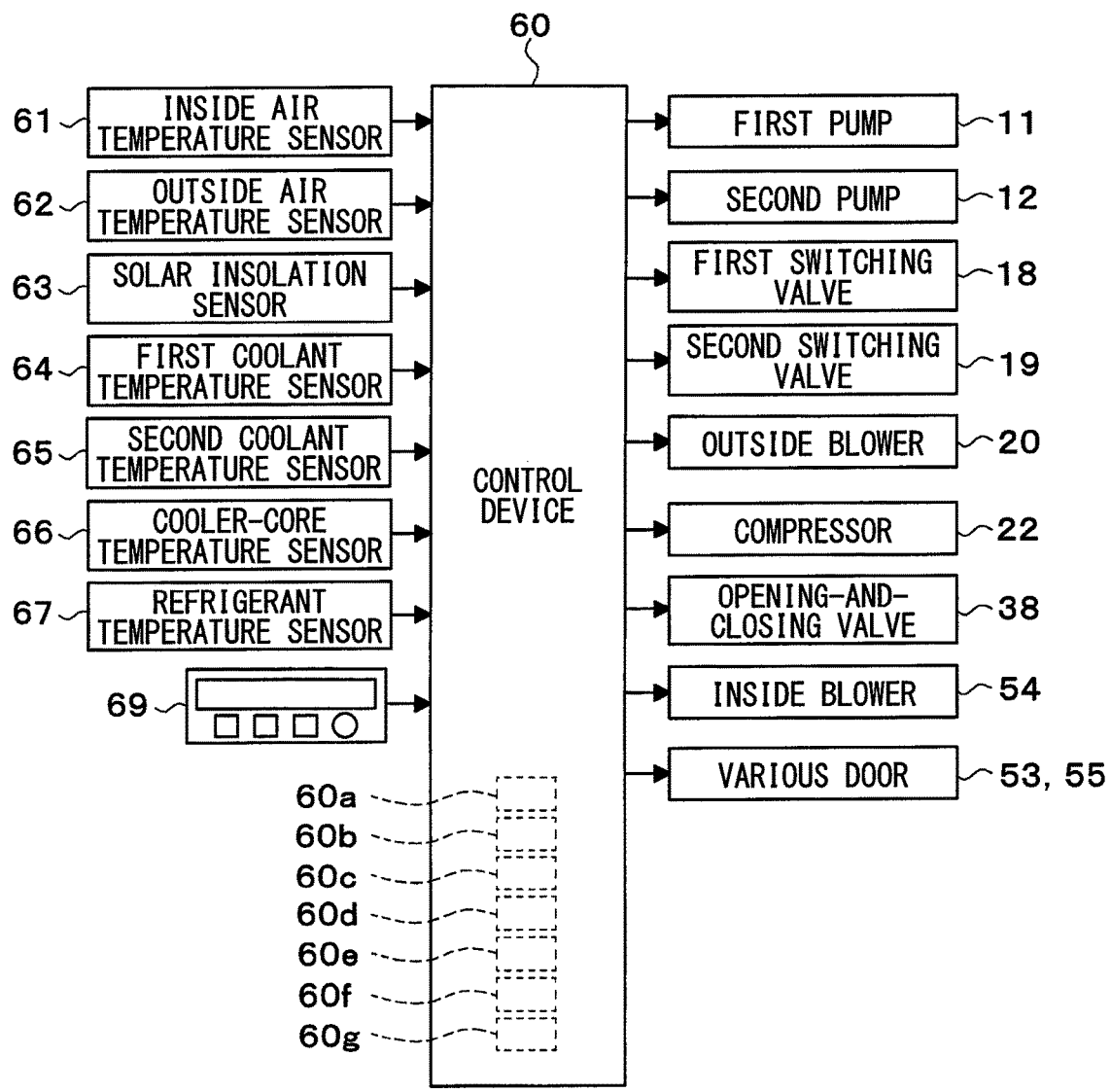
FIG. 7 is a block diagram of an electric control unit of the vehicle heat management system in the first embodiment.

Hereinafter, an electric control unit of the heat management system 10 will be described with reference to FIG. 7. A control device 60 is made up of a well-known microcomputer including a CPU, a ROM, a RAM, and the like, and peripheral circuits, and is a control unit that performs various computational processes according to an air conditioning control program stored in the ROM, and controls the operation of various control-target devices connected to an output side of the control device 60.

The control-target device controlled by the control device 60 includes the first pump 11, the second pump 12, the first switching valve 18, the second switching valve 19, the outside blower 20, the compressor 22, the inside blower 54, the electric actuators to drive various doors (the inside and outside air switching door 53, the air mix door 55, the outlet port mode doors, and the like) disposed inside the case 51.

Control units which control the operation of the various control-target devices connected to the output side of the control device 60, are integrally configured in the control device 60, and configuration elements (hardware and software) to control the operation of each control-target device form a control unit that controls the operation of each control-target device.

In this embodiment, a pump control unit 60*a* is formed of configuration elements (hardware and software) to control the operation of the first pump 11 and the second pump 12. The pump control unit 60*a* is a flow rate control unit (heat medium flow rate adjustment unit) that controls the flow rate of coolant. The pump control unit 60*a* may be configured independent of the control device 60. The pump control unit 60a is a radiator adjustment unit (heat exchanger adjustment unit) that adjusts the flow rate of coolant flowing through the radiator 13.

In this embodiment, a switching valve control unit 60b is formed of configuration elements (hardware and software) to control the operations of the first switching valve 18 and the second switching valve 19. The switching valve control unit 60b may be configured independent of the control device 60. The switching valve control unit 60b is a radiator adjustment unit (heat exchanger adjustment unit) that adjusts the flow rate of coolant flowing through the radiator 13. The switching valve control unit 60b is a flow rate adjustment unit (heat medium flow rate adjustment unit) that adjusts the flow rate of coolant flowing through each coolant circulation device.

In this embodiment, an outside blower control unit (outside air blower control unit) 60c is formed of configuration elements (hardware and software) to control the operation of the outside blower 20. The outside blower control unit 60c may be configured independent of the control device 60. The outside blower control unit 60c is a radiator adjustment unit (heat exchanger adjustment unit, and heat medium and outside air adjustment unit) that controls the flow rate of blast air passing through the radiator 13.

In this embodiment, a compressor control unit 60d is formed of configuration elements (hardware and software) to control the operation of the compressor 22. The compressor control unit 60d may be configured independent of the control unit 60. The compressor control unit 60d is a refrigerant flow rate control unit that controls the flow rate of refrigerant discharged from the compressor 22.

In this embodiment, an opening-and-closing valve control unit 60e is formed of configuration elements (hardware and software) to control the operation of the opening-and-closing valve 38. The opening-and-closing valve control unit 60e may be configured independent of the control device 60. The opening-and-closing valve 38 and the opening-and-closing valve control unit 60e are cooler-core adjustment unit (heat exchanger adjustment unit, air-cooling adjustment unit) that adjusts the flow rate of coolant flowing through the cooler core 16.

In this embodiment, an inside blower control unit 60f is formed of configuration elements (hardware and software) to control the operation of the inside blower 54. The inside blower control unit 60f may be configured independent of the control device 60. The inside blower control unit 60f is a cooler-core adjustment unit (heat exchanger adjustment unit) that controls the flow rate of blast air passing through the cooler core 16. The inside blower 54 and the inside blower control unit 60f are air volume control units that control the volume of air which is blown out into the vehicle interior.

In this embodiment, an air conditioning switching control unit 60g is formed of configuration elements (hardware and software) to control the operation of various doors (the inside and outside air switching door 53, the air mix door 55, the outlet port mode door, and the like) disposed inside the case 51. The air-conditioning switching control unit 60g may be configured independent of the control device 60.

The air mix door 55 and the air-conditioning switching control unit 60g are air-volume ratio adjustment units which adjust an air volume ratio between the volume of blast air that has been cooled in the cooler core 16 and passes through the heater core 17 and the volume of blast air that has been cooled in the cooler core 16 and does not passes through the heater core 17.

The inside and outside air switching door 53 and the air-conditioning switching control unit 60g are inside air-to-outside air ratio adjustment units which adjust the ratio of inside air to outside air in air that is blown out into the vehicle interior.

An input side of the control device 60 receives detection signals from a group of sensors such as an inside air temperature sensor 61, an outside air temperature sensor 62, a solar insolation sensor 63, a first coolant temperature sensor 64, a second coolant temperature sensor 65, a heater core temperature sensor 66, and a refrigerant temperature sensor 67.

The inside air temperature sensor 61 is a detection unit (inside air-temperature detection unit) that detects an inside air temperature (vehicle interior temperature). The outside air temperature sensor 62 is a detection unit (outside air-temperature detection unit) that detects an outside air temperature (outside cabin temperature). The solar insolation sensor 63 is a detection unit (insolation detection unit) that detects an amount of solar radiation in the vehicle interior.

The first coolant temperature sensor 64 is a detection unit (first heat medium-temperature detection unit) that detects the temperature (for example, the temperature of coolant taken into the first pump 11) of coolant flowing through the first-pump flow path 31.

The second coolant temperature sensor 65 is a detection unit (second heat medium-temperature detection unit) that detects the temperature (for example, the temperature of coolant taken into the second pump 12) of coolant flowing through the second pump flow path 32.

The cooler-core temperature sensor 66 is a detection unit (cooler core-temperature detection unit) that detects the surface temperature of the cooler core 16. Examples of the cooler-core temperature sensor 66 include a fin thermistor 66a (refer to FIG. 1) that detects the temperature of the heat exchange fins of the cooler core 16, and a coolant temperature sensor 66b (refer to FIG. 1) that detects the temperature of coolant flowing through the cooler core 16.

The refrigerant temperature sensor 67 is a detection unit (refrigerant temperature detection unit) that detects the temperature (for example, the temperature of refrigerant discharged from the compressor 22) of the refrigerant of the refrigeration cycle 21.

The input side of the control device 60 receives operations signals from various air-conditioning operation switches which are provided in an operation panel 69 disposed in the vicinity of a dashboard panel in a front portion of the vehicle interior. An air conditioning switch, an automatic switch, air volume setting switch of the inside blower 52, a vehicle interior temperature setting switch, and the like are provided as the various air-conditioning operation switches provided in the operation panel 69.

The air conditioning switch is a switch that operates and stops (turns on and off) air conditioning (cooling or heating). The automatic switch is a switch that sets or releases the automatic control of air conditioning. The vehicle interior temperature setting switch is a target temperature setting unit that is operated by an occupant to set a target temperature in the vehicle interior.

Hereinafter, the operation of the aforementioned configuration components will be described. The control device 60 switches between various operating modes by controlling the operations of the first pump 11, the second pump 12, the first switching valve 18, the second switching valve 19, the compressor 22, the inside and outside air switching door 53, the air mix door 55, the outlet port mode door, and the like.

Figure 8:
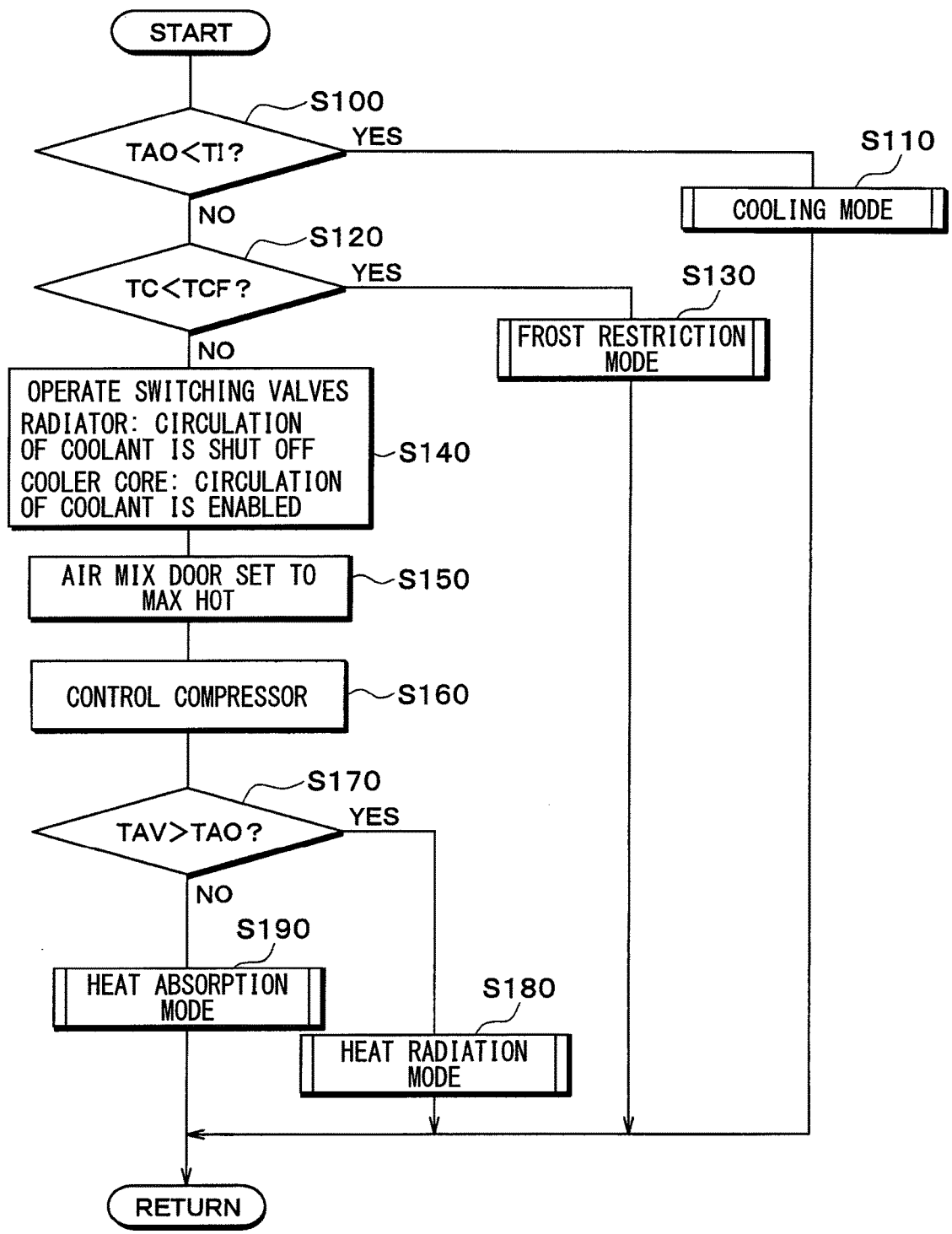
FIG. 8 is a flowchart illustrating a control process executed by a control device of the vehicle heat management system in the first embodiment.

The control device 60 executes a control process illustrated by a flowchart in FIG. 8. In step S100, it is determined whether a target blow-out air temperature TAO is lower than a cooler-core inflow air temperature TI.

The target blow-out air temperature TAO is calculated by Expression F1 below.

$$TAO=Kset*Tset-Kr*Tr-Kam*Tam-Ks*Ts+C \qquad \text{F1}$$

In Expression F1, Tset is a set inside air temperature that is set through the inside cabin temperature setting switch, and Tr is an inside-cabin temperature (inside air temperature) detected by the inside air temperature sensor 61. Tam is an outside air temperature detected by the outside air temperature sensor 62. Ts is the amount of solar radiation detected by the solar insolation sensor 63. Kset, Kr, Kam, and Ks are control gains. C is a correction constant.

The target blow-out air temperature TAO is equivalent to the amount of heat that has to be generated by the vehicle air conditioning apparatus so as to maintain the vehicle interior temperature at a desirable temperature, and the target blow-out air temperature TAO can be considered as an air-conditioning heat load (cooling load and heating load) that is demanded of the vehicle air conditioning apparatus. That is, when a demanded cooling load of the vehicle air conditioning apparatus is high, the target blow-out air temperature TAO is in a low temperature range, and when a demanded heating load of the vehicle air conditioning apparatus is high, the target blow-out air temperature TAO is in a high temperature range.

The cooler-core inflow air temperature TI is the temperature of blast air passing through the cooler core 16, and is calculated by Expression F2 below.

$$TI=Tr*0.01A+Tam*0.01(1-0.01A) \qquad \text{F2}$$

In Expression F2, A is the air volume ratio (inside air ratio) of inside air in percentage relative to outside air and inside air which are introduced into the case 51 through the inside air-to-outside air switching box 52. The cooler-core inflow air temperature TI may be directly detected by a dedicated temperature sensor.

Figure 9:
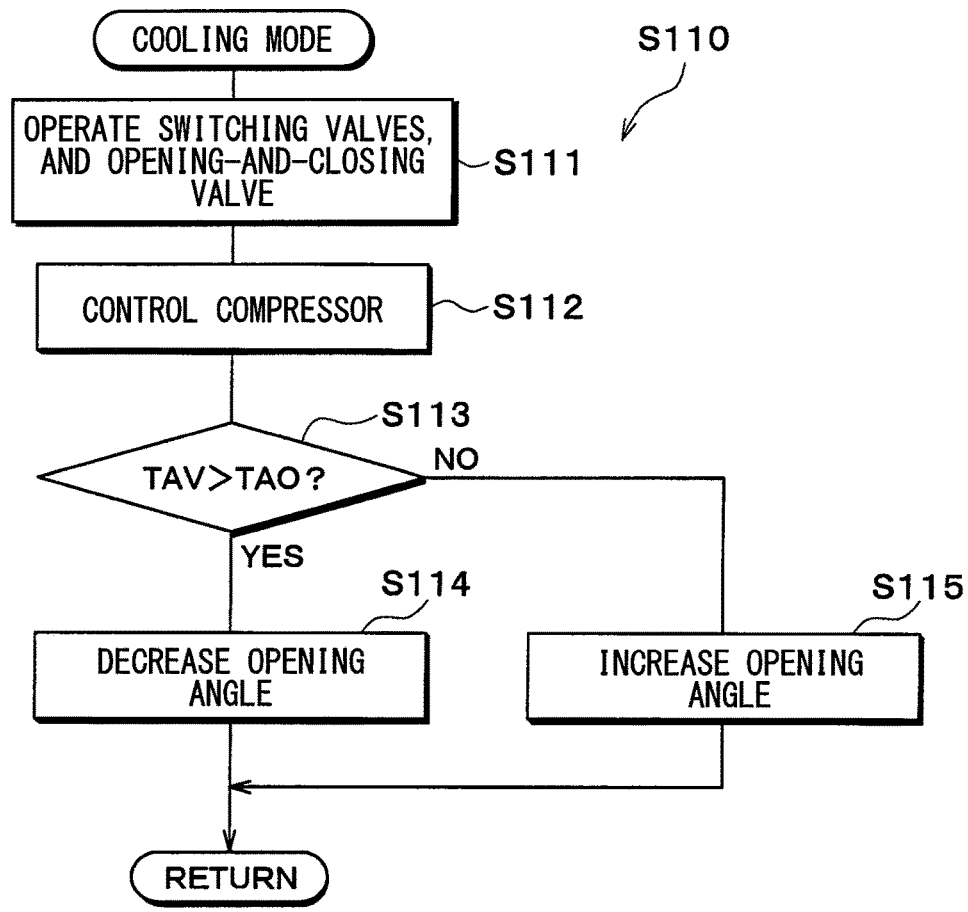
FIG. 9 is a flowchart illustrating a control process for a cooling mode of the vehicle heat management system in the first embodiment.

When it is determined in step S100 that the target blow-out air temperature TAO is lower than the cooler-core inflow air temperature TI, the process proceeds to step S110, and the mode transitions to a cooling mode. FIG. 9 illustrates a control process in the cooling mode.

Figure 10:
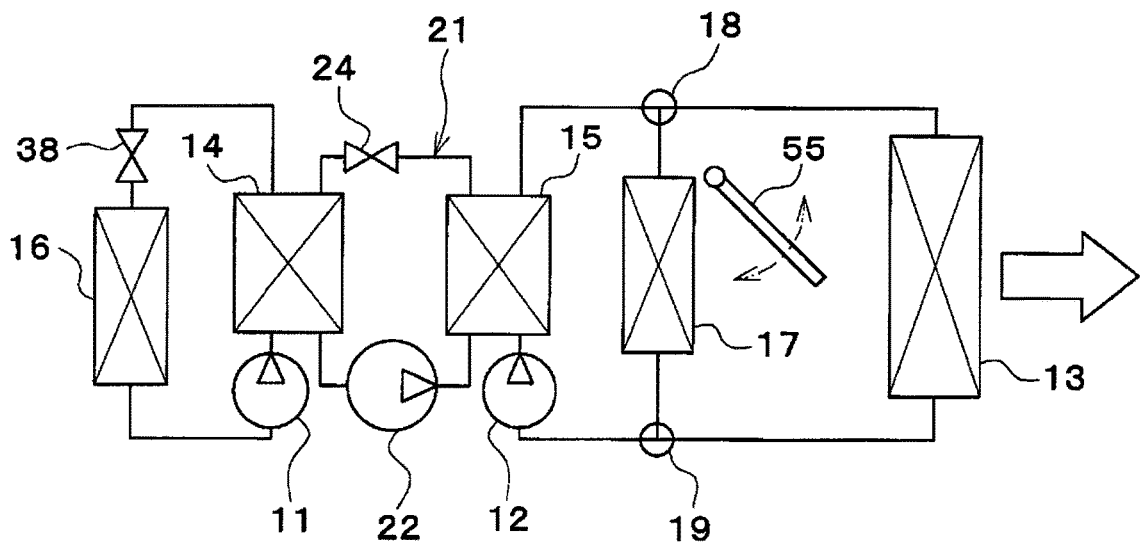
FIG. 10 is a diagram illustrating the coolant flow in the cooling mode of the vehicle heat management system in the first embodiment.

In step S111, the first switching valve 18 and the second switching valve 19 are switched such that the coolant flows as illustrated in the cooling mode in FIG. 10. Specifically, the first switching valve 18 and the second switching valve 19 are switched such that the coolant taken in and discharged by the second pump 12 circulates through the radiator 13.

In addition, in step S111, the opening-and-closing valve 38 is opened such that the coolant taken in and discharged by the first pump 11 circulates through the cooler core 16.

Accordingly, since the coolant cooled in the coolant cooler 14 flows through the cooler core 16, blast air into the vehicle interior is cooled in the cooler core 16, and since the coolant heated in the coolant heater 15 flows through the heater core 17 and the radiator 13, the blast air into the vehicle interior is heated in the heater core 17, and the coolant radiates heat to the outside air in the radiator 13.

In step S112, the refrigerant discharging capacity (specifically, the rotational speed of the compressor 22) of the compressor 22 is controlled in such a way that a surface temperature TC of the cooler core 16 approaches a target surface temperature (first target temperature) TCO. Specifically, when the surface temperature TC of the cooler core 16 is higher than or equal to the target surface temperature TCO, the rotational speed of the compressor 22 is increased, and thus the surface temperature TC of the cooler core 16 is decreased. In contrast, when the surface temperature TC of the cooler core 16 is lower than the target surface temperature TCO, the rotational speed of the compressor 22 is decreased, and thus the surface temperature TC of the cooler core 16 is increased.

In step S112, various temperatures (the temperature of blast air flowing from the cooler core 16, the temperature of coolant flowing through the cooler core 16, and the like) related to the surface temperature TC of the cooler core 16 may be used instead of the surface temperature TC of the cooler core 16.

It is determined in step S113 whether a blow-out air temperature TAV is higher than the target blow-out air temperature (second target temperature) TAO. The blow-out air temperature TAV is the temperature of air that is blown into the vehicle interior from the interior air conditioning unit 50, and is calculated by Expression F3 below.

$$TAV=TC*0.01(1-SW)+TH*0.01SW \qquad \text{F3}$$

In Expression F3, TC is the surface temperature of the cooler core 16, TH is the surface temperature of the heater core 17, and SW is an air volume ratio (the opening angle of the air mix door) of air flowing to the heater core 17 in percentage relative to blast air flowing from the cooler core 16.

The blow-out air temperature TAV may be detected by a dedicated temperature sensor. In step S113, various temperatures (the temperature of coolant flowing to the heater core 17, and the like) related to the blow-out air temperature TAV may be used instead of the blow-out air temperature TAV.

When it is determined in step S113 that the blow-out air temperature TAV is higher than the target blow-out air temperature TAO, the process proceeds to step S114, and the operation of the air mix door 55 is controlled such that the opening angle of the air mix door is decreased.

When it is determined in step S113 that the blow-out air temperature TAV is not higher than the target blow-out air temperature TAO, the process proceeds to step S115, and the operation of the air mix door 55 is controlled such that the opening angle of the air mix door is increased.

Accordingly, in the cooling mode, control is executed such that the blow-out air temperature TAV approaches the target blow-out air temperature TAO, and the vehicle interior is cooled.

When it is determined in step S100 illustrated in FIG. 8 that the target blow-out air temperature TAO is not lower than the cooler-core inflow air temperature TI, the process proceeds to step S120, and it is determined whether the surface temperature TC of the cooler core 16 is lower than a frost-critical temperature (predetermined temperature) TCF. The frost-critical temperature TCF is a critical temperature (for example, 0° C.) at which frost (frost formation) occurs on the cooler core 16. The temperature of blast air flowing from the cooler core 16 may be used instead of the surface temperature TC of the cooler core 16.

Figure 11:
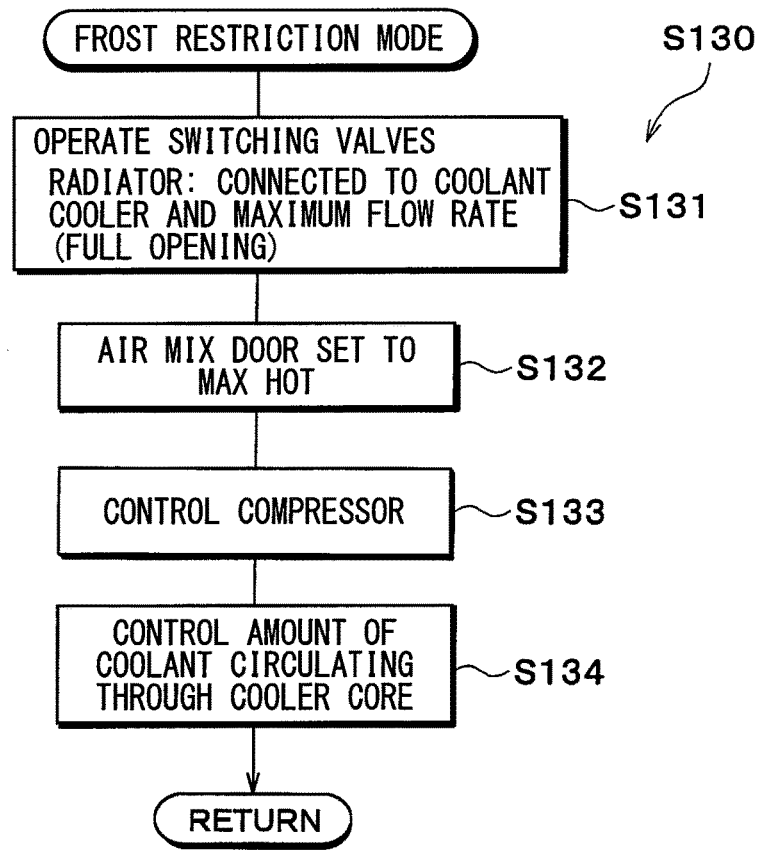
FIG. 11 is a flowchart illustrating a control process for a frost restriction mode of the vehicle heat management system in the first embodiment.

When it is determined that the surface temperature TC of the cooler core 16 is lower than the frost-critical temperature TCF, the process proceeds to step S130, and the mode transitions to a frost restriction mode. FIG. 11 illustrates a control process in the frost restriction mode.

Figure 12:
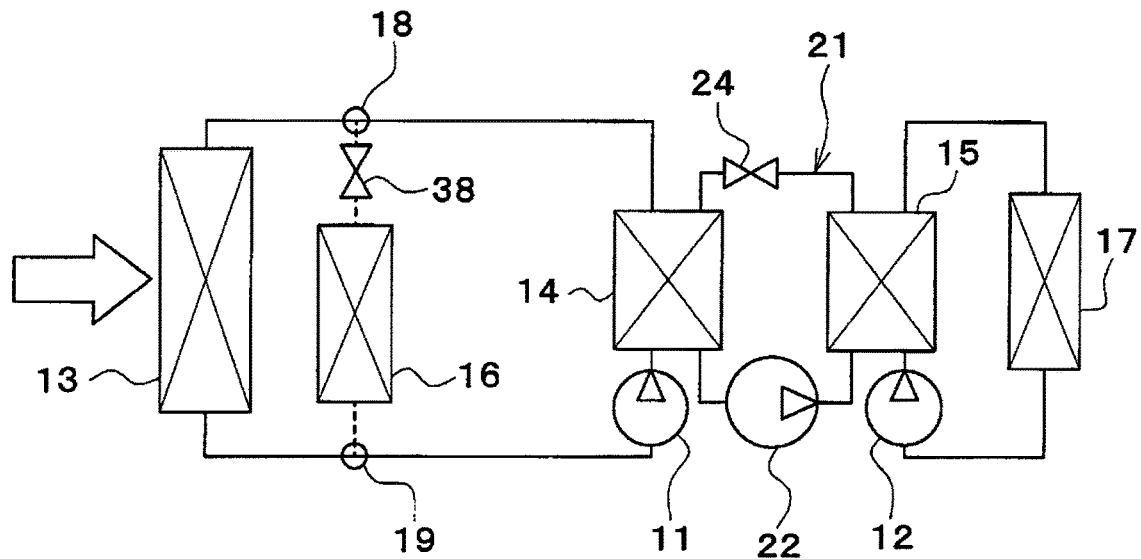
FIG. 12 is a diagram illustrating the coolant flow in the frost restriction mode of the vehicle heat management system in the first embodiment.

In step S131, the first switching valve 18 and the second switching valve 19 are switched such that the coolant flows as illustrated in the frost restriction mode in FIG. 12.

Specifically, the radiator 13 is connected to the coolant cooler 14. In other words, the first switching valve 18 and the second switching valve 19 are switched such that the coolant taken in and discharged by the first pump 11 circulates through the radiator 13. At this time, the first switching valve 18 and the second switching valve 19 fully open (open at the maximum opening angle) the radiator flow path 33 such that the flow rate of the coolant circulating through the radiator 13 becomes the maximum flow rate.

Accordingly, since the coolant cooled in the coolant cooler 14 flows through the radiator 13, the coolant absorbs heat from the outside air in the radiator 13, and since the coolant heated in the coolant heater 15 flows through the heater core 17, the blast air into the vehicle interior is heated in the heater core 17.

That is, in the frost restriction mode, the refrigerant of the refrigeration cycle 21 absorbs heat from the outside air in the radiator 13, and radiates heat to the coolant in the coolant heater 15. Accordingly, a heat pump operation, in which heat is drawn from the outside air, can be realized.

In step S132, the air mix door 55 is operated to a position indicative of the maximum heating state (MAX HOT). The position of the air mix door 55 indicative of the maximum heating state represents a position in which the heater core bypass passage 51a is fully closed. When the air mix door 55 is operated to the position indicative of the maximum heating state, the entire blast air flowing from the cooler core 16 passes through the heater core 17, and is heated.

A change in the refrigeration cycle (a change in the high-pressure refrigerant temperature or a change in the low-pressure refrigerant temperature) which is induced by environmental changes (a rapid change in the outside air temperature, or a change in the air volume passing through the radiator 13 mainly due to a change in vehicle speed) while the vehicle is used, may not be able to be controlled through the refrigerant flow rate control of the compressor 22. In this case, the blow-out air temperature is temporarily controlled through the control of the opening angle of the air mix door 55. The reason for this is that the control of the opening angle of the air mix door 55 has good responsiveness compared to the refrigerant flow rate control of the compressor 22.

In step S133, the refrigerant discharge capacity (specifically, the rotational speed of the compressor 22) of the compressor 22 is controlled in such a way that the blow-out air temperature TAV approaches the target blow-out air temperature (the second target temperature) TAO. Specifically, when the blow-out air temperature TAV is higher than or equal to the target blow-out air temperature TAO, the rotational speed of the compressor 22 is decreased, and thus the blow-out air temperature TAV is decreased. In contrast, when the blow-out air temperature TAV is lower than the target blow-out air temperature TAO, the rotational speed of the compressor 22 is increased, and thus the blow-out air temperature TAV is increased.

In step S133, various temperatures (the temperature of coolant flowing through the heater core 17 and the like) related to the blow-out air temperature TAV may be used instead of the blow-out air temperature TAV.

In step S134, the flow rate (cooler core-circulating coolant flow rate) of coolant flowing through the cooler core 16 is controlled by intermittently opening and closing the opening-and-closing valve 38 such that the surface temperature TC of the cooler core 16 approaches the target surface temperature (the first target temperature) TCO. The target surface temperature TCO of the cooler core 16 is set to be in a range of 0° C. to 10° C.

Specifically, when the surface temperature TC of the cooler core 16 is higher than or equal to the target surface temperature TCO, the coolant cooled in the coolant cooler 14 flows to the cooler core 16 by opening the opening-and-closing valve 38 such that the surface temperature TC of the cooler core 16 is decreased. In contrast, when the surface temperature TC of the cooler core 16 is lower than the target surface temperature TCO, the flow of coolant to the cooler core 16 is shut off by closing the opening-and-closing valve 38 such that the surface temperature TC of the cooler core 16 is increased.

Accordingly, the time mean flow rate of the coolant flowing through the cooler core 16 is adjusted in such a way that the surface temperature TC of the cooler core 16 approaches the target surface temperature TCO. As a result, condensate adhering to a surface of the cooler core 16 is restricted from freezing, and condensate adhering to the surface of the cooler core 16 is restricted from evaporating and causing foggy windows, or a nasty smell.

In step S134, various temperatures (the temperature of blast air flowing from the cooler core 16 and the like) related to the surface temperature TC of the cooler core 16 may be used instead of the surface temperature TC of the cooler core 16.

In step S134, the flow rate of the coolant flowing through the cooler core 16 may be adjusted by controlling the opening angle of the opening-and-closing valve 38 to an intermediate opening angle instead of intermittently opening and closing the opening-and-closing valve 38. The flow rate of the coolant flowing through the cooler core 16 may be adjusted by controlling the coolant discharge capacity (specifically, the rotational speed of the first pump 11) of the first pump In the frost restriction mode, the blast air cooled and dehumidified in the cooler core 16 is heated in the heater core 17, and is blown into the vehicle interior, and thus the vehicle interior can be dehumidified and heated.

In step S140 illustrated in FIG. 8, the first switching valve 18 and the second switching valve 19 are switched such that the flow of coolant to the radiator 13 is shut off (the circulation of coolant is shut off), and the opening-and-closing valve 38 are opened such that the coolant taken in and discharged by the first pump 11 circulates (the circulation of coolant is enabled) through the cooler core 16.

Accordingly, since the coolant cooled in the coolant cooler 14 flows through the cooler core 16, the coolant in the cooler core 16 absorbs heat from blast air into the vehicle interior, and since the coolant heated in the coolant heater 15 flows through the heater core 17, the blast air into the vehicle interior is heated in the heater core 17.

That is, the refrigerant of the refrigeration cycle 21 absorbs heat from the blast air into the vehicle interior in the cooler core 16, and radiates heat to the coolant in the coolant heater 15. Accordingly, a heat pump operation, in which heat is drawn from the blast air into the vehicle interior, can be realized.

In step S140, the first switching valve 18 and the second switching valve 19 may be operated in such a way that the flow rate of coolant flowing through the radiator 13 is lower than a predetermined flow rate.

In step S150, the air mix door 55 is operated to the position indicative of the maximum heating state (MAX HOT).

In step S160, the refrigerant discharging capacity (specifically, the rotational speed of the compressor 22) of the compressor 22 is controlled in such a way that the surface temperature TC of the cooler core 16 approaches the target surface temperature TCO. Specifically, when the surface temperature TC of the cooler core 16 is higher than or equal to the target surface temperature TCO, the rotational speed of the compressor 22 is increased, and thus the surface temperature TC of the cooler core 16 is decreased. In contrast, when the surface temperature TC of the cooler core 16 is lower than the target surface temperature TCO, the rotational speed of the compressor 22 is decreased, and thus the surface temperature TC of the cooler core 16 is increased.

In step S160, various temperatures (the temperature of blast air flowing from the cooler core 16 and the like) related to the surface temperature TC of the cooler core 16 may be used instead of the surface temperature TC of the cooler core 16.

In step S170, it is determined whether the blow-out air temperature TAV is higher than or equal to the target blow-out air temperature TAO. In step S170, various temperatures (the temperature of coolant flowing to the heater core 17 and the like) related to the blow-out air temperature TAV may be used instead of the blow-out air temperature TAV.

Figure 13:
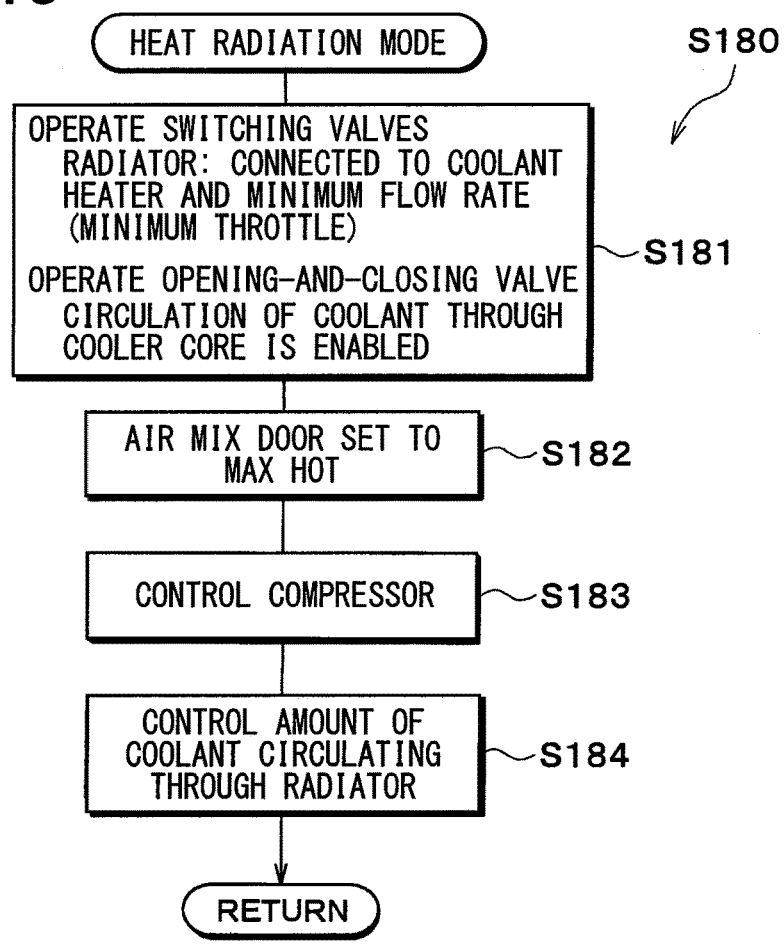
FIG. 13 is a flowchart illustrating a control process for a heat radiation mode of the vehicle heat management system in the first embodiment.

When it is determined that the blow-out air temperature TAV is higher than or equal to the target blow-out air temperature TAO, the process proceeds to step S180, and the mode transitions to a heat radiation mode. FIG. 13 illustrates a control process in the heat radiation mode.

Figure 14:
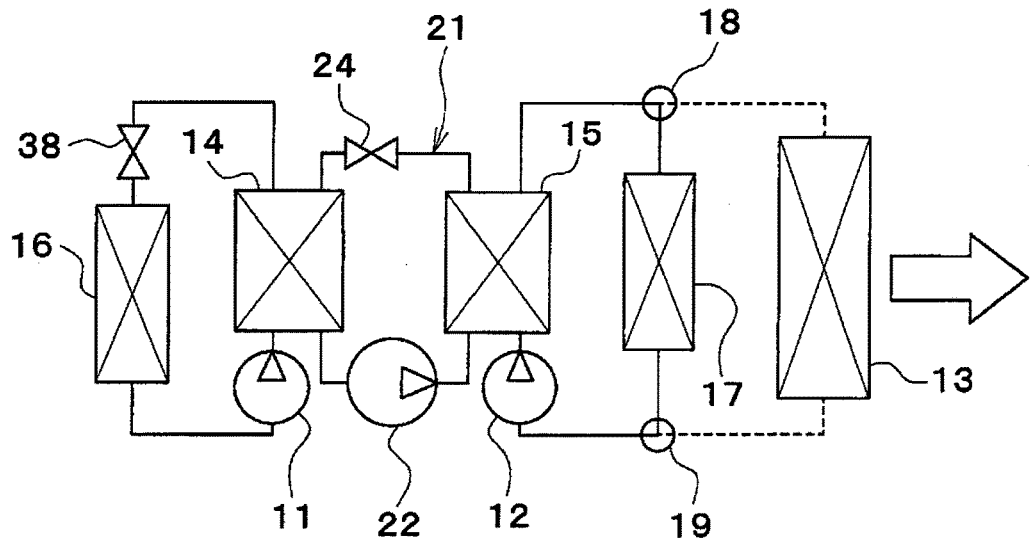
FIG. 14 is a diagram illustrating the coolant flow in the heat radiation mode of the vehicle heat management system in the first embodiment.

In step S181, the first switching valve 18 and the second switching valve 19 are switched such that the coolant flows as illustrated in the heat radiation mode in FIG. 14. Specifically, the radiator 13 is connected to the coolant heater 15. In other words, the first switching valve 18 and the second switching valve 19 are switched such that the coolant taken in and discharged by the second pump 12 circulates through the radiator 13. At this time, the first switching valve 18 and the second switching valve 19 throttle the radiator flow path 33 to the minimum amount of opening such that the flow rate of the coolant circulating through the radiator 13 becomes the minimum flow rate.

In addition, in step S181, the opening-and-closing valve 38 is opened such that the coolant taken in and discharged by the first pump 11 circulates (the circulation of coolant through the cooler core is enabled) through the cooler core 16.

Accordingly, since the coolant cooled in the coolant cooler 14 flows through the cooler core 16, the coolant in the cooler core 16 absorbs heat from blast air into the vehicle interior, and since the coolant heated in the coolant heater 15 flows through the heater core 17, the blast air into the vehicle interior is heated in the heater core 17. In addition, since the coolant heated in the coolant heater 15 flows through the radiator 13 at the minimum flow rate, the coolant radiates the minimum amount of heat to the outside air in the radiator 13.

That is, the refrigerant of the refrigeration cycle 21 absorbs heat from the blast air into the vehicle interior in the cooler core 16, and radiates heat to the coolant in the coolant heater 15. Accordingly, a heat pump operation, in which heat is drawn from the blast air into the vehicle interior, can be realized.

In step S182, the air mix door 55 is operated to the position indicative of the maximum heating state (MAX HOT). The position of the air mix door 55 indicative of the maximum heating state represents a position in which the heater core bypass passage 51*a* is fully closed. When the air mix door 55 is operated to the position indicative of the maximum heating state, the entire blast air flowing from the cooler core 16 passes through the heater core 17, and is heated.

A change in the refrigeration cycle (a change in the high-pressure refrigerant temperature or a change in the low-pressure refrigerant temperature) which is induced by environmental changes (a rapid change in the outside air temperature, or a change in the air volume or the like passing through the radiator 13 mainly due to a change in vehicle speed) while the vehicle is used, may not be able to be controlled through the refrigerant flow rate control of the compressor 22. In this case, the blow-out air temperature is temporarily controlled through the control of the opening angle of the air mix door 55. The reason for this is that the control of the opening angle of the air mix door 55 has good responsiveness compared to the refrigerant flow rate control of the compressor 22.

In step S183, the refrigerant discharging capacity (specifically, the rotational speed of the compressor 22) of the compressor 22 is controlled in such a way that the surface temperature TC of the cooler core 16 approaches the target surface temperature TCO. Specifically, when the surface temperature TC of the cooler core 16 is higher than or equal to the target surface temperature TCO, the rotational speed of the compressor 22 is increased, and thus the surface temperature TC of the cooler core 16 is decreased. In contrast, when the surface temperature TC of the cooler core 16 is lower than the target surface temperature TCO, the rotational speed of the compressor 22 is decreased, and thus the surface temperature TC of the cooler core 16 is increased.

In step S183, various temperatures (the temperature of blast air flowing from the cooler core 16 and the like) related to the surface temperature TC of the cooler core 16 may be used instead of the surface temperature TC of the cooler core 16.

In step S184, the flow rate (radiator-circulating coolant flow rate) of coolant circulating through the radiator 13 is controlled in such a way that the blow-out air temperature TAV approaches the target blow-out air temperature TAO.

Specifically, when the blow-out air temperature TAV is higher than or equal to the target blow-out air temperature TAO, the first switching valve 18 and the second switching valve 19 are operated in such a way that the opening of the radiator flow path 33 is increased by a predetermined amount. Accordingly, the flow rate of the coolant circulating through the radiator 13 is increased, and the blow-out air temperature TAV is decreased. In contrast, when the blow-out air temperature TAV is lower than the target blow-out air temperature TAO, the first switching valve 18 and the second switching valve 19 are operated in such a way that the opening of the radiator flow path 33 is decreased by a predetermined amount. Accordingly, the flow rate of the coolant circulating through the radiator 13 is decreased, and the blow-out air temperature TAV is increased.

As a result, the flow rate of the coolant circulating through the radiator 13 is adjusted in such a way that the blow-out air temperature TAV approaches the target blow-out air temperature TAO, and the vehicle interior is heated.

In step S184, various temperatures (the temperature of coolant flowing to the heater core 17 and the like) related to the blow-out air temperature TAV may be used instead of the blow-out air temperature TAV.

In step S184, the first switching valve 18 and the second switching valve 19 may intermittently open and close the radiator flow path 33 rather than increasing and decreasing the opening of the radiator flow path 33 by the predetermined amount each time such that the time mean flow rate of the coolant circulating through the radiator 13 is adjusted. The flow rate of the coolant circulating through the radiator 13 may be adjusted by controlling the coolant discharge capacity (specifically, the rotational speed of the second pump 12) of the first pump 12.

In step S184, the flow rate of the outside air passing through the radiator 13 may be adjusted instead of adjusting the flow rate of the coolant circulating through the radiator 13. Specifically, the flow rate of the outside air passing through the radiator 13 may be adjusted by controlling the operation of the outside blower 20.

In the heat radiation mode, the blast air cooled and dehumidified in the cooler core 16 is heated in the heater core 17, and is blown into the vehicle interior, and thus the vehicle interior can be dehumidified and heated.

In the heat radiation mode, surplus heat, which is a portion of heat absorbed by the coolant in the cooler core 16 from the blast air into the vehicle interior, and is not used in the heating of the vehicle interior, is radiated to the outside air in the radiator 13, and thus the vehicle interior can be prevented from being excessively heated.

Figure 15:
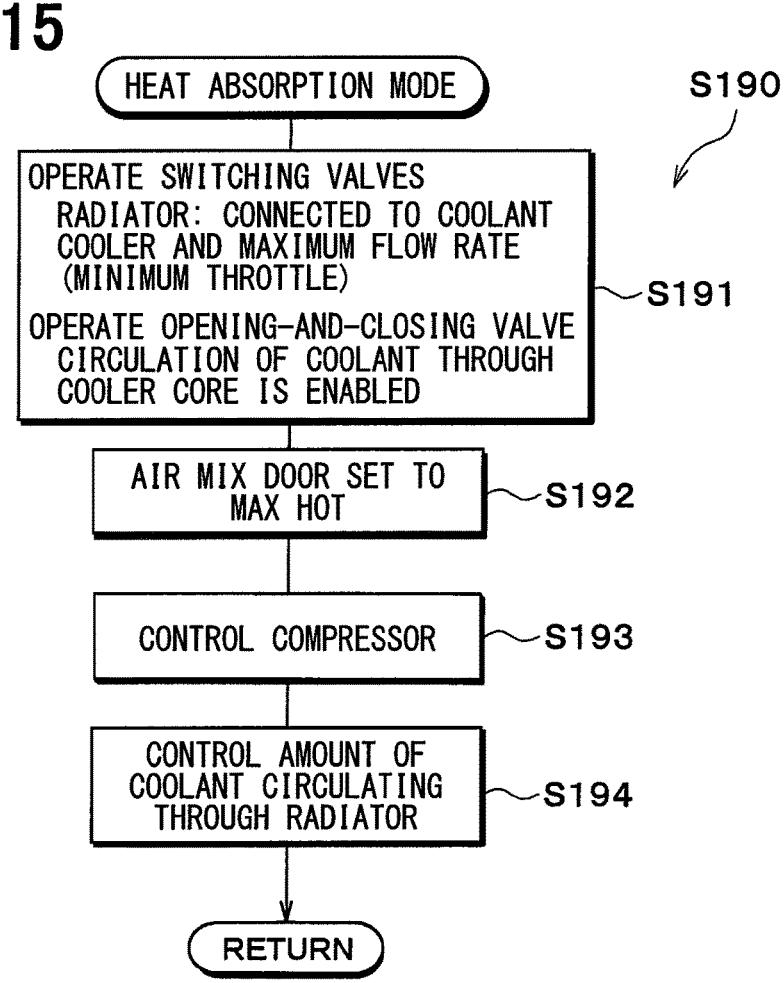
FIG. 15 is a flowchart illustrating a control process for a heat absorption mode of the vehicle heat management system in the first embodiment.

When it is determined in step S170 that the blow-out air temperature TAV is not higher than the target blow-out air temperature TAO, the process proceeds to step S190, and the mode transitions to a heat absorption mode. FIG. 15 illustrates a control process in the heat absorption mode.

Figure 16:
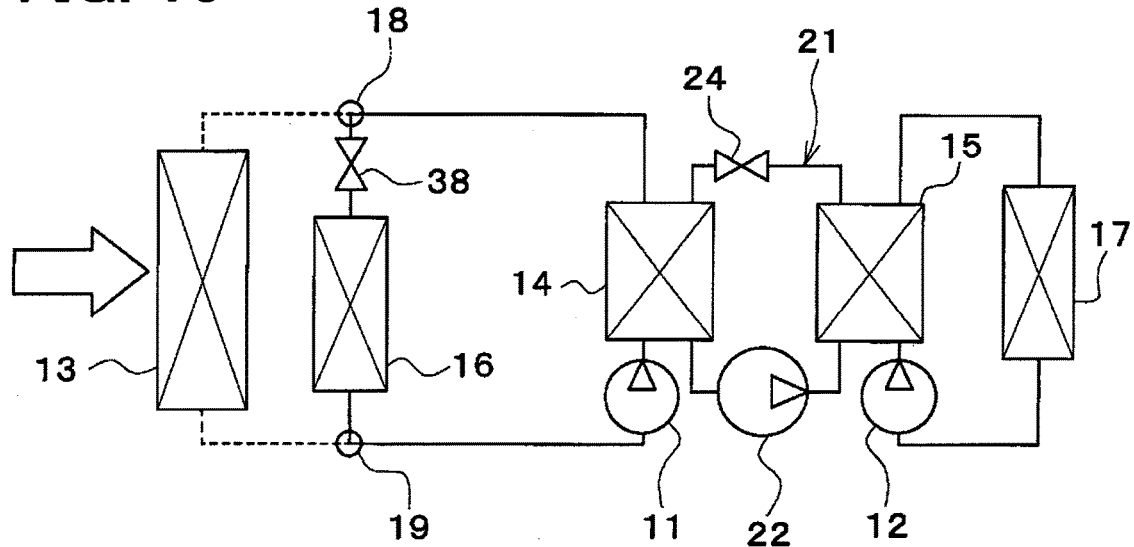
FIG. 16 is a diagram illustrating the coolant flow in the heat absorption mode of the vehicle heat management system in the first embodiment.

In step S191, the first switching valve 18 and the second switching valve 19 are switched such that the coolant flows as illustrated in the heat absorption mode in FIG. 16. Specifically, the radiator 13 is connected to the coolant cooler 14. In other words, the first switching valve 18 and the second switching valve 19 are switched such that the coolant taken in and discharged by the first pump 11 circulates through the radiator 13. At this time, the first switching valve 18 and the second switching valve 19 throttle the radiator flow path 33 to the minimum amount of opening such that the flow rate of the coolant circulating through the radiator 13 becomes the minimum flow rate.

In addition, in step S191, the opening-and-closing valve 38 is opened such that the coolant taken in and discharged by the first pump 11 circulates (the circulation of coolant through the cooler core is enabled) through the cooler core 16.

Accordingly, since the coolant cooled in the coolant cooler 14 flows through the cooler core 16, the coolant in the cooler core 16 absorbs heat from blast air into the vehicle interior, since the coolant cooled in the coolant cooler 14 flows through the radiator 13 at the minimum flow rate, the minimum amount of heat is absorbed to the coolant from the outside air in the radiator 13, and since the coolant heated in the coolant heater 15 flows through the heater core 17, the blast air into the vehicle interior is heated in the heater core 17.

That is, the refrigerant of the refrigeration cycle 21 absorbs heat from the blast air into the vehicle interior in the cooler core 16, and absorbs heat from the outside air in the radiator 13, and radiates heat to the coolant in the coolant heater 15. Accordingly, a heat pump operation, in which heat is drawn from the blast air into the vehicle interior and the outside air, can be realized.

In step S192, the air mix door 55 is operated to the position indicative of the maximum heating state (MAX HOT). The position of the air mix door 55 indicative of the maximum heating state represents a position in which the heater core bypass passage 51a is fully closed. When the air mix door 55 is operated to the position indicative of the maximum heating state, the entire blast air flowing from the cooler core 16 passes through the heater core 17, and is heated.

A change in the refrigeration cycle (a change in the high-pressure refrigerant temperature or a change in the low-pressure refrigerant temperature), which is induced by environmental changes (a rapid change in the outside air temperature, or a change in the air volume or the like passing through the radiator 13 mainly due to a change in vehicle speed) while the vehicle is used, may not be able to be controlled through the refrigerant flow rate control of the compressor 22. In this case, the blow-out air temperature is temporarily controlled through the control of the opening angle of the air mix door 55. The reason for this is that the control of the opening angle of the air mix door 55 has good responsiveness compared to the refrigerant flow rate control of the compressor 22.

In step S193, the refrigerant discharging capacity (specifically, the rotational speed of the compressor 22) of the compressor 22 is controlled in such a way that the blow-out air temperature TAV approaches the target blow-out air temperature TAO. Specifically, when the blow-out air temperature TAV is higher than or equal to the target blow-out air temperature TAO, the rotational speed of the compressor 22 is decreased, and thus the blow-out air temperature TAV is decreased. In contrast, when the blow-out air temperature TAV is lower than the target blow-out air temperature TAO, the rotational speed of the compressor 22 is increased, and thus the blow-out air temperature TAV is increased.

In step S193, various temperatures (the temperature of coolant flowing to the heater core 17 and the like) related to the blow-out air temperature TAV may be used instead of the blow-out air temperature TAV.

In step S194, the flow rate of the coolant circulating (the radiator-circulating coolant flow rate) through the radiator 13 is controlled in such a way that the surface temperature TC of the cooler core 16 approaches the target surface temperature TCO.

Specifically, when the surface temperature TC of the cooler core 16 is higher than or equal to the target surface temperature TCO, the first switching valve 18 and the second switching valve 19 are operated in such a way that the opening of the radiator flow path 33 is decreased by a predetermined amount. Accordingly, the flow rate of the coolant circulating through the radiator 13 is decreased, and the surface temperature TC of the cooler core 16 is decreased. In contrast, when the surface temperature TC of the cooler core 16 is lower than the target surface temperature TCO, the first switching valve 18 and the second switching valve 19 are operated in such a way that the opening of the radiator flow path 33 is decreased by a predetermined amount. Accordingly, the flow rate of the coolant circulating through the radiator 13 is increased, and the surface temperature TC of the cooler core 16 is increased.

As a result, the flow rate of the coolant circulating through the radiator 13 is adjusted in such a way that the surface temperature TC of the cooler core 16 approaches the target surface temperature TCO, and the freezing and the evaporation of condensate adhering to the surface of the cooler core 16 are restricted.

In step S194, various temperatures (the temperature of blast air flowing from the cooler core 16 and the like) related to the surface temperature TC of the cooler core 16 may be used instead of the surface temperature TC of the cooler core 16.

In step S194, the first switching valve 18 and the second switching valve 19 may intermittently open and close the radiator flow path 33 rather than increasing and decreasing the opening of the radiator flow path 33 by the predetermined amount each time such that the time mean flow rate of the coolant circulating through the radiator 13 is adjusted. The flow rate of the coolant circulating through the radiator 13 may be adjusted by controlling the coolant discharge capacity (specifically, the rotational speed of the first pump 11) of the first pump 11.

In step S194, the flow rate of the outside air passing through the radiator 13 may be adjusted instead of adjusting the flow rate of the coolant circulating through the radiator 13. Specifically, the flow rate of the outside air passing through the radiator 13 may be adjusted by controlling the operation of the outside blower 20.

In the heat absorption mode, the blast air cooled and dehumidified in the cooler core 16 is heated in the heater core 17, and is blown into the vehicle interior, and thus the vehicle interior can be dehumidified and heated.

In the heat absorption mode, both of heat absorbed by the coolant in the cooler core 16 from the blast air into the vehicle interior, and heat absorbed by the coolant from the outside air in the radiator 13 can be used as heat sources for heating the blast air which has been cooled and dehumidified in the cooler core 16, in the heater core 17, and thus the vehicle interior can be heated at a high heating capacity compared to the heat radiation mode.

In the heat absorption mode, the flow rate of the coolant circulating the radiator 13 is adjusted, and the flow rate of the coolant flowing through the cooler core 16 is not adjusted, and thus the flow rate of the coolant flowing through the cooler core 16 can be increased compared to that in the frost restriction mode in which the flow rate of the coolant flowing through the cooler core 16 is adjusted. For this reason, the cooling capacity (dehumidification capacity) of the cooler core 16 can be increased compared to that in the frost restriction mode.

In this embodiment, in the heat absorption mode and the heat radiation mode, the control device 60 adjusts the flow rate of at least one of the coolant and the outside air flowing through the radiator 13 in such a way that the temperature TC, which is related to the temperature of blast air cooled in the cooler core 16, approaches the first target temperature TCO. Accordingly, in the heat absorption mode and the heat radiation mode, the temperature of the cooler core 16 can be properly controlled.

The control device 60 may adjust the flow rate of at least one of the coolant and the outside air flowing through the radiator 13 in such a way that the temperatures TH and TAV, which are related to the temperature of blast air heated in the heater core 17, approach the first target temperatures THO and TAO.

That is, the control device 60 may adjust the flow rate of the heat medium flowing through the heat transfer device 13 in such a way that the temperatures TC, TH, and TAV, which are related to the temperature of blast air which has been adjusted by the heat medium-to-air heat exchangers 16 and 17, approach the first target temperatures TCO, THO, and TAO.

In this embodiment, in the heat absorption mode, the control device 60 adjusts the flow rate of at least one of the coolant and the outside air flowing through the radiator 13 in such a way that the temperature TC, which is related to the temperature of blast air cooled in the cooler core 16, approaches the first target temperature TCO, and the control device 60 adjusts the flow rate of refrigerant discharged from the compressor 22 in such a way that temperatures related to the blow-out air temperatures TH and TAV approach the second target temperatures THO and TAO.

Accordingly, in the heat absorption mode, the surface temperature of the cooler core 16 and the vehicle interior blow-out air temperature can be properly controlled.

The temperature which is related to the temperature of blast air cooled in the cooler core 16 represents the temperature of blast air cooled in the cooler core 16, a temperature related to the surface temperature TC of the cooler core 16, a temperature related to the temperature of coolant flowing through the cooler core 16, or the like.

The temperatures related to the blow-out air temperature TAV represents temperatures related to the temperature of air to be blown out into the vehicle interior, the temperature of which has been adjusted in at least one heat exchanger of the cooler core 16 and the heater core 17. Specifically, the temperatures related to the blown out air temperature TAV represent the temperature TAV of mixed air which is a mixture of the blast air passing through the heater core 17 and the blast air not passing through the heater core 17, the temperature TH of blast air heated in the heater core 17, the temperature of heat medium flowing into the heater core 17, the temperature of blast air not passing through the heater core 17, and the like.

The first target temperature TCO is preferably set to a temperature in a temperature range in which frost does not occur in the cooler core 16, and condensate adhering to the surface of the cooler core 16 does not evaporate. In this embodiment, the target surface temperature TCO of the cooler core 16 is used as the first target temperature TCO.

The second target temperature TAO is preferably set to a blow-out air temperature that has to be achieved by the vehicle air conditioning apparatus so as to maintain the inside the vehicle interior temperature at a desirable temperature. In this embodiment, the target blow-out air temperature TAO is used as the second target temperature TAO.

In this embodiment, in the heat radiation mode, the control device 60 adjusts the flow rate of the refrigerant discharged from the compressor 22 in such a way that the temperature TC, which is related to the temperature of the blast air cooled in the cooler core 16, approaches the second target temperature TCO, and adjusts the flow rate of at least one of the coolant and the outside air flowing through the radiator 13 in such a way that the temperature related to the blow-out air temperature TAV approaches the first target temperature TAO.

Accordingly, in the heat radiation mode, the surface temperature of the cooler core 16 and the vehicle interior blow-out air temperature can be properly controlled.

In this embodiment, in the frost restriction mode, the control device 60 adjusts the flow rate of the coolant flowing through the cooler core 16 in such a way that the temperature TC, which is related to the temperature of the blast air cooled in the cooler core 16, approaches the first target temperature TCO. Accordingly, in the frost restriction mode, the temperature of the cooler core 16 can be properly controlled.

The control device 60 may adjust the flow rate of the coolant flowing through the heater core 17 in such a way that the temperatures TH and TAV, which are related to the temperature of blast air heated in the heater core 17, approach the first target temperatures THO and TAO.

That is, the control device 60 may adjust the flow rate of the heat medium flowing through the heat transfer device 13 in such a way that the temperatures TC, TH, and TAV, which are related to the temperature of blast air which has been adjusted by the heat medium-to-air heat exchangers 16 and 17, approach the first target temperatures TCO, THO, and TAO.

In this embodiment, in the frost restriction mode, the control device 60 adjusts the flow rate of the coolant flowing through the cooler core 16 in such a way that the temperature TC, which is related to the temperature of the blast air cooled in the cooler core 16, approaches the first target temperature TCO. The compressor control unit 60d adjusts the flow rate of the refrigerant discharged from the compressor 22 in such a way that the temperatures related to the blow-out air temperatures TH and TAV approach the second target temperatures THO and TAO.

Accordingly, in the frost restriction mode, the surface temperature of the cooler core 16 and the vehicle interior blow-out air temperature can be properly controlled.

In this embodiment, in the cooling mode, the control device 60 adjusts the flow rate of the refrigerant discharged from the compressor 22 in such a way that the temperature TC, which is related to the temperature of the blast air cooled in the cooler core 16, approaches the first target temperature TCO, and adjusts an air volume ratio between the volume of blast air which has been cooled in the cooler core 16 and passes through the heater core 17, and the volume of blast air which has been cooled in the cooler core 16 and does not pass through the heater core 17, in such a way that the temperature related to the blow-out air temperature TAV approaches the second target temperature TAO.

Accordingly, in the cooling mode, the surface temperature of the cooler core 16 and the vehicle interior blow-out air temperature can be properly controlled.

In addition, in the cooling mode, the control device 60 may adjust the flow rate of at least one of the coolant and the outside air which flow through the radiator 13.

In this manner, the capacity of heat radiation from the coolant to the outside air in the radiator 13 can be controlled, and thus the temperature of the blown out air from the heater core 17 can be stabilized, and controllability of the blow-out air temperature TAV can be improved. When the flow rate of at least one of the coolant and the outside air flowing through the radiator 13 is reduced, a change in the blow-out air temperature, which is induced by environmental changes (a rapid change in the outside air temperature, or a change in the amount of air passing through the radiator 13 mainly due to a change in vehicle speed) while the vehicle is used, can be reduced.

In this embodiment, in the heat radiation mode, when it is determined that the flow rate of the coolant or the outside air flowing through the radiator 13 is lower than a predetermined flow rate, and the blow-out air temperature TAV is lower than the second target temperature TAO, the first switching valve 18 and the second switching valve 19 are switched such that the coolant cooled in the coolant cooler 14 flows to the radiator 13. The control device 60 adjusts the flow rate of at least one of the coolant and the outside air flowing through the radiator 13 in such a way that the temperature TC, which is related to the temperature of the blast air cooled in the cooler core 16, approaches the first target temperature TCO, and adjusts the flow rate of the refrigerant discharged from the compressor 22 in such a way that the temperature related to the blow-out air temperature TAV approaches the second target temperature TAO.

Accordingly, when the amount of heat is insufficient for heating in the heat radiation mode, the mode is switched to the heat absorption mode, and the amount of heat can be ensured for heating.

In the heat radiation mode, when it is determined that the flow rate of the coolant or the outside air flowing through the radiator 13 is lower than the predetermined flow rate, and the temperature related to the blow-out air temperature TAV is lower than the second target temperature TAO, the first switching valve 18 and the second switching valve 19 may be switched such that the mode is switched to a state in which the coolant heated in the condenser 15 does not flow to the radiator 13, and then is switched to the heat absorption mode.

In this embodiment, in the heat absorption mode, when it is determined that the flow rate of the coolant or the outside air flowing through the radiator 13 is lower than the predetermined flow rate, and the blow-out air temperature TAV is higher than or equal to the second target temperature TAO, the first switching valve 18 and the second switching valve 19 are switched such that the coolant heated in the condenser 15 flows to the radiator 13. The control device 60 adjusts the flow rate of the refrigerant discharged from the compressor 22 in such a way that the temperature TC, which is related to the temperature of the blast air cooled in the cooler core 16, approaches the first target temperature TCO, and adjusts the flow rate of at least one of the coolant and the outside air flowing through the radiator 13 in such a way that the temperature related to the blow-out air temperature TAV approaches the second target temperature TAO.

Accordingly, when the amount of heat is excessive for heating in the heat absorption mode, the mode is switched to the heat radiation mode, and heat can be radiated to the outside air in the radiator 13.

In the heat absorption mode, when it is determined that the flow rate of the coolant or the outside air flowing through the radiator 13 is lower than the predetermined flow rate, and the temperature related to the blow-out air temperature TAV is higher than or equal to the second target temperature TAO, the first switching valve 18 and the second switching valve 19 may be switched such that the coolant cooled in the coolant cooler 14 does not flow to the radiator 13, and then the mode is switched to the heat radiation mode.

In this embodiment, in the heat radiation mode, when it is determined that the target blow-out air temperature TAO is lower than the temperature TI of the blast air flowing into the cooler core 16, the control device 60 adjusts an air volume ratio between the volume of blast air which has been cooled in the cooler core 16 and passes through the heater core 17, and the volume of blast air which has been cooled in the cooler core 16 and does not pass through the heater core 17, in such a way that the temperature related to the blow-out air temperature TAV approaches the second target temperature TAO.

Accordingly, when cooling is required in the heat radiation mode, the mode is switched to the cooling mode, and cooling can be properly performed.

In the heat radiation mode, when it is determined that the target blow-out air temperature TAO is lower than the temperature TI of the blast air flowing into the cooler core 16, the first pump 11, the second pump 12, the first switching valve 18, and the second switching valve 19 may be operated in such a way that a time flow rate of the coolant which has been heated in the coolant heater 15 and flows through the radiator 13 is increased.

In this embodiment, in the heat absorption mode, when it is determined that the temperature TC, which is related to the temperature of the blast air cooled in the cooler core 16, is lower than the predetermined temperature TCF, the control device 60 adjusts at least one of the flow rate and the temperature of the coolant flowing through the cooler core

16 in such a way that the temperature related to the surface temperature TC of the cooler core 16 approaches the first target temperature TCO.

Accordingly, when frost (frost formation) is highly likely to occur in the cooler core 16 in the heat absorption mode, the mode is switched to the frost restriction mode, and frost can be restricted from occurring in the cooler core 16.

In this embodiment, in the frost restriction mode, when it is determined that the temperature TC, which is related to the temperature of the blast air cooled in the cooler core 16, is higher than equal to the predetermined temperature TCF, the control device 60 adjusts the flow rate of at least one of the coolant and the outside air flowing through the radiator 13 in such a way that the temperature related to the surface temperature TC of the cooler core 16 approaches the first target temperature TCO.

Accordingly, when frost (frost formation) is unlikely to occur in the cooler core 16 in the frost restriction mode, the mode is switched to the heat absorption mode, and heating can be properly performed.

In this embodiment, in the cooling mode, when it is determined that the target blow-out air temperature TAO is higher than or equal to the temperature TI of the blast air flowing into the cooler core 16, the control device 60 adjusts the flow rate of at least one of the coolant and the outside air flowing through the radiator 13 in such a way that the temperature related to the blow-out air temperature TAV approaches the second target temperature TAO.

Accordingly, when heating is required in the cooling mode, the mode is switched to the heat radiation mode, and heating can be properly performed.

In the cooling mode, when it is determined that the target blow-out air temperature TAO is lower than the temperature TI of the blast air flowing into the cooler core 16, the first switching valve 18 and the second switching valve 19 may be switched such that the coolant heated in the condenser 15 does not flow to the radiator 13, and then the mode is switched to the heat radiation mode.

In this embodiment, in the heat absorption mode and the heat radiation mode, the control device 60 operates in such a way that the coolant intermittently flows to the radiator 13. Accordingly, the time mean flow rate of the coolant flowing through the radiator 13 can be adjusted.

In this embodiment, in the frost restriction mode, the control device 60 operates in such a way that the coolant intermittently flows to the cooler core 16. Accordingly, the time mean flow rate of the coolant flowing through the cooler core 16 can be adjusted.

In the heat absorption mode and the heat radiation mode, the first switching valve 18, the second switching valve 19, and the switching valve control unit 60b may operate to adjust the opening of the radiator flow path 33. Accordingly, each of the first switching valve 18 and the second switching valve 19 is capable of adjusting the flow rate of the coolant flowing through the radiator 13.

In the frost restriction mode, the control device 60 may operate to adjust the opening of the cooler-core flow path 36. Accordingly, the flow rate of the coolant flowing through the cooler core 16 can be adjusted.

In the heat absorption mode and the heat radiation mode, the control device 60 may adjust the flow rate of the coolant discharged from the first pump 11 or the second pump 12. Accordingly, each of the first switching valve 18 and the second switching valve 19 is capable of adjusting the flow rate of the coolant flowing through the radiator 13.

In the frost restriction mode, the pump control unit 60a may adjust the flow rate of the coolant discharged from the first pump 11 and the second pump 12. Accordingly, the flow rate of the coolant flowing through the cooler core 16 can be adjusted.

In the heat absorption mode and the heat radiation mode, the control device 60 may adjust the flow rate of the outside air to be blown by the outside air blower 20. Accordingly, the flow rate of the outside air flowing through the radiator 13 can be adjusted.

In this embodiment, the cooler core 16 is provided with at least one flow path 163 through which the coolant flows from a lower side to an upper side in the direction of gravity. Accordingly, frost (frost formation) can be restricted from occurring in the cooler core 16.

In this embodiment, the cooler core 16 is provided with the flow path 163 of the coolant, through which the coolant flows from the downstream side of the air flowing direction to the upstream side. Accordingly, frost (frost formation) can be restricted from occurring in the cooler core 16.

(Second Embodiment)

In the frost restriction mode, the flow rate of coolant flowing through the cooler core 16 is controlled in the first embodiment. In contrast, in the frost restriction mode, the temperature of coolant flowing through the cooler core 16 is controlled in this embodiment.

Figure 17:
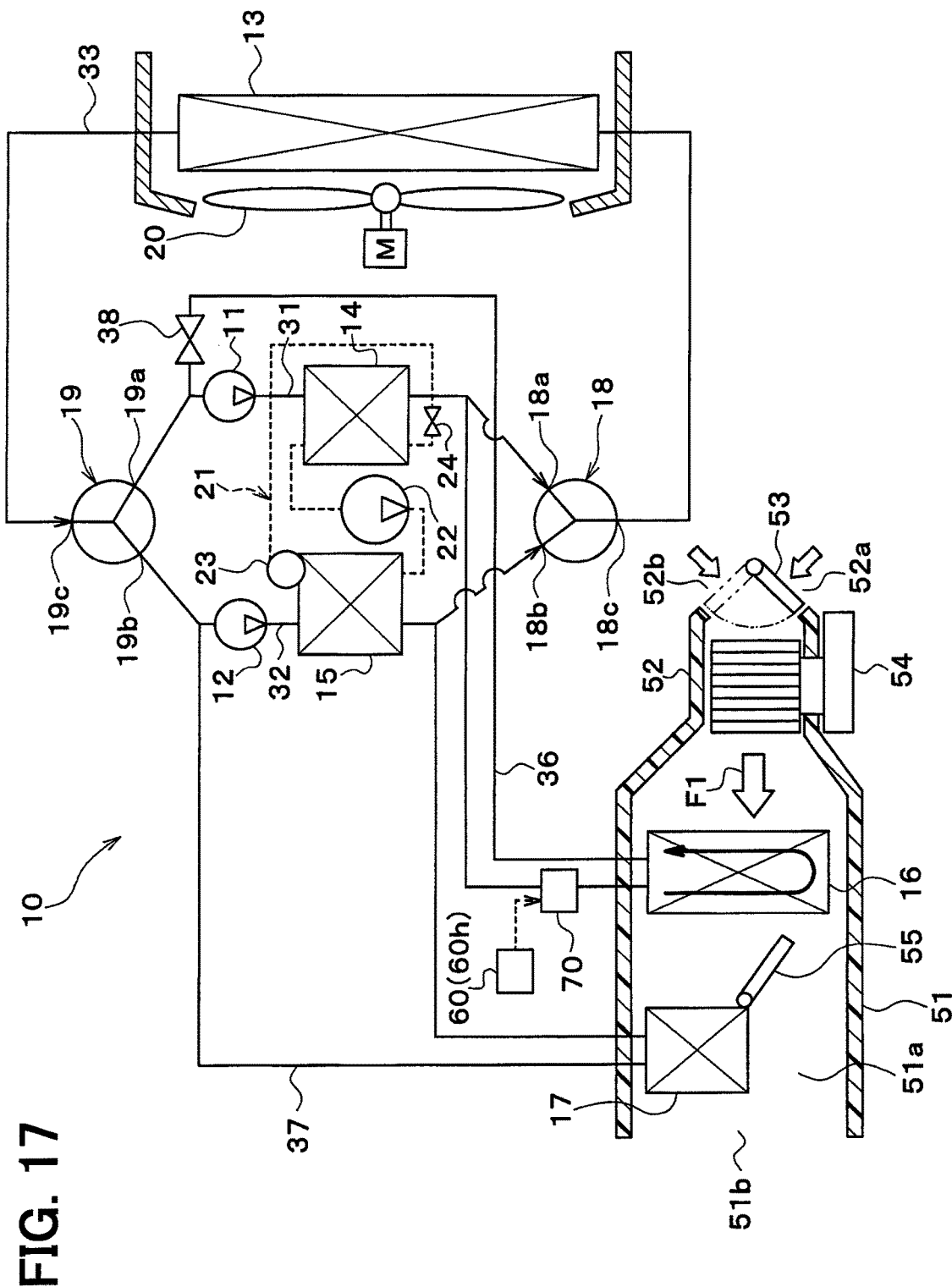
FIG. 17 is a diagram illustrating the entire configuration of the vehicle heat management system in a second embodiment.

As illustrated in FIG. 17, an electric heater 70 is disposed on the cooler-core flow path 36. The electric heater 70 is a heat generator that generates heat from supplied electrical power. The coolant flowing through the cooler-core flow path 36 is heated by heat generated by the electric heater 70. The operation of the electric heater 70 is controlled by the control device 60.

In this embodiment, an electric heater control unit 60h is formed of configuration elements (hardware and software) of the control device 60 to control the operation of the electric heater 70. The electric heater control unit 60h may be configured independent of the control device 60. The electric heater 70 and the electric heater control unit 60h are cooler-core adjustment units (heat exchanger adjustment unit, air-cooling adjustment unit) which adjust the temperature of coolant flowing through the cooler core 16.

In the frost restriction mode, the electric heater 70 heats the coolant such that the temperature of the coolant flowing through the cooler core 16 can be increased.

In this embodiment, in the frost restriction mode, the control device 60 adjusts the temperature of the coolant flowing through the cooler core 16 in such a way that the temperature related to the surface temperature TC of the cooler core 16 approaches the first target temperature TCO. The control device 60 adjusts the flow rate of the coolant discharged from the compressor 22 in such a way that the temperature related to the blow-out air temperature TAV approaches the second target temperature TAO.

Accordingly, in the frost restriction mode, the surface temperature of the cooler core 16 and the vehicle interior blow-out air temperature can be properly controlled.

(Third Embodiment)

Figure 18:
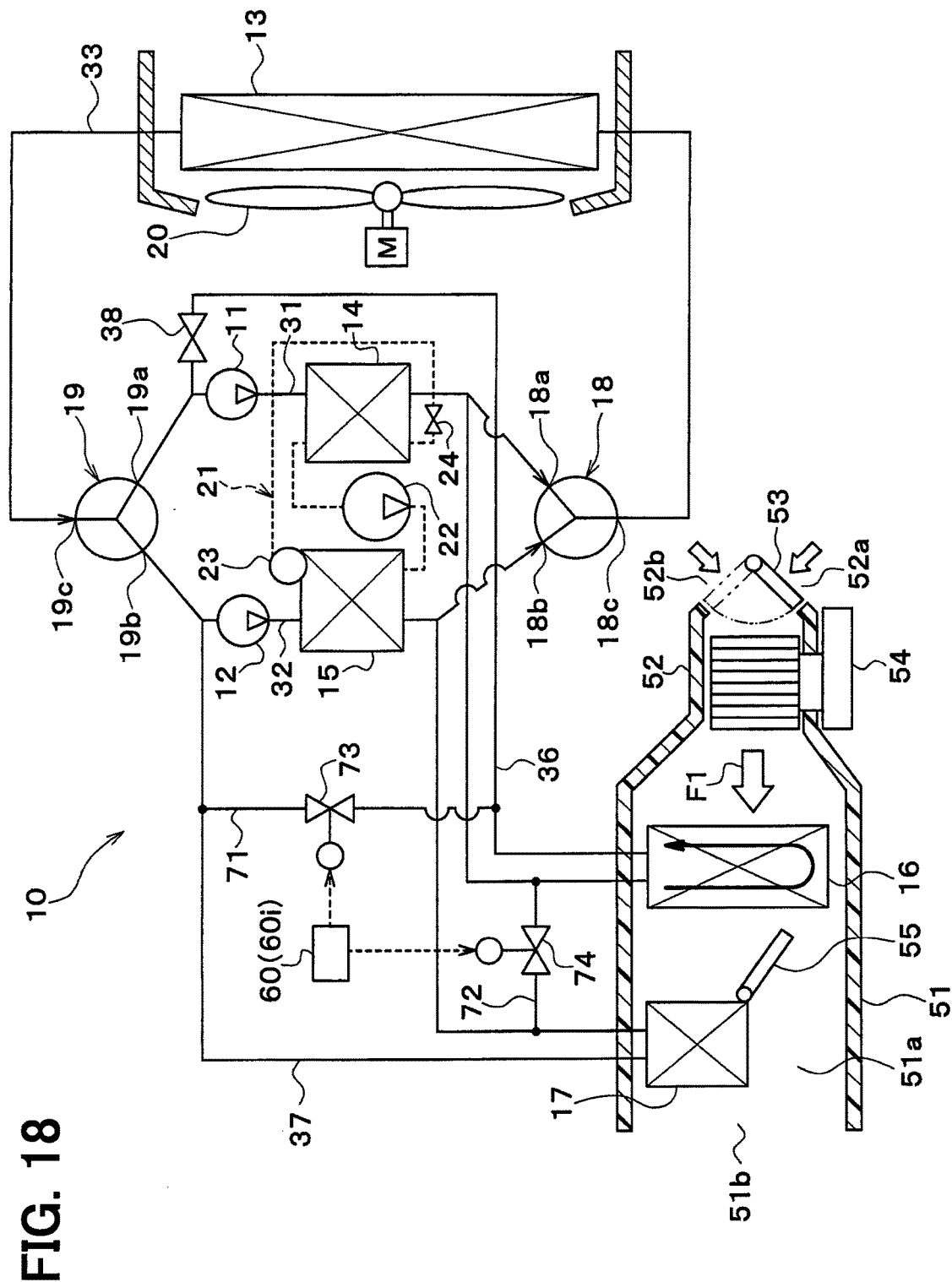
FIG. 18 is a diagram illustrating the entire configuration of the vehicle heat management system in a third embodiment.

In the second embodiment, the electric heater 70 heats the coolant such that the temperature of coolant flowing through the cooler core 16 is increased. In contrast, in this embodiment, as illustrated in FIG. 18, the coolant cooled in the coolant cooler 14 is mixed with the coolant heated in the coolant heater 15 such that the temperature of coolant flowing through the cooler core 16 is increased.

In this embodiment, a first communication flow path 71, a second communication path 72, a first communication opening-and-closing valve 73, and a second communication opening-and-closing valve 74 are additionally provided.

The first communication flow path 71 is a flow path through which a coolant inlet side of the cooler core 16 on the cooler-core flow path 36 communicates with a coolant inlet side of the cooler core 16 on the heater-core flow channel 37.

The second communication flow path 72 is a flow path through which a coolant outlet side of the cooler core 16 on the cooler-core flow path 36 communicates with a coolant outlet side of the cooler core 16 on the heater-core flow channel 37.

The first communication opening-and-closing valve 73 is an electromagnetic valve that opens and closes the first communication flow path 71. The operation of the first communication opening-and-closing valve 73 is controlled by the control device 60. The second communication opening-and-closing valve 74 is an electromagnetic valve that opens and closes the second communication flow path 72. The operation of the second communication opening-and-closing valve 74 is controlled by the control device 60.

In this embodiment, a communication control unit 60i is formed of configuration elements (hardware and software) of the control device 60 to control the operations of the first communication opening-and-closing valve 73 and the second communication opening-and-closing valve 74. The communication control unit 60i may be configured independently of the control device 60. The first communication opening-and-closing valve 73, the second communication opening-and-closing valve 74, and the communication control unit 60i are cooler-core adjustment units (heat exchanger adjustment unit, air-cooling adjustment unit) which adjust the temperature of coolant flowing through the cooler core 16.

When the first communication opening-and-closing valve 73 opens the first communication flow path 71, and the second communication opening-and-closing valve 74 closes the second communication flow path 72, the coolant cooled in the coolant cooler 14 is mixed with the coolant heated in the coolant heater 15, and the temperature of the coolant flowing through the cooler core 16 is increased.

When the opening angle of at least one of the first communication opening-and-closing valve 73 and the second communication opening-and-closing valve 74 is adjusted, a mixture ratio between the coolant cooled in the coolant cooler 14 and the coolant heated in the coolant heater 15 is adjusted, and the temperature of the coolant flowing through the cooler core 16 is adjusted.

The temperature of the coolant flowing through the cooler core 16 may be increased by mixing the coolant cooled in the coolant cooler 14 with the coolant heated in the coolant heater 15 through the operations of the first switching valve 18 and the second switching valve 19.

In this embodiment, in the frost restriction mode, the control device 60 adjusts the temperature of the coolant flowing through the cooler core 16 in such a way that the temperature related to the surface temperature TC of the cooler core 16 approaches the first target temperature TCO. The control device 60 adjusts the flow rate of the coolant discharged from the compressor 22 in such a way that the temperature related to the blow-out air temperature TAV approaches the second target temperature TAO.

Accordingly, the same operational effect as in the second embodiment can be obtained.

(Fourth Embodiment)

In the second embodiment, one end of the cooler-core flow path 36 is connected to the coolant intake side of the first pump 11 on the first-pump flow path 31, and one end of the heater-core flow channel 37 is connected to the coolant intake side of the second pump 12 on the second pump flow path 32.

Figure 19:
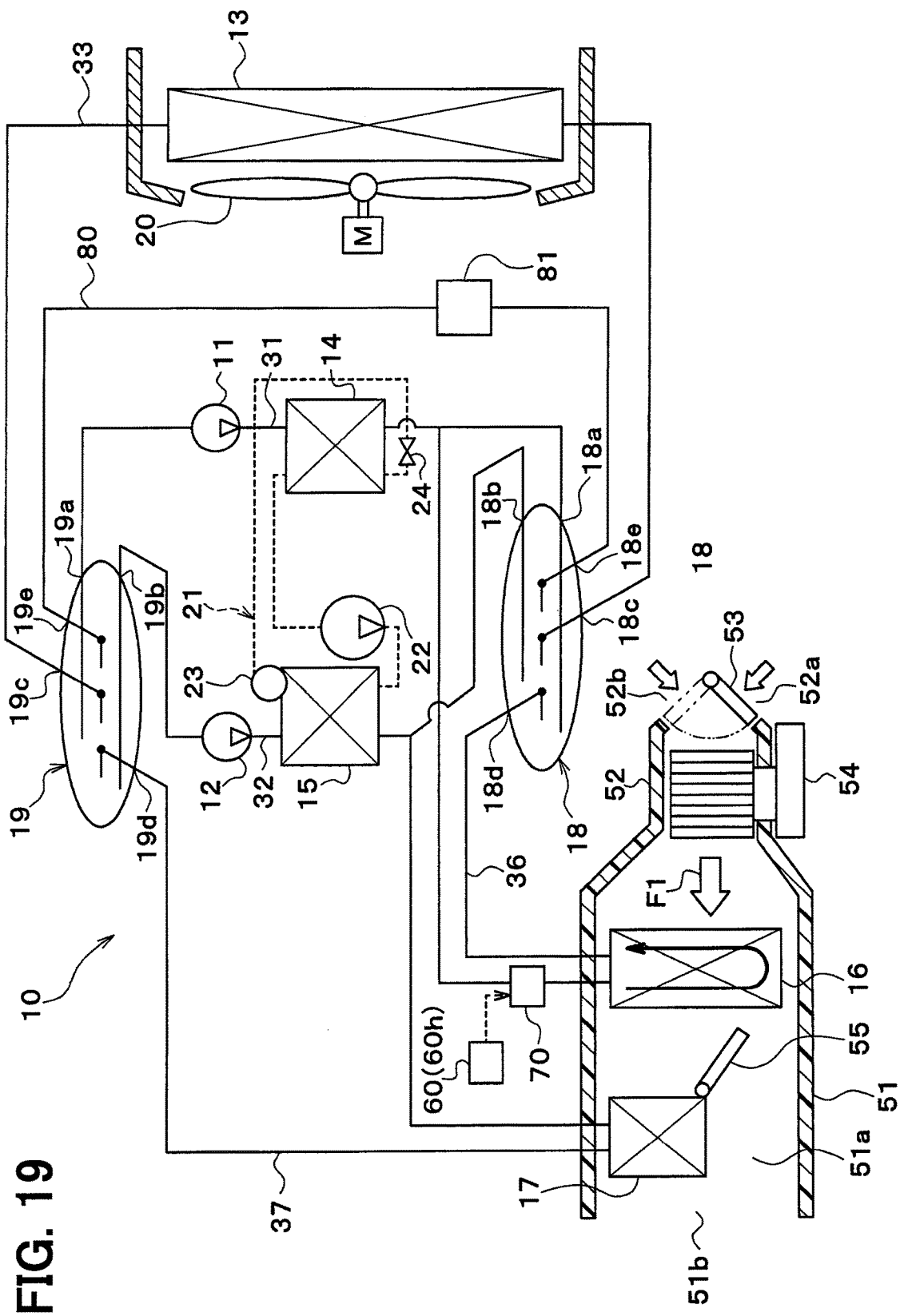
FIG. 19 is a diagram illustrating the entire configuration of the vehicle heat management system in a fourth embodiment.

In contrast, in this embodiment, as illustrated in FIG. 19, one end of the cooler-core flow path 36 is connected to a third inlet port 18d of the first switching valve 18, and one end of the heater-core flow channel 37 is connected to a third outlet 19d of the second switching valve 19.

The first switching valve 18 is capable of adjusting the flow rate of coolant flowing through the cooler-core flow path 36. The second switching valve 19 is capable of adjusting the flow rate of coolant flowing through the heater-core flow channel 37.

One end of a device flow path 80 is connected to a second outlet port 18e of the first switching valve 18. The other end of the device flow path 80 is connected to a second inlet port 19e of the second switching valve 19.

A device 81 is disposed on the device flow path 80. The device 81 includes a coolant-circulating flow path, and is a heat transfer device (temperature adjustment-target device) that transfers heat with the coolant. Examples of the device 81 include an inverter, a battery, a battery temperature-control heat exchanger, a traveling electric motor, engine instruments, a thermal storage, a ventilation-air heat recovery heat exchanger, and a coolant heat exchanger.

The inverter is an electric power conversion device that converts DC power which is supplied from the battery into an AC voltage, and outputs the AC voltage to the traveling electric motor.

The battery temperature-control heat exchanger is a heat exchanger (air-to-heat medium heat exchanger) that is disposed on the path of blast air to the battery, and exchanges heat between the blast air and the coolant.

Examples of the engine instruments include a turbocharger, an intercooler, an EGR cooler, a CVT warmer, a CVT cooler, an exhaust-gas heat recovery device.

The turbocharger is a supercharger that supercharges intake air into the engine. The intercooler is a intake air cooler (intake air-to-heat medium heat exchanger) that cools the supercharged intake air by exchanging heat between the coolant and the supercharged intake air, the temperature of which has been increased due to compression by the turbocharger.

The EGR cooler is an exhaust gas-to-coolant heat exchanger (exhaust gas-to-heat medium heat exchanger) that cools exhaust gas by exchanging heat between the coolant and engine exhaust gas returning to an air intake side of the engine.

The CVT warmer is a lubricant-to-coolant heat exchanger (lubricant-to-heat medium heat exchanger) that heats CVT oil by exchanging heat between the coolant and lubricant (CVT oil) for lubricating a continuously variable transmission (CVT).

The CVT cooler is a lubricant-to-coolant heat exchanger (lubricant-to-heat medium heat exchanger) that cools the CVT oil by exchanging heat between the CVT oil and the coolant.

The exhaust-gas heat recovery device is an exhaust gas-to-coolant heat exchanger (exhaust gas-to-heat medium heat exchanger) in which the coolant exchanges heat with exhaust gas, and absorbs heat from the exhaust gas.

The thermal storage is the storage of warm energy or cold energy of the coolant. Examples of the thermal storage include a chemical thermal storage medium, a heat-retention tank, a latent heat storage medium (paraffins or hydrates).

The ventilation-air heat recovery heat exchanger is a heat exchanger that recovers heat (cold energy or warm energy)

which is wasted to the outside due to ventilation. Since the ventilation-air heat recovery heat exchanger recovers heat (cold energy or warm energy) that is wasted to the outside due to ventilation, power required for cooling and heating can be reduced.

The coolant-coolant heat exchanger is a heat exchanger that exchanges heat between coolants. For example, when the coolant-coolant heat exchanger exchanges heat between the coolant (coolant which is circulated by the first pump 11 or the second pump 12) of the vehicle heat management system 10 and the coolant of an engine cooling circuit (circuit through which coolant for cooling the engine circulates), heat between the vehicle heat management system 10 and the engine cooling circuit can be exchanged.

In this embodiment, the first switching valve 18 and the second switching valve 19 can adjust the flow rate of the coolant flowing through the cooler core 16, and the flow rate of the coolant flowing through the heater core 17.

The first switching valve 18 and the second switching valve 19 can switch between a state in which the coolant cooled in the coolant cooler 14 is allowed to flow through the device 81 and a state in which the coolant heated in the coolant heater 15 is allowed to flow through the device 81. Accordingly, the temperature of the device 81 can be adjusted to a desirable temperature.

Similar to the second embodiment, the electric heater 70 is disposed on the cooler-core flow path 36 in this embodiment, and the coolant is heated by the electric heater 70, and thus the temperature of the coolant flowing through the cooler core 16 can be increased.

(Fifth Embodiment)

Figure 20:
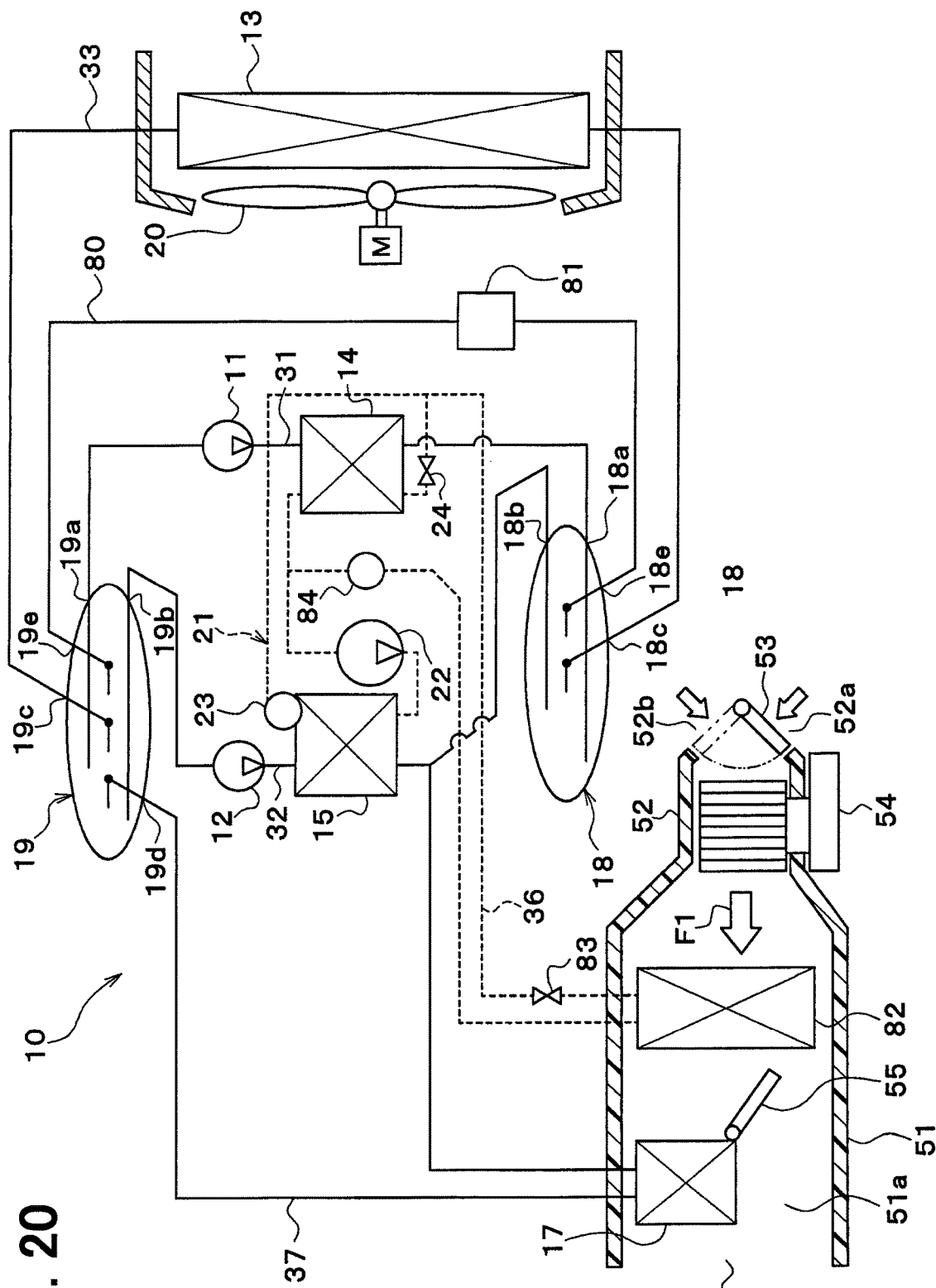
FIG. 20 is a diagram illustrating the entire configuration of the vehicle heat management system in a fifth embodiment.

As illustrated in FIG. 20, instead of the cooler core 16, a second evaporator 82 may be disposed in the case 51 of the interior air conditioning unit 50. The second evaporator 82 is an air-cooling heat exchanger that cools blast air into the vehicle interior by exchanging heat between low-pressure side refrigerant of the refrigeration cycle 21 and the blast air into the vehicle interior.

The refrigeration cycle 21 includes a second expansion valve 83 and a pressure adjustment valve 84. The second expansion valve 83 is a decompression unit that decompresses and expands the liquid-phase refrigerant flowing from the receiver 23. The pressure adjustment valve 84 is a pressure adjustment unit that adjusts refrigerant evaporation pressure in the second evaporator 82.

In the viewpoint of the refrigerant flow of the refrigeration cycle 21, the second evaporator 82, the second expansion valve 83, and the pressure adjustment valve 84 are disposed in parallel with the expansion valve 24 and the coolant cooler 14. The second expansion valve 83, the second evaporator 82, and the pressure adjustment valve 84 are disposed in the refrigerant flow of the refrigeration cycle 21 in the order of the second expansion valve 83, the second evaporator 82, and the second expansion valve 83.

(Sixth Embodiment)

Figure 21:
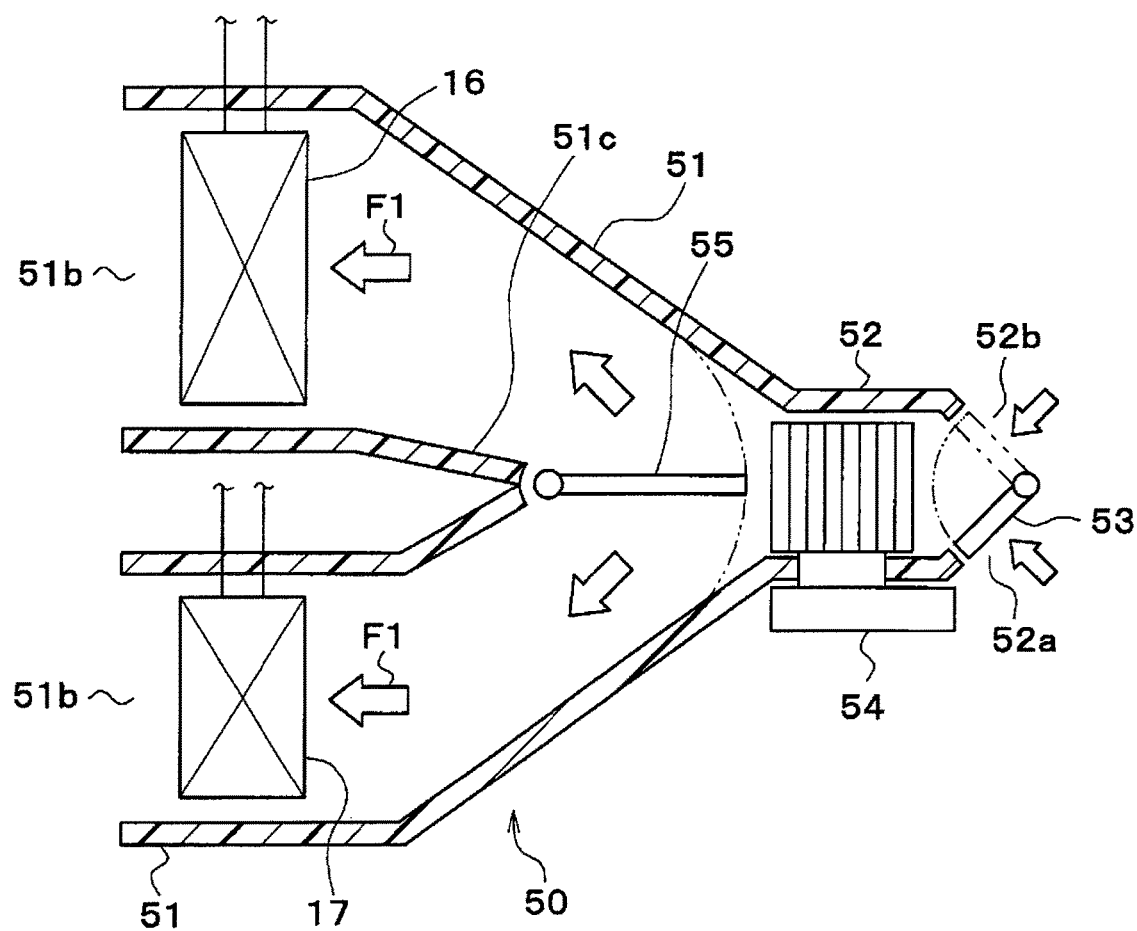
FIG. 21 is a cross-sectional view illustrating the main parts of an interior air conditioning unit in a sixth embodiment.

In the aforementioned embodiments, the cooler core 16 and the heater core 17 are disposed in series in the flow of air in the case 51 of the interior air conditioning unit 50. In contrast, in this embodiment, as illustrated in FIG. 21, the cooler core 16 and the heater core 17 are disposed in parallel in the flow of air.

A partition wall 51c is provided in the case 51, and partitions off an air passage of the cooler core 16 and an air passage of the heater core 17. The air mix door 55 is disposed on a downstream side of the air flow of the inside blower 54, and an upstream side of the air flow of the cooler core 16 and the heater core 17.

Also in this embodiment, the same operational effects as in the aforementioned embodiments can be obtained.

(Seventh Embodiment)

Figure 22:
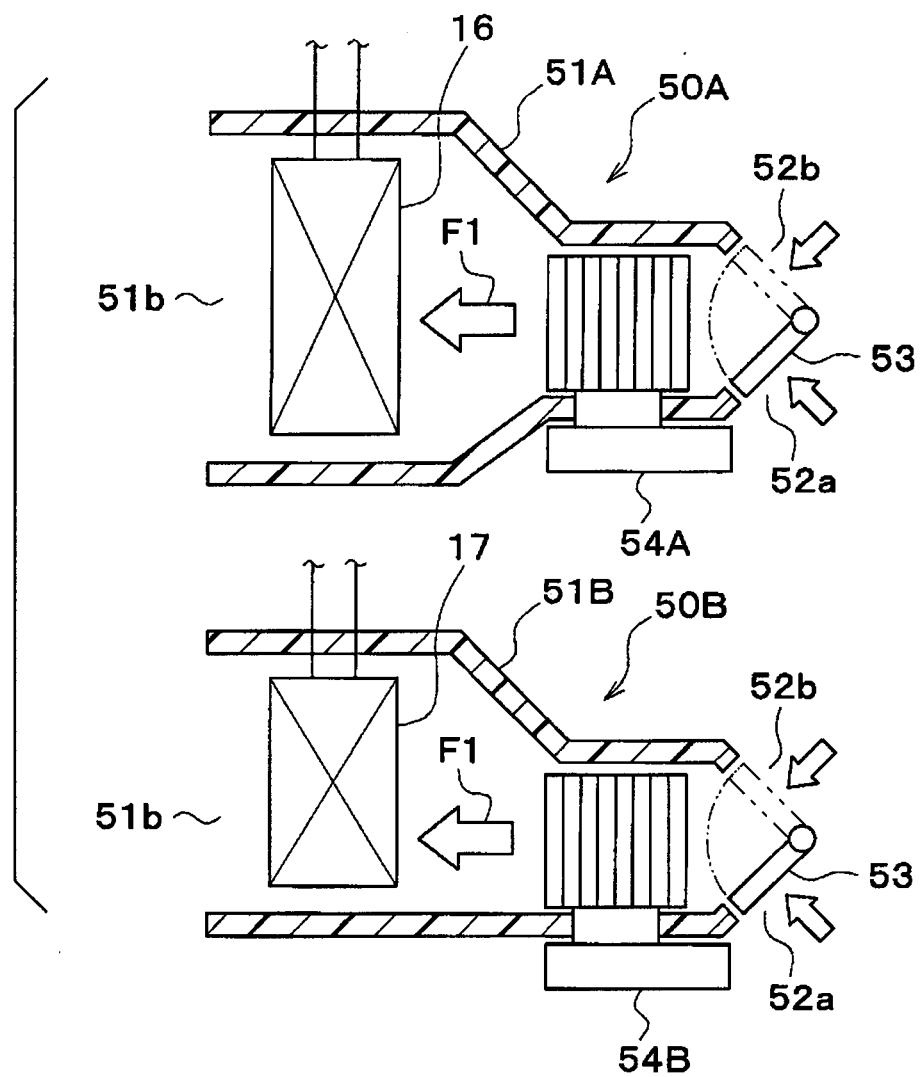
FIG. 22 is a cross-sectional view illustrating the main parts of an interior air conditioning unit in a seventh embodiment.
Figure 23:
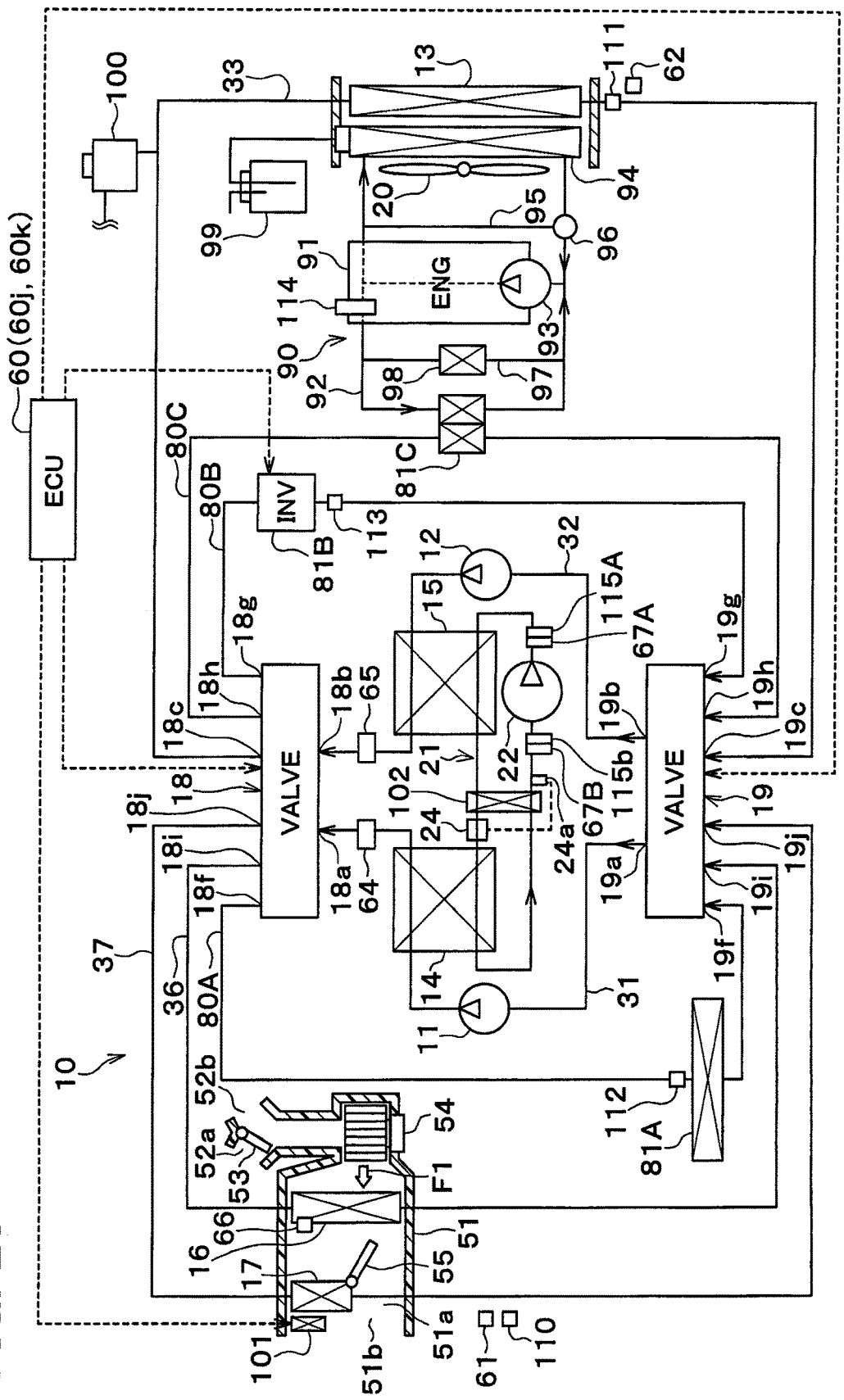
FIG. 23 is a diagram illustrating the entire configuration of the vehicle heat management system in an eighth embodiment.

In the aforementioned embodiments, the cooler core 16 and the heater core 17 are accommodated in the common interior air conditioning unit 50. In contrast, in this embodiment, as illustrated in FIG. 22, the cooler core 16 is accommodated in a cooler unit 50A, and the heater core 17 is accommodated in a heater unit 50B.

An inside blower 54A and the cooler core 16 are disposed in a case 51A of the cooler unit 50A. An inside blower 54B and the heater core 17 are disposed in a case 51B of the heater unit 50B.

Also in this embodiment, the same operational effects as in the aforementioned embodiments can be obtained.

(Eighth Embodiment)

In this embodiment, a battery-temperature control heat exchanger 81A, an inverter 81B, and a coolant-coolant heat exchanger 81C are provided as the heat transfer device 81. Each of the battery-temperature control heat exchanger 81A, the inverter 81B, and the coolant-coolant heat exchanger 81C includes a coolant-circulating flow path, and is a heat transfer device (temperature adjustment-target device) that transfers heat with the coolant.

The battery-temperature control heat exchanger 81A is a heat exchanger (air-to-heat medium heat exchanger) that is disposed on the path of blast air to the battery, and exchanges heat between the blast air and the coolant. The battery-temperature control heat exchanger 81A is disposed on a battery heat-exchanging flow path 80A.

One end of the battery heat-exchanging flow path 80A is connected to a battery heat-exchanging outlet port 18f of the first switching valve 18. The other end of the battery heat-exchanging flow path 80A is connected to a battery heat-exchanging inlet port 19f of the second switching valve 19.

The inverter 81B is an electric power conversion device that converts DC power which is supplied from the battery into an AC voltage, and outputs the AC voltage to the traveling electric motor. The inverter 81B is disposed on an inverter flow path 80B.

One end of the inverter flow path 80B is connected to an inverter outlet port 18g of the first switching valve 18. The other end of the inverter flow path 80B is connected to an inverter inlet port 19g of the second switching valve 19.

The coolant-coolant heat exchanger 81C is a heat exchanger (heat medium-to-heat medium heat exchanger) that exchanges heat between the coolant (coolant which is circulated by the first pump 11 or the second pump 12) of the vehicle heat management system 10 and the coolant (engine-heat medium) of an engine cooling circuit 90. The coolant-coolant heat exchanger 81C is disposed on a coolant-coolant heat exchanger flow path 80C.

One end of the coolant-coolant heat exchanger flow path 80C is connected to a coolant-coolant heat exchanger outlet port 18h of the first switching valve 18. The other end of the coolant-coolant heat exchanger flow path 80C is connected to a coolant-coolant heat exchanger inlet port 19h of the second switching valve 19.

In this embodiment, one end of the cooler-core flow path 36 is connected to a cooler-core outlet port 18i of the first switching valve 18. The other end of the cooler-core flow path 36 is connected to a cooler-core inlet port 19i of the second switching valve 19.

One end of the heater-core flow channel 37 is connected to a heater-core outlet port 18j of the first switching valve 18.

The other end of the heater-core flow channel 36 is connected to a heater-core inlet port 19j of the second switching valve 19.

The first switching valve 18 switches between a state in which the coolant discharged from the first pump 11 is allowed to flow to each of the devices 13, 16, 17, 81A, 81B, and 81C connected to an outlet side of the first switching valve 18, a state in which the coolant discharged from the second pump 12 is allowed to flow to each of the devices 13, 16, 17, 81A, 81B, and 81C connected to an outlet side of the first switching valve 18, and a state in which the coolant discharged from the first pump 11 and the second pump 12 is not allowed to flow to each of the devices 13, 16, 17, 81A, 81B, and 81C connected to an outlet side of the first switching valve 18.

The second switching valve 19 switches between a state in which the coolant is allowed to flow to the first pump 11 from each of the devices 13, 16, 17, 81A, 81B, and 81C connected to an inlet side of the second switching valve 19, a state in which the coolant is allowed to flow to the second pump 12 from each of the devices 13, 16, 17, 81A, 81B, and 81C connected to an inlet side of the second switching valve 19, and a state in which the coolant is not allowed to flow to the first pump 11 and the second pump 12 from each of the devices 13, 16, 17, 81A, 81B, and 81C connected to an inlet side of the second switching valve 19.

Each of the first switching valve 18 and the second switching valve 19 is capable of adjusting a valve opening. Accordingly, each of the first switching valve 18 and the second switching valve 19 is capable of adjusting the flow rate of the coolant flowing through each of the devices 13, 16, 17, 81A, 81B, and 81C.

The first switching valve 18 and the second switching valve 19 are capable of mixing the coolant discharged from the first pump 11 with the coolant discharged from the second pump 12 at an arbitrary flow rate ratio, and allowing the mixed coolant to flow to each of the devices 13, 16, 17, 81A, 81B, and 81C.

The engine cooling circuit 90 is a coolant circulation circuit for cooling an engine 91. The engine cooling circuit 90 includes a circulation flow path 92 through which the coolant circulates. The engine 91, a third pump 93, an engine radiator 94, and the coolant-coolant heat exchanger 81C are disposed on the circulation flow path 92.

The third pump 93 is a motor-driven pump that takes in and discharges the coolant. The third pump 93 may be a mechanical pump that is driven by power output from the engine 91.

The engine radiator 94 is a heat-radiating heat exchanger (air-to-heat medium heat exchanger) in which the coolant radiates heat to the outside air by exchanging heat with the outside air.

A radiator bypass channel 95 is connected to the circulation flow path 92. The radiator bypass channel 95 is a flow path through which the coolant is allowed to flow without flowing through the engine radiator 94.

A thermostat 96 is disposed in a connection portion between the radiator bypass channel 95 and the circulation flow path 92. The thermostat 96 is a coolant temperature responsive valve with a mechanical mechanism in which a valve body is displaced due to a change in the volume of thermo wax (temperature sensing member) according to temperature, and a coolant flow channel is opened and closed.

Specifically, when the coolant temperature is higher than or equal to a predetermined temperature (for example, temperature that is higher than or equal to 80° C.), the thermostat 96 closes the radiator bypass channel 95, and when the coolant temperature is lower than a predetermined temperature (for example, temperature that is lower than 80° C.), the thermostat 96 opens the radiator bypass channel 95.

An engine-accessory flow path 97 is connected to the circulation flow path 92. The engine-accessory flow path 97 is a coolant flow path that is parallel to the coolant-coolant heat exchanger 81C. An engine accessory 98 is disposed on the engine-accessory flow path 97. Examples of the engine accessory 98 include an oil heat exchanger, an EGR cooler, a throttle valve cooler, a turbo cooler, and an engine accessory motor. The oil heat exchanger is a heat exchanger that adjusts the temperature of engine oil or transmission oil by exchanging heat between the coolant and the engine oil, or between the coolant and the transmission oil.

The EGR cooler is a heat exchanger that is a component of an exhaust gas re-circulation (EGR) device which reduces a pumping loss associated with a throttle valve by re-circulating a portion of engine exhaust gas to an intake side of the engine, and is a heat exchanger that adjusts the temperature of re-circulation gas by exchanging heat between the re-circulation gas and the coolant.

The throttle valve cooler is a water jacket that is provided in a throttle body so as to cool the throttle valve.

The turbo cooler is a cooler that cools a turbocharger by exchanging heat between the coolant and heat occurring in the turbocharger.

The engine accessory motor is a large-sized motor that rotates an engine belt also when the engine is stopped, and is used to operate a compressor, a water pump, and the like driven by the engine belt when a drive force of the engine is not supplied thereto, or to start up the engine.

A first reservoir tank 99 is connected to the engine radiator 94. The first reservoir tank 99 is an atmospheric release container (heat medium storage unit) that stores the coolant. Accordingly, the atmospheric pressure is applied to a liquid surface of the coolant stored in the first reservoir tank 99. The first reservoir tank 99 may be configured such that a predetermined pressure (pressure that is different from the atmospheric pressure) is applied to the liquid surface of the coolant stored in the first reservoir tank 99.

Since surplus coolant is stored in the first reservoir tank 99, the amount of coolant circulating each flow path can be restricted from decreasing. Air bubbles mixed into the coolant are separated from the coolant by the first reservoir tank 99.

A second reservoir tank 100 is connected to the radiator flow path 33. The second reservoir tank 100 has the same structure and function as that of the first reservoir tank 99.

An auxiliary heater 101 is disposed on a downstream side of the air flow of the heater core 17 in the case 51 of the interior air conditioning unit 50 of the vehicle air conditioning apparatus. The auxiliary heater 101 includes a PTC element (positive thermistor), and is a PTC heater (electric heater) that generates heat, and heats air when electrical power is supplied to the PTC element.

The operation (the amount of generated heat) of the auxiliary heater 101 is controlled by the control device 60. In this embodiment, an auxiliary heater control unit (electric heater control unit) 60j is formed of configuration elements (hardware and software) of the control device 60 to control the operation of the auxiliary heater 101.

The refrigeration cycle 21 includes an internal heat exchanger 102. The internal heat exchanger 102 is a heat exchanger that exchanges heat between the refrigerant flowing from the coolant heater 15 and the refrigerant flowing from the coolant cooler 14.

The expansion valve 24 of the refrigeration cycle 21 includes a temperature sensing unit 24a that detects superheating of the refrigerant on an outlet side of the coolant cooler 14 based on the temperature and the pressure of the refrigerant on the outlet side of the coolant cooler 14. The expansion valve 24 is a thermal expansion valve which adjusts a throttle passage area using a mechanical mechanism in such a way that the superheating of the refrigerant on the outlet side of the coolant cooler 14 is in a predetermined range.

The temperature sensing unit 24a may be formed of a thermistor, and the expansion valve 24 may be an electric expansion valve which adjusts a throttle passage area using an electric mechanism in such a way that the superheating of the refrigerant on the outlet side of the coolant cooler 14 is in the predetermined range.

The input side of the control device 60 receives detection signals from a group of sensors such as the inside air temperature sensor 61, an inside air humidity sensor 110, the outside air temperature sensor 62, the first coolant temperature sensor 64, the second coolant temperature sensor 65, a radiator coolant temperature sensor 111, a battery temperature sensor 112, an inverter temperature sensor 113, an engine coolant temperature sensor 114, the heater core temperature sensor 66, refrigerant temperature sensors 67A and 67B, and refrigerant pressure sensors 115A and 115B.

The inside air humidity sensor 110 is a detection unit (inside air-humidity detection unit) that detects the humidity of inside air. The radiator coolant temperature sensor 111 is a detection unit (device-side heat medium-temperature detection unit) that detects the temperature (for example, the temperature of coolant flowing from the radiator 13) of coolant flowing through the radiator flow path 33.

The battery temperature sensor 112 is a detection unit (device-side heat medium-temperature detection unit) that detects the temperature (for example, the temperature of coolant flowing into the battery-temperature control heat exchanger 81A) of coolant flowing through the battery heat-exchanging flow path 80A.

The inverter temperature sensor 113 is a detection unit (device-side heat medium-temperature detection unit) that detects the temperature (for example, the temperature of coolant flowing from the inverter 81B) of coolant flowing through the inverter flow path 80B.

The engine coolant temperature sensor 114 is a detection unit (device-side heat medium-temperature detection unit) that detects the temperature (for example, the temperature of coolant flowing through the engine 91) of coolant circulating through the engine cooling circuit 90.

The refrigerant temperature sensor 67A is a discharge-side refrigerant temperature sensor that detects the temperature of coolant discharged from the compressor 22, and the refrigerant temperature sensor 67B is an intake-side refrigerant temperature sensor that detects the temperature of coolant taken into the compressor 22.

The refrigerant pressure sensor 115A is a discharge-side refrigerant pressure sensor that detects the pressure of coolant discharged from the compressor 22, and the refrigerant pressure sensor 115B is an intake-side refrigerant pressure sensor that detects the pressure of coolant taken into the compressor 22.

Hereinafter, the operation of the aforementioned configuration components will be described. The control device 60 operates the first switching valve 18 and the second switching valve 19 such that the coolant flow mode is switched to various modes illustrated in FIGS. 24 to 28. For ease of understanding, FIGS. 24 to 28 illustrate the vehicle heat management system 10 in a simple manner.

Figure 24:
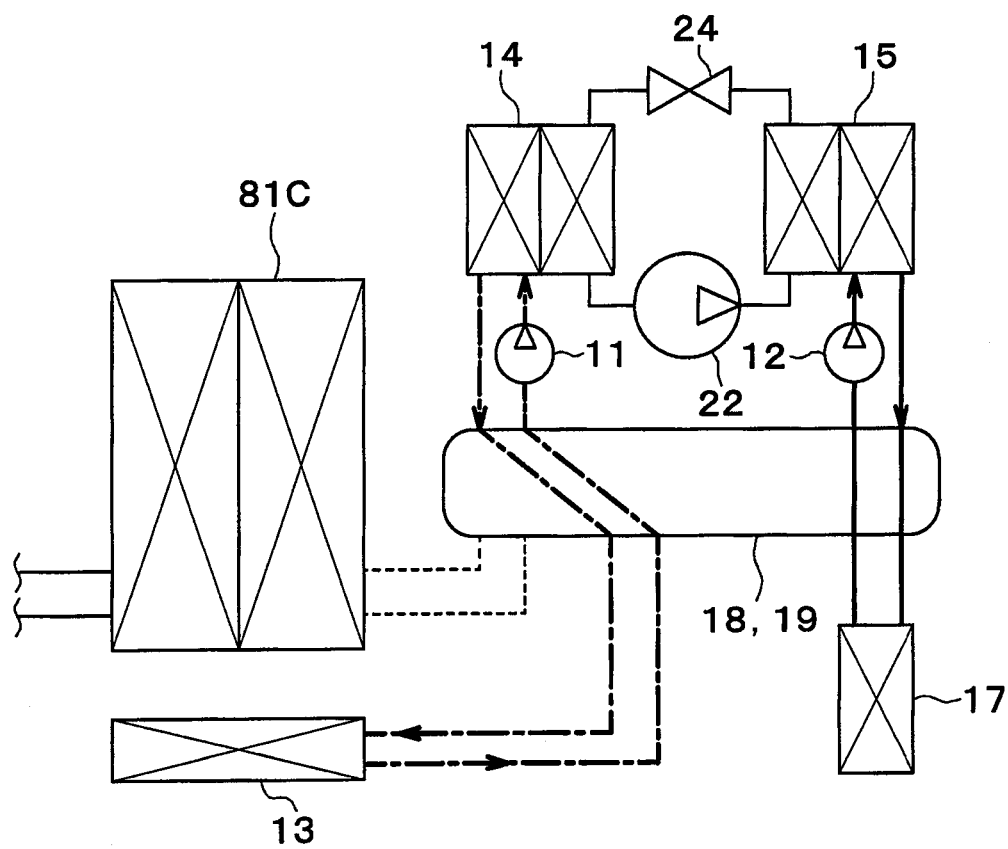
FIG. 24 is a diagram illustrating a schematic configuration of an outside air heat-absorbing heat pump mode of the vehicle heat management system in the eighth embodiment.

In an outside air heat-absorbing heat pump mode illustrated in FIG. 24, the radiator 13 is connected to the coolant cooler 14, the heater core 17 is connected to the coolant heater 15, and the coolant-coolant heat exchanger 81C is not connected to both the coolant cooler 14 and the coolant heater 15.

Accordingly, since the coolant which has been cooled to a temperature lower than an outside air temperature in the coolant cooler 14, flows through the radiator 13, the coolant in the radiator 13 absorbs heat from the outside air, and since the coolant heated in the coolant heater 15 flows through the heater core 17, the blast air into the vehicle interior is heated in the heater core 17.

That is, in an outside air heat-absorbing heat pump mode, the refrigerant of the refrigeration cycle 21 absorbs heat from the outside air in the radiator 13, and radiates heat to the coolant in the coolant heater 15. Accordingly, a heat pump operation, in which heat is drawn from the outside air, can be realized.

Figure 25:
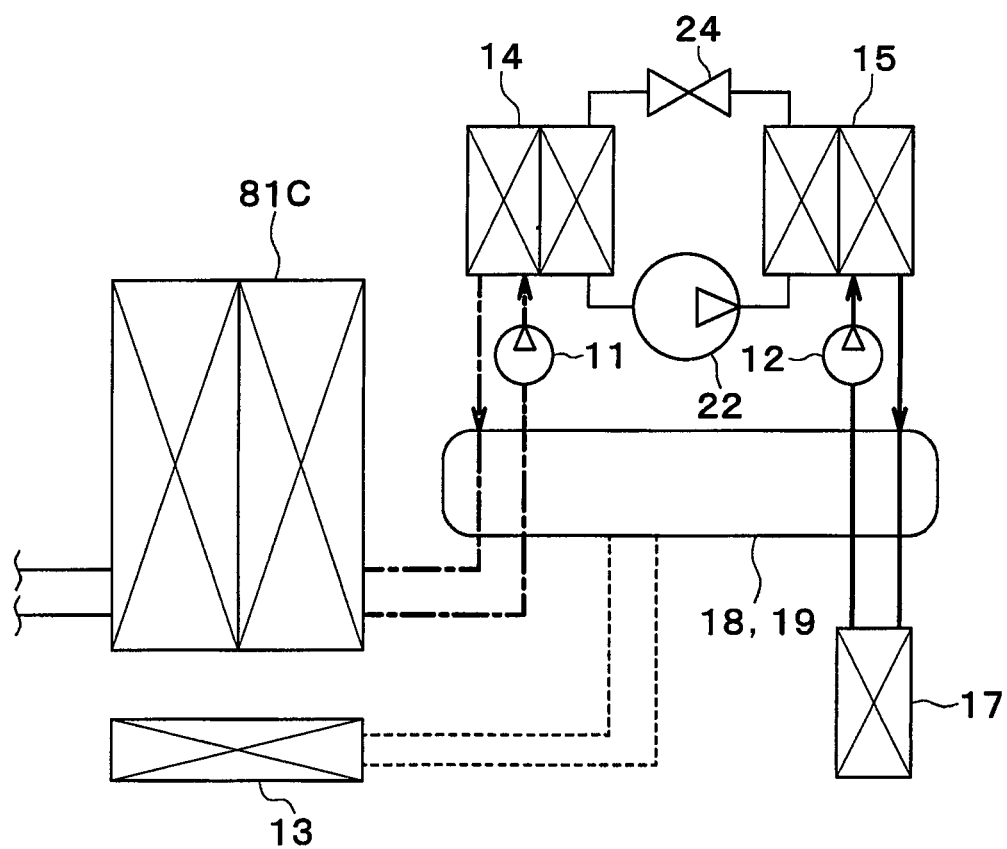
FIG. 25 is a diagram illustrating a schematic configuration of an engine heat-absorbing heat pump mode of the vehicle heat management system in the eighth embodiment.

In an engine heat-absorbing heat pump mode illustrated in FIG. 25, the coolant-coolant heat exchanger 81C is connected to the coolant cooler 14, the heater core 17 is connected to the coolant heater 15, and the radiator 13 is not connected to both the coolant cooler 14 and the coolant heater 15.

Accordingly, since the coolant heated in the coolant-coolant heat exchanger 81C flows through the coolant cooler 14, the refrigerant absorbs heat from the coolant in the coolant cooler 14, and since the coolant heated in the coolant heater 15 flows through the heater core 17, the blast air into the vehicle interior is heated in the heater core 17.

That is, in the engine heat-absorbing heat pump mode, the refrigerant of the refrigeration cycle 21 absorbs heat from the coolant heated in the coolant-coolant heat exchanger 81C, and radiates heat to the coolant in the coolant heater 15. Accordingly, a heat pump operation, in which heat is drawn from the engine 91, can be realized.

In the engine heat-absorbing heat pump mode, when other heat generation devices (the battery temperature-control heat exchanger 81A and the inverter 81B) are connected to the coolant cooler 14, heat can be drawn from the other heat generation devices 81A and 81B. Accordingly, the engine heat-absorbing heat pump mode can be referred to as a device heat-absorbing heat pump mode.

Figure 26:
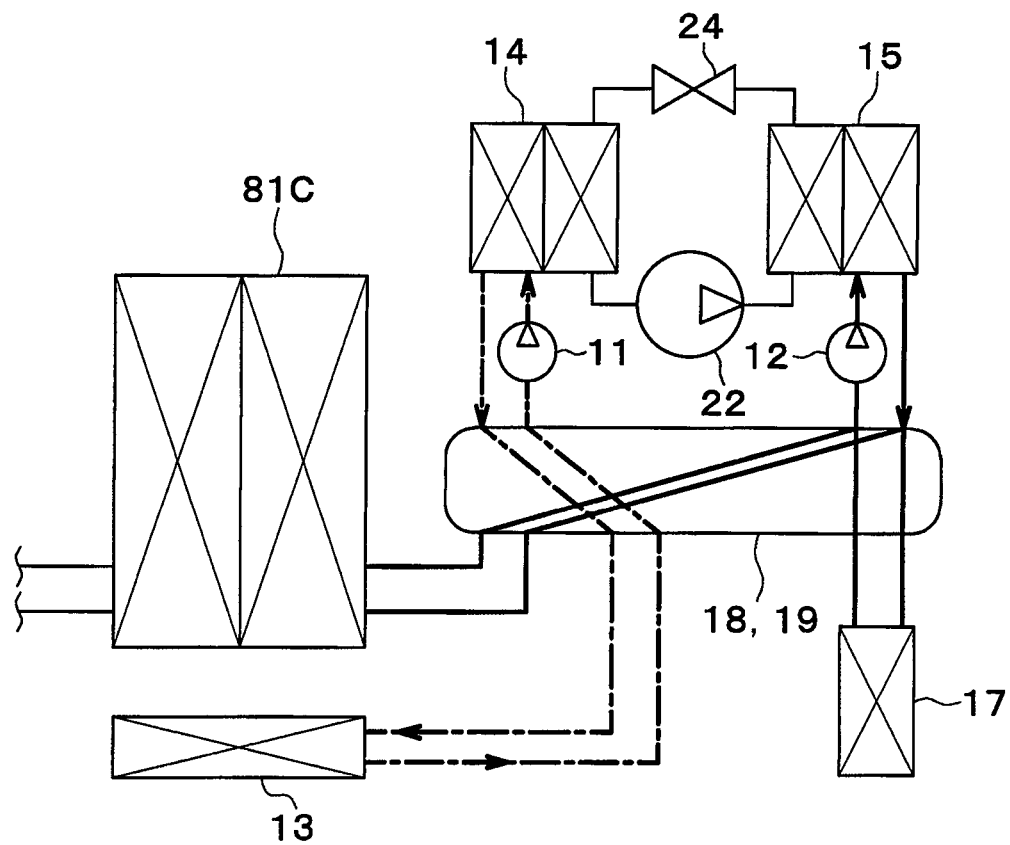
FIG. 26 is a diagram illustrating a schematic configuration of an assist heat pump mode and the like of the vehicle heat management system in the eighth embodiment.

In an assist heat pump mode, an engine-heating heat pump mode, a device heating mode, and a thermal mass-using heating mode illustrated in FIG. 26, the coolant-coolant heat exchanger 81C and the heater core 17 are connected to the coolant heater 15, and the radiator 13 is connected to the coolant cooler 14.

Accordingly, since the coolant heated in the coolant-coolant heat exchanger 81C flows through the heater core 17, the blast air into the vehicle interior is heated in the heater core 17.

In addition, since the coolant cooled in the coolant cooler 14 flows through the radiator 13, the coolant in the radiator 13 absorbs heat from the outside air, and since the coolant heated in the coolant heater 15 flows through the heater core 17, the blast air into the vehicle interior is heated in the heater core 17.

That is, in an outside air heat-absorbing heat pump mode, the refrigerant of the refrigeration cycle 21 absorbs heat from the outside air in the radiator 13, and radiates heat to the coolant in the coolant heater 15. Accordingly, a heat pump operation, in which heat is drawn from the outside air, can be realized.

As a result, when the waste heat of the engine 91 is insufficient as a heat source for heating, the heat source for heating can be supplemented through the heat pump operation (the assist heat pump mode).

While the engine 91 is warming up, the coolant heated in the coolant heater 15 flows through the coolant-coolant heat exchanger 81C, and thus, while the engine 91 is warming up, the engine 91 can be heated by the coolant heated in the coolant heater 15 (the engine heat-absorbing heat pump mode).

In the engine heat-absorbing heat pump mode, when other heat generation devices (the battery temperature-control heat exchanger 81A and the inverter 81B) are connected to the coolant heater 15, the other heat generation devices 81A and 81B can be heated by the coolant heated in the coolant heater 15. Accordingly, the engine heat-absorbing heat pump mode can be referred to as a device-heating heat pump mode.

Other heating target devices connected to the coolant heater 15 can be heated by the heat of the engine 91 (the device heating mode).

Since the coolant heated in the coolant heater 15 flows through the coolant-coolant heat exchanger 81C, a change in the coolant temperature can be restricted by the thermal mass (heat capacity) of the engine 91 (the thermal mass-using heating mode).

Figure 27:
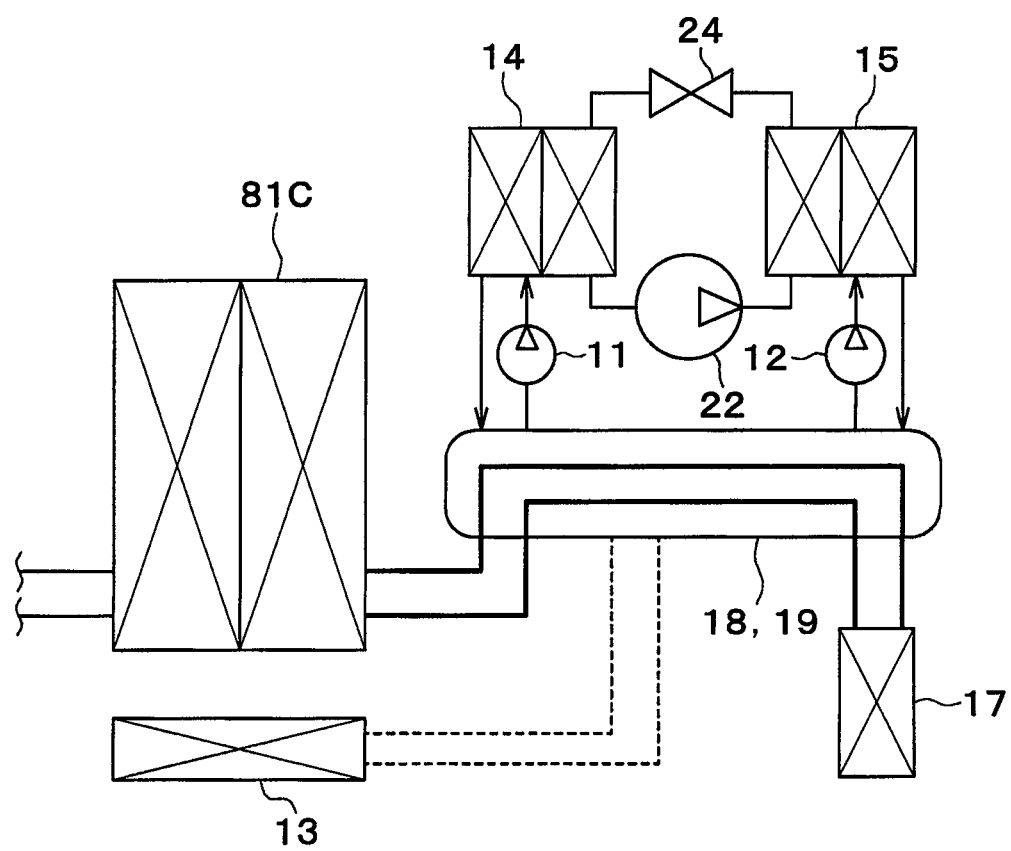
FIG. 27 is a diagram illustrating a schematic configuration of an engine waste heat-direct use mode of the vehicle heat management system in the eighth embodiment.

In the engine waste heat-direct use mode illustrated in FIG. 27, the coolant-coolant heat exchanger 81C is connected to the heater core 17, and are not connected to both the coolant cooler 14 and the coolant heater 15.

A coolant pump (not illustrated) for taking in and discharging the coolant is disposed on a coolant flow channel between the coolant-coolant heat exchanger 81C and the heater core 17. Accordingly, since the coolant heated in the coolant-coolant heat exchanger 81C flows through the heater core 17, the blast air into the vehicle interior is heated in the heater core 17.

In a case where the temperature of the coolant flowing through the heater core 17 exceeds a temperature required to heat the vehicle interior, when the coolant-coolant heat exchanger 81C is connected to the heater core 17 and the radiator 13, a surplus heat of the engine 91 can be discharged to the outside air.

In the engine waste heat-direct use mode, when other heat generation devices (the battery temperature-control heat exchanger 81A and the inverter 81B) are connected to the heater core 17, the coolant heated in other heat generation devices 81A and 81B flows through the heater core 17. Accordingly, the blast air into the vehicle interior can be heated in the heater core 17. Accordingly, the engine waste heat-direct use mode can be referred to as a device waste heat-direct use mode.

Figure 28:
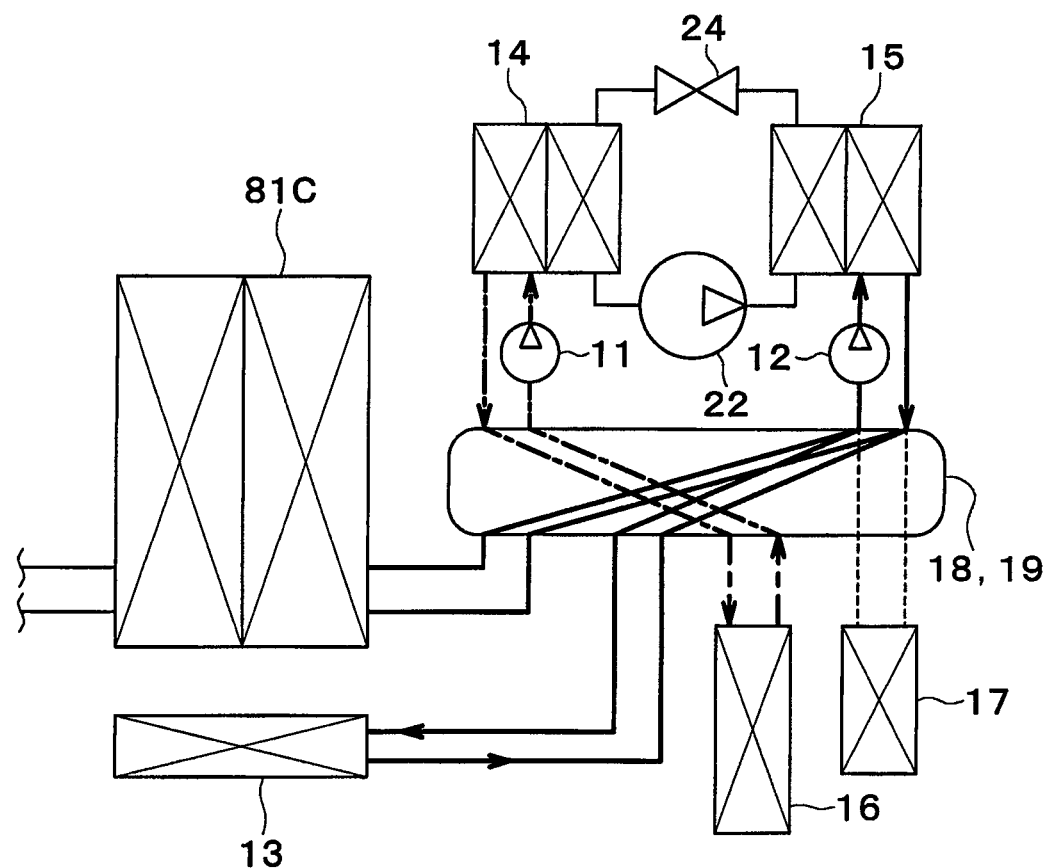
FIG. 28 is a diagram illustrating a schematic configuration of a thermal mass-using cooling mode of the vehicle heat management system in the eighth embodiment.

In the thermal mass-using cooling mode illustrated in FIG. 28, the coolant-coolant heat exchanger 81C and the radiator 13 are connected to the coolant heater 15, and the cooler core 16 is connected to the coolant cooler 14.

Accordingly, since the coolant cooled in the coolant cooler 14 flows through the cooler core 16, the blast air into the vehicle interior is cooled in the cooler core 16, and since the coolant heated in the coolant heater 15 flows through the radiator 13, the coolant radiates heat to the outside air in the radiator 13.

Since the coolant heated in the coolant heater 15 flows through the engine 91, a change in the coolant temperature can be restricted by the thermal mass (heat capacity) of the engine 91, or an increase in the pressure of the refrigerant can be restricted by restricting an increase in the temperature of the coolant. As a result, high-efficiency cooling can be realized.

The control device 60 operates the first switching valve 18 and the second switching valve 19 such that the coolant flow mode is also switched to a defrost mode or an engine-independent mode, which is not illustrated.

In the defrost mode, the coolant-coolant heat exchanger 81C is connected to the radiator 13. Accordingly, since the coolant heated in the coolant-coolant heat exchanger 81C flows through the radiator 13, the radiator 13 can be defrosted using the waste heat of the engine 91.

In the engine-independent mode, the coolant-coolant heat exchanger 81C is not connected to both the coolant cooler 14 and the coolant heater 15. Accordingly, the waste heat of the engine 91 is not transmitted to the coolant cooler 14 and the coolant heater 15.

For example, during a cooling operation, when the temperature detected by the engine coolant temperature sensor 114, that is, the temperature of the coolant circulating through the engine cooling circuit 90 exceeds a reference temperature which is set in advance, the engine-independent mode is executed. Accordingly, the waste heat of the engine 91 can be prevented from causing cooling performance to deteriorate.

Figure 29:
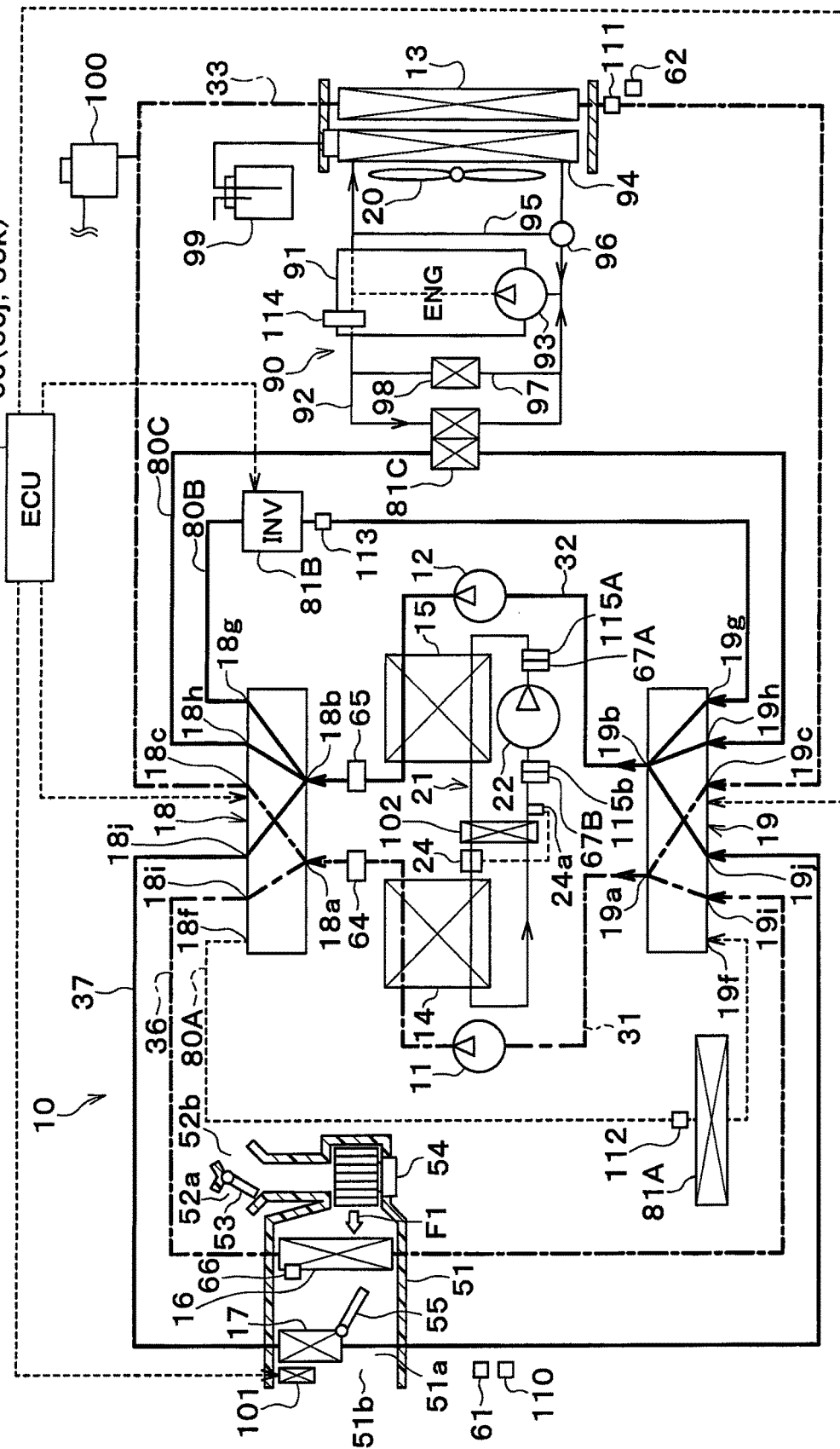
FIG. 29 is a diagram illustrating an example of the entire configuration of an outside air heat-absorbing heat pump mode of the vehicle heat management system in the eighth embodiment.

FIG. 29 illustrates a specific example of the outside air heat-absorbing heat pump mode. The solid line with arrows and the alternate one long and one short dashes line with arrows in FIG. 29 illustrate the flow of the coolant in the outside air heat-absorbing heat pump mode.

For example, during a heating operation, when the temperature detected by the engine coolant temperature sensor 114, that is, the temperature of the coolant circulating through the engine cooling circuit 90 is lower than a first reference temperature (for example, 40° C.) which is set in advance, the outside air heat-absorbing heat pump mode illustrated in FIG. 29 is executed.

Accordingly, when the engine 91 operates, the warm-up of the engine 91 can be expedited. In contrast, when the engine 91 is stopped, a heat source for heating can be ensured without operating the engine 91. As a result, fuel efficiency can be improved.

Figure 30:
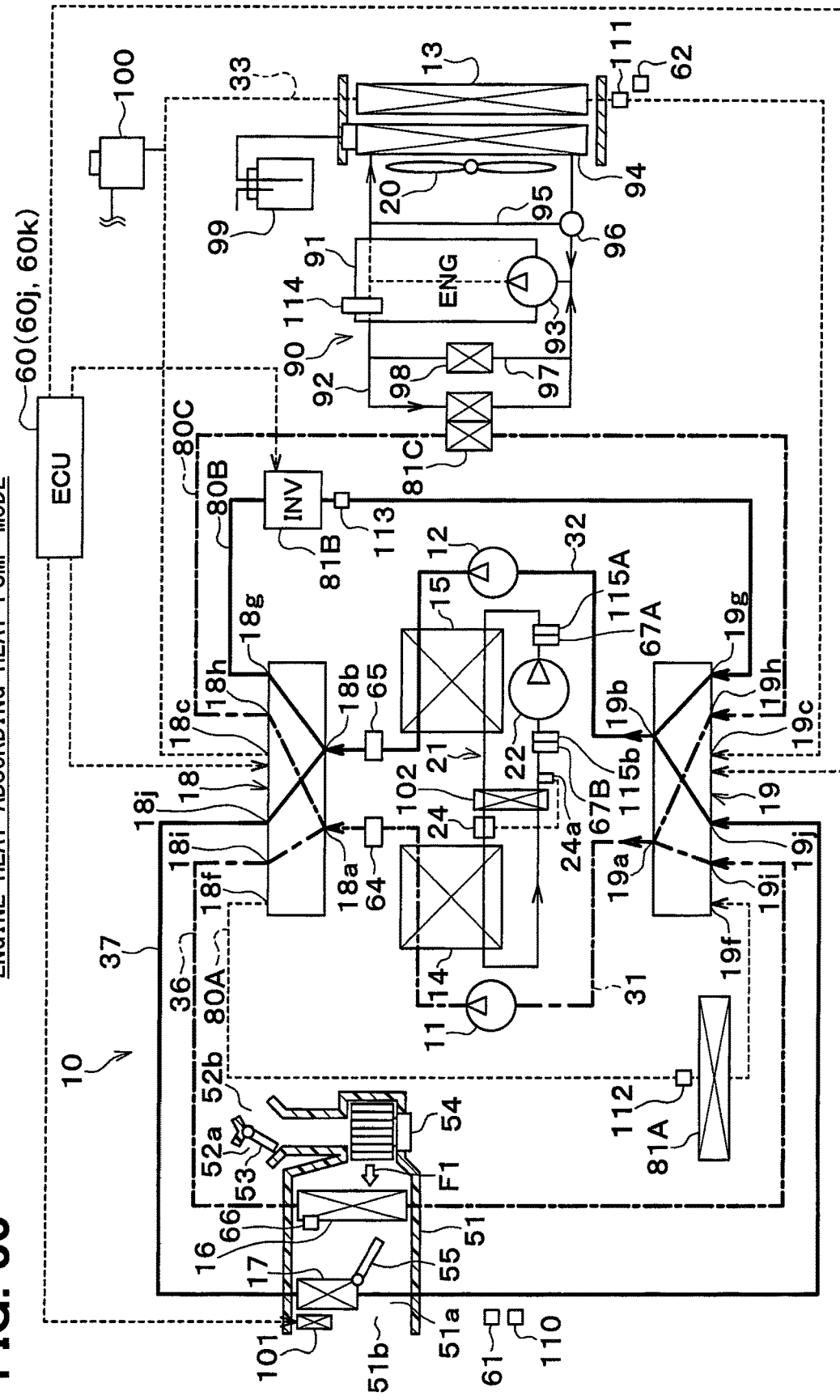
FIG. 30 is a diagram illustrating an example of the entire configuration of an engine heat-absorbing heat pump mode of the vehicle heat management system in the eighth embodiment.

FIG. 30 illustrates a specific example of the engine heat-absorbing heat pump mode. The solid line with arrows and the alternate one long and one short dashes line with arrows in FIG. 30 illustrate the flow of the coolant in the engine heat-absorbing heat pump mode.

For example, during a heating operation, when the temperature detected by the engine coolant temperature sensor 114, that is, the temperature of the coolant circulating through the engine cooling circuit 90 is higher than or equal to the first reference temperature (for example, 40° C.) which is set in advance, the engine heat-absorbing heat pump mode illustrated in FIG. 30 is executed.

In this mode, the temperature of the coolant circulating through the coolant cooler 14 can be increased, and thus the pressure of the low-pressure side refrigerant of the refrigeration cycle 21 can be increased, and heating (hereinafter, which is referred to as high COP heating), in which the efficiency (COP) of the refrigeration cycle 21 is high, can be realized.

When dehumidification and heating are performed in the engine heat-absorbing heat pump mode illustrated in FIG. 30, the temperature of the coolant circulating through the coolant cooler 14 is preferably maintained at approximately 0° C. by controlling the amount of heat received from the engine 91.

When the temperature detected by the first coolant temperature sensor 64, that is, the temperature of the coolant circulating through the coolant cooler 14 is higher than an outside air temperature in the engine heat-absorbing heat pump mode illustrated in FIG. 30, the circulation of the coolant to the radiator 13 is shut off. Accordingly, the coolant can be prevented from radiating heat to the outside air in the radiator 13.

In the engine heat-absorbing heat pump mode illustrated in FIG. 30, the cooler core 16 is connected to the coolant cooler 14, the inverter 81B is connected to the coolant heater 15, the battery-temperature control heat exchanger 81A is not connected to both the coolant cooler 14 and the coolant heater 15; however, the battery-temperature control heat exchanger 81A may be connected to at least one of the coolant cooler 14 and the coolant heater 15 depending on a demand temperature of the battery-temperature control heat exchanger 81A and the temperature of the coolant.

In the engine heat-absorbing heat pump mode illustrated in FIG. 30, the first switching valve 18 and the second switching valve 19 control the flow rate of the coolant circulating through the coolant-coolant heat exchanger 81C in such a way that the temperature of the coolant flowing from the coolant-coolant heat exchanger 81C becomes approximately 10° C.

Figure 31:
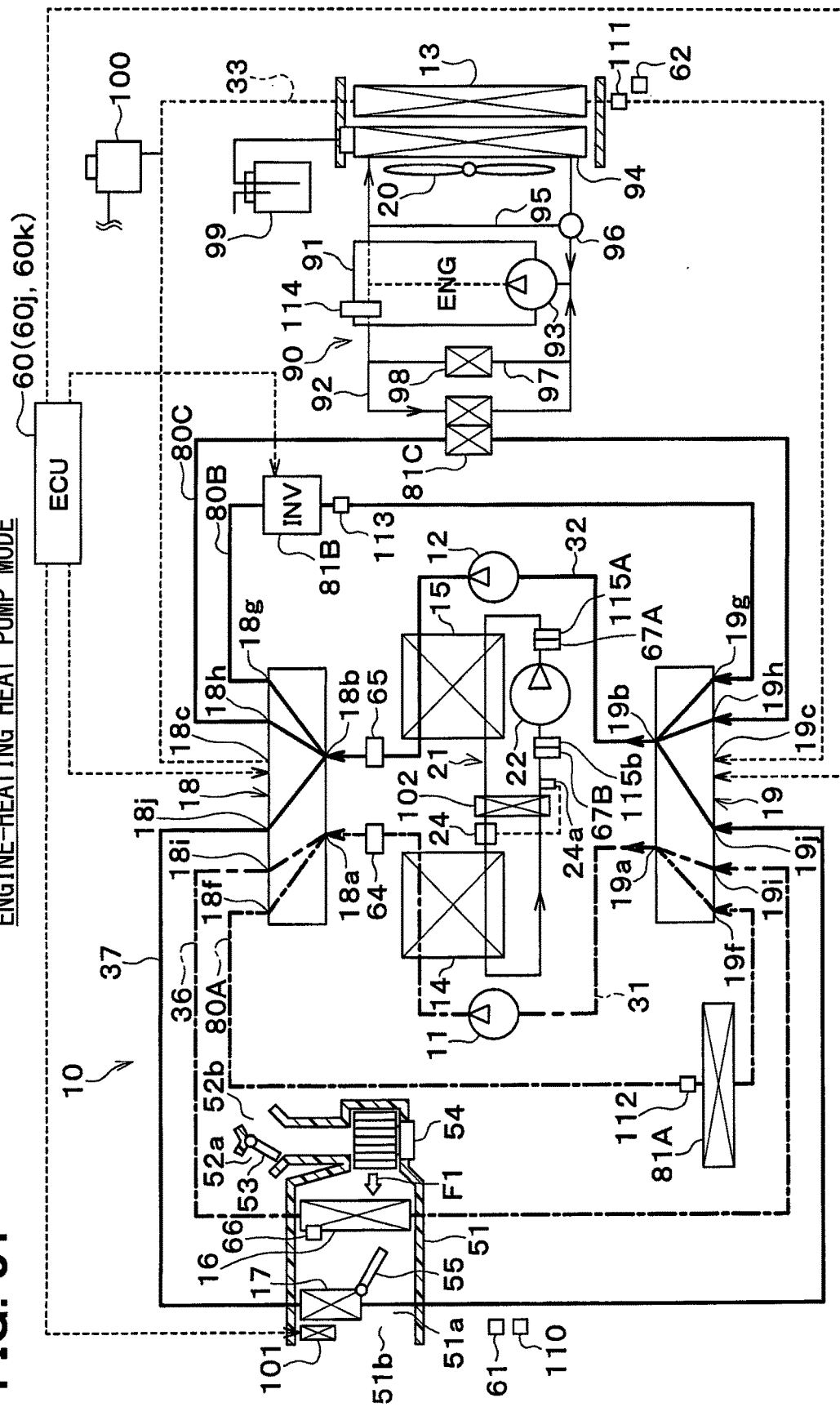
FIG. 31 is a diagram illustrating an example of the entire configuration of an engine-heating heat pump mode of the vehicle heat management system in the eighth embodiment.

FIG. 31 illustrates a specific example of the engine-heating heat pump mode. The solid line with arrows and the alternate one long and one short dashes line with arrows in FIG. 31 illustrate the flow of the coolant in the engine-heating heat pump mode.

For example, during a cooling operation, when the temperature detected by the engine coolant temperature sensor 114, that is, the temperature of the coolant circulating through the engine cooling circuit 90 is lower than a reference temperature (for example, 40° C.) which is set in advance, the engine-heating heat pump mode illustrated in FIG. 31 is executed.

Accordingly, since the engine 91 is warmed up by waste heat of cooling, fuel efficiency can be improved. Since the coolant heated in the coolant heater 15 flows through the engine 91, a change in the temperature of the coolant can be restricted by the thermal mass of the engine 91.

For example, during a heating operation, when the temperature detected by the engine coolant temperature sensor 114, that is, the temperature of the coolant circulating through the engine cooling circuit 90 exceeds a second reference temperature (temperature that satisfies a heating demand, and for example, 55° C.) which is set in advance, the engine waste heat-direct use mode illustrated in FIG. 27 is executed.

Accordingly, since the coolant heated in the coolant-coolant heat exchanger 81C flows through the heater core 17, the blast air into the vehicle interior is heated in the heater core 17.

In each of the aforementioned coolant flow modes, when the coolant starts to circulate to the radiator 13 by connecting the radiator 13 to either of the coolant cooler 14 and the coolant heater 15 in a state in which the circulation of the coolant to the radiator 13 is shut off, a change in the vehicle interior blow-out air temperature is preferably restricted by performing at least one of control in (1) and control in (2) below.

(1) The valve to allow and shut off the circulation of the coolant to the radiator 13 is slowly opened such that the circulation of the coolant starts slowly. Accordingly, a rapid change in the vehicle interior blow-out air temperature can be restricted.

(2) After a change in the vehicle interior blow-out air temperature is estimated in advance, and the opening of the air mix door 55 and the air volume of the inside blower 54 are adjusted, the coolant is allowed to circulate to the radiator 13. Accordingly, a change in the vehicle interior blow-out air temperature can be restricted. A change in the inside-cabin blown out air temperature after the circulation of the coolant to the radiator 13 is allowed is restricted by controlling the opening of the air mix door 55 and the air volume of the inside blower 54.

Hereinafter, a method of controlling the cooler core-blowout temperature TC and the heater core-blowout temperature TH will be described. The cooler core-blowout temperature TC is the temperature of the blast air cooled in the cooler core 16. The heater core blowout-temperature TH is the temperature of the blast air heated in the heater core 17.

Any one of first TC control, second TC control, third TC control, and fourth TC control is used as a control method by which the cooler core-blowout temperature TC approaches the cooler core-blowout target temperature TCO. Any one of first TH control, second TH control, third TH control, and fourth TH control is used as a control method by which the heater core-blowout temperature TH approaches the heater core-blowout target temperature THO.

(First TC Control)

In the first TC control, the radiator 13 and an arbitrary device of the devices 81A to 81C are connected to the cooler core 16, and the amount of heat transferred between the connected device and the cooler core 16 is controlled such that the cooler core-blowout temperature TC approaches the cooler core-blowout target temperature TCO.

For example, the amount of heat transferred between the connected device and the cooler core 16 is controlled by adjusting the flow rate of the coolant or the volume of air to the connected device, or controlling the amount of heat generated by the connected device. For example, when the connected device is the inverter 81B, the amount of heat generated by the inverter 81B is controlled by inefficiently operating the inverter 81B.

The device connected to the cooler core 16 may be not only the radiator 13 and the devices 81A to 81C, but also a coolant-heating PTC heater, a travel motor-generator, and the like. The amount of heat generated by the coolant-heating PTC heater can be controlled by controlling the energization of the coolant-heating PTC heater. The amount of heat generated by the travel motor-generator can be controlled by inefficiently driving the travel motor-generator.

In this embodiment, a generated heat-amount control unit 60k is formed of configuration elements (hardware and software) of the control device 60 to control the amount of heat generated by the device (the inverter 81B, the coolant-heating PTC heater, the travel motor-generator, and the like) connected to the cooler core 16.

For example, when the coolant temperature is lower than or equal to 0° C. in a state in which the cooler core 16 communicates with the radiator 13 and the dehumidification air-conditioning of the vehicle interior is performed using outside cool air, the first TC control is executed.

The frost (frost formation) of the cooler core 16 can be restricted by controlling the amount of heat transferred between the connected device and the cooler core 16 in such a way that the temperature of the coolant circulating through the cooler core 16 becomes a target temperature higher than or equal to 0° C.

(Second TC Control)

In the second TC control, the heat exchange capacity of the cooler core 16 is controlled such that the cooler core-blowout temperature TC approaches the cooler core-blowout target temperature TCO. For example, the heat exchange capacity of the cooler core 16 is controlled by adjusting the flow rate of the coolant or the volume of air to the cooler core 16, or adjusting the ratio between inside air and outside air of the air blown to the cooler core 16.

For example, when the coolant temperature is lower than or equal to 0° C. in a state in which the cooler core 16 communicates with the radiator 13, and the dehumidification air-conditioning of the vehicle interior is performed using outside cool air, the second TC control is executed.

The frost (frost formation) of the cooler core 16 can be restricted by allowing and shutting off (ON and OFF) the circulation of the coolant to the cooler core 16.

(Third TC Control)

The third TC control is a control method which is performed based on the assumption that the compressor 22 is in operation. In the third TC control, the radiator 13 and an arbitrary device of the devices 81A to 81C are connected to the heater core 17, and the amount of heat transferred between the connected device and the heater core 17 is controlled such that the cooler core-blowout temperature TC approaches the cooler core-blowout target temperature TCO.

For example, the amount of heat transferred between the connected device and the heater core 17 is controlled by adjusting the flow rate of the coolant or the volume of air to the connected device, or controlling the amount of heat generated by the connected device.

The device connected to the heater core 17 may be not only the radiator 13 and the devices 81A to 81C, but also the coolant-heating PTC heater, the travel motor-generator, and the like. The amount of heat generated by the coolant-heating PTC heater can be controlled by controlling the energization of the coolant-heating PTC heater. The amount of heat generated by the travel motor-generator can be controlled by inefficiently driving the travel motor-generator.

For example, when an occupant wishes to enable cooling in a state in which the control of the rotational speed of the compressor 22 is limited to a certain degree, the third TC control is executed. Examples of when the control of the rotational speed of the compressor 22 is limited to a certain degree include when the allowable rotational speed of the compressor 22 is set, and when the compressor 22 is a belt-driven compressor.

In the third TC control, the cooler core-blowout temperature TC can be controlled independent of the rotational speed of the compressor 22.

(Fourth TC Control)

In the fourth TC control, the flow rate of refrigerant is controlled such that the cooler core-blowout temperature TC approaches the cooler core-blowout target temperature TCO. For example, the flow rate of refrigerant is controlled by controlling the refrigerant discharging capacity (specifically, the rotational speed of the compressor 22) of the compressor 22, or adjusting the throttle passage area of the expansion valve 24.

(First TH Control)

In the first TH control, the radiator 13 and an arbitrary device of the devices 81A to 81C are connected to the heater core 17, and the amount of heat transferred between the connected device and the heater core 17 is controlled such that the heater core-blowout temperature TH approaches the heater-core blowout target temperature THO.

For example, the amount of heat transferred between the connected device and the heater core 17 is controlled by adjusting the flow rate of the coolant or the volume of air to the connected device, or controlling the amount of heat generated by the connected device.

For example, when the heater core 17 is connected to the coolant heater 15, the first TH control is executed. The pressure of the refrigerant of the refrigeration cycle 21 can be restricted from being excessively increased and a relief valve for safety can be restricted from being opened by controlling the amount of heat transferred between the connected device and the heater core 17 in such a way that the temperature of the coolant circulating through the coolant heater 15 does not exceed a predetermined value.

(Second TH Control)

In the second TH control, the heat exchange capacity of the heater core 17 is controlled such that the heater core-blowout temperature TH approaches the heater core-blowout target temperature THO. For example, the heat exchange capacity of the heater core 17 is controlled by adjusting the flow rate of the coolant or the volume of air to the heater core 17, or adjusting the ratio between inside air and outside air of the air blown to the heater core 17.

For example, when the vehicle-interior heating air-conditioning is performed using the waste heat of the engine 91, the second TH control is executed. The flow rate of the coolant circulating through the heater core 17 is controlled in such a way that a mean coolant temperature in the heater core 17 approaches a target temperature.

Accordingly, the vehicle interior blow-out air temperature TAV can be controlled without using the air mix door 55. For this reason, the air mix door 55 can be eliminated, and thus the size of the interior air conditioning unit 50 can be reduced.

For example, the second TH control is executed in the engine heat-absorbing heat pump mode. In the engine heat-absorbing heat pump mode, the amount of heat radiated in the coolant heater 15 is controlled through the control of the rotational speed of the compressor 22 in such a way that the temperature of the coolant in the heater core 17 becomes a target temperature.

In this case, the temperature of the low-pressure side refrigerant of the refrigeration cycle 21 is increased (for example, 40° C.), and thus even if the compressor 22 is operated at the minimum operation rotational speed (for example, approximately 1500 rotations), the temperature of the coolant in the heater core 17 may exceed the target temperature.

The flow rate of the coolant in the heater core 17 is controlled such that the temperature of the coolant in the heater core 17 becomes the target temperature. The efficiency is decreased to the extent that the temperature of the coolant is increased, and in the end, the capacity is balanced at the minimum rotational speed.

Accordingly, high-COP heating can be realized in the engine heat-absorbing heat pump mode. Also when the capacity of the compressor 22 is excessive at the minimum operation rotational speed, the compressor 22 can be operated.

(Third TH Control)

The third TH control is a control method which is performed based on the assumption that the compressor 22 is in operation. In the third TH control, the radiator 13 and an arbitrary device of the devices 81A to 81C communicate with the cooler core 16, and the amount of heat transferred between the connected device and the cooler core 16 is controlled such that the heater core-blowout temperature TH approaches the heater core-blowout target temperature THO.

For example, the amount of heat transferred between the connected device and the cooler core 16 is controlled by adjusting the flow rate of the coolant or the volume of air to the connected device, or controlling the amount of heat generated by the connected device.

For example, when an occupant wishes to enable cooling in a state in which the control of the rotational speed of the compressor 22 is limited to a certain degree, the third TH control is executed.

In the third TH control, the heater core-blowout temperature TH can be controlled independent of the rotational speed of the compressor 22.

(Fourth TH Control)

In the fourth TH control, the flow rate of refrigerant is controlled such that the heater core-blowout temperature TH approaches the heater core-blowout target temperature THO. For example, the flow rate of refrigerant is controlled by controlling the refrigerant discharging capacity (specifically, the rotational speed of the compressor 22) of the compressor 22, or adjusting the throttle passage area of the expansion valve 24.

The first to fourth TC control and the first to fourth TH control can be combined together. Specifically, any one of the first to fourth TC control can be combined with any one of the first to fourth TH control.

(Combination of First TC Control and First TH Control)

For example, when it is assumed or determined that the cooler core-blowout target temperature TCO is higher than or equal to the temperature of the device connected to the cooler core 16, a combination of the first TC control and the first TH control is executed.

For example, when the temperature of coolant in the device connected to the heater core 17 exceeds a predetermined temperature (for example, 55° C.), a combination of the first TC control and the first TH control is executed. When the temperature of coolant in the device connected to the heater core 17 exceeds the predetermined temperature (for example, 55° C.), the heater core-blowout temperature TH becomes excessive. For this reason, the temperature of coolant in the heater core 17 is restricted from exceeding the predetermined temperature (for example, 55° C.), and the heater core-blowout temperature TH is restricted from becoming excessive by controlling the amount of heat which is received from the device connected to the heater core 17.

For example, a combination of the first TC control and the first TH control is executed in an energy-saving dehumidification heating mode. The energy-saving dehumidification heating mode is an operating mode in which dehumidification is performed using the cold energy of outside air, and dehumidified air is re-heated using the waste heat of the engine 91 or the waste heat of various devices.

For example, a combination of the first TC control and the first TH control is executed in the engine heat-absorbing heat pump mode. In the engine heat-absorbing heat pump mode, a heating source is the coolant heater 15. In the engine heat-absorbing heat pump mode, an electric heater, the inverter 81B, or the like may be used as a heating source together with the coolant heater 15.

The device connected to the heater core 17 may be the engine 91. Specifically, a second coolant take-out port may be provided in the engine 91 such that the engine 91 may communicate with the heater core 17. When the engine coolant temperature is higher than or equal to a predetermined temperature (for example, which is higher than or equal to 55° C.), the waste heat of the engine 91 can be directly used in the heater core 17 while being absorbed and used in the refrigeration cycle 21.

(Combination of First TC Control and Second TH Control)

For example, when it is assumed or determined that the cooler core-blowout target temperature TCO is higher than or equal to the temperature of the device connected to the cooler core 16, a combination of the first TC control and the second TH control is executed.

For example, when the temperature of coolant in the device connected to the heater core 17 exceeds a predetermined temperature (for example, 55° C.), a combination of the first TC control and the second TH control is executed. The heater core-blowout temperature TH can be restricted from becoming excessive by allowing and shutting off (ON and OFF) the circulation of the coolant to the heater core 17.

For example, a combination of the first TC control and the second TH control is executed in the energy-saving dehumidification heating mode, or in an energy-saving dehumidification, heating, and cooling mode. The energy-saving dehumidification, heating, and cooling mode is an operating mode in which cooling and dehumidification are performed using the cold energy of a cold storage, and cooled and dehumidified air is re-heated using the waste heat of the engine 91 or the waste heat of various devices.

(Combination of Second TC Control and First TH Control)

For example, when the temperature of coolant in the device connected to the cooler core 16 is lower than 0° C., a combination of the second TC control and the first TH control is executed. The frost (frost formation) of the cooler core 16 can be restricted by allowing and shutting off (ON and OFF) the circulation of the coolant to the cooler core 16.

For example, when the temperature of coolant in the device connected to the heater core 17 exceeds a predetermined temperature (for example, 55° C.), a combination of the second TC control and the first TH control is executed. The heater core-blowout temperature TH can be restricted from becoming excessive by controlling the amount of heat which is received from the device connected to the heater core 17.

For example, a combination of the second TC control and the first TH control is executed in the energy-saving dehumidification heating mode, or in an energy-saving dehumidification, heating, and cooling mode.

For example, a combination of the second TC control and the first TH control is executed in the engine heat-absorbing heat pump mode, or when the temperature of the coolant in the engine 91 is lower than the cooler core-blowout target temperature TCO.

The device connected to the heater core 17 may be the engine 91. Specifically, a second coolant take-out port may be provided in the engine 91 such that the engine 91 may communicate with the heater core 17. When the engine coolant temperature is higher than or equal to a predetermined temperature (for example, which is higher than or equal to 55° C.), the waste heat of the engine 91 can be directly used in the heater core 17 while being absorbed and used in the refrigeration cycle 21.

(Combination of Second TC Control and Second TH Control)

For example, when the temperature of coolant in the device connected to the cooler core 16 is lower than 0° C., a combination of the second TC control and the second TH control is executed. The frost (frost formation) of the cooler core 16 can be restricted by allowing and shutting off (ON and OFF) the circulation of the coolant to the cooler core 16.

For example, when the temperature of coolant in the device connected to the heater core 17 exceeds a predetermined temperature (for example, 55° C.), a combination of the second TC control and the second TH control is executed. The heater core-blowout temperature TH can be restricted from becoming excessive by allowing and shutting off (ON and OFF) the circulation of the coolant to the heater core 17.

For example, a combination of the second TC control and the second TH control is executed in the energy-saving dehumidification heating mode, or in an energy-saving dehumidification, heating, and cooling mode.

(Combination of First TC Control and Fourth TH Control)

For example, when the refrigeration cycle 21 is required to draw the waste heat of the device connect to the cooler core 16 so that the heater core-blowout temperature TH can approach the heater core-blowout target temperature THO, a combination of the first TC control and the fourth TH control is executed.

For example, when the deviation between the temperature related to the temperature TC of the blast air which has been cooled in the cooler core 16 and the first target temperature TCO does not exceed a predetermined amount, a combination of the first TC control and the fourth TH control is executed.

For example, when the deviation between the heater core-blowout temperature TH and the heater core-blowout target temperature THO exceeds a predetermined amount, a combination of the first TC control and the fourth TH control is executed. Since the rotational speed of the compressor 22 is controlled such that the heater core-blowout temperature TH approaches the heater core-blowout target temperature THO, the heater core-blowout temperature TH can follow a change in temperature very well.

(Combination of Second TC Control and Fourth TH Control)

For example, when the temperature of coolant in the device connected to the cooler core 16 is lower than 0° C., a combination of the second TC control and the fourth TH control is executed. The frost (frost formation) of the cooler core 16 can be restricted by allowing and shutting off (ON and OFF) the circulation of the coolant to the cooler core 16.

(Combination of Third TC Control and Fourth TH Control)

For example, when the deviation between the heater core-blowout temperature TH and the heater core-blowout target temperature THO exceeds a predetermined amount, a combination of the third TC control and the fourth TH control is executed. Since the rotational speed of the compressor 22 is controlled such that the heater core-blowout temperature TH approaches the heater core-blowout target temperature THO, the heater core-blowout temperature TH can follow a change in temperature very well.

For example, when the coolant flow mode is switched to the heat radiation mode in step S180 in the first embodiment, a combination of the third TC control and the fourth TH control is executed. Accordingly, when the amount of heat is excessive for heating, heat can be radiated to the outside air in the radiator 13, and the temperature of the cooler core 16 and the temperature of the heater core 17 can be properly controlled.

For example, when the deviation between the cooler core-blowout temperature TC and the cooler core-blowout target temperature TCO does not exceed a predetermined amount, a combination of the third TC control and the fourth TH control is executed.

(Combination of Fourth TC Control and First TH Control)

For example, when the deviation between the cooler core-blowout temperature TC and the cooler core-blowout target temperature TCO exceeds a predetermined amount, a combination of the fourth TC control and the first TH control is executed. Since the rotational speed of the compressor 22 is controlled such that the cooler core-blowout temperature TC approaches the cooler core-blowout target temperature TCO, the cooler core-blowout temperature TC can follow a change in temperature very well.

For this reason, the temperature of the cooler core 16 can be restricted from being decreased, and thus frost can be restricted from occurring in the cooler core 16. As a result, the volume of air can be restricted from being decreased, and a freeze smell can be restricted from occurring. In addition, the temperature of the cooler core 16 can be restricted from being increased, and thus condensate of the cooler core 16 can be restricted from evaporating and causing unexpected foggy windows, or a nasty smell.

For example, when the deviation between the heater core-blowout temperature TH and the heater core-blowout target temperature THO does not exceed a predetermined amount, a combination of the fourth TC control and the first TH control is executed.

(Combination of Fourth TC Control and Second TH Control)

For example, when the temperature of coolant in the device connected to the heater core 17 exceeds a predetermined temperature (for example, 55° C.), a combination of the second TC control and the second TH control is executed. The heater core-blowout temperature TH can be restricted from becoming excessive by allowing and shutting off (ON and OFF) the circulation of the coolant to the heater core 17.

(Combination of Fourth TC Control and Third TH Control)

For example, when the deviation between the cooler core-blowout temperature TC and the cooler core-blowout target temperature TCO exceeds a predetermined amount, a combination of the fourth TC control and the third TH control is executed. Since the rotational speed of the compressor 22 is controlled such that the cooler core-blowout temperature TC approaches the cooler core-blowout target temperature TCO, the cooler core-blowout temperature TC can follow a change in temperature very well.

For example, when the coolant flow mode is switched to the heat absorption mode in step S190 in the first embodiment, a combination of the fourth TC control and the third TH control is executed. Accordingly, when the amount of heat is insufficient for heating, heat can be absorbed from the outside air in the radiator 13 such that the amount of heat is ensured for heating, and the temperature of the cooler core 16 and the temperature of the heater core 17 can be properly controlled.

For example, when the deviation between the heater core-blowout temperature TH and the heater core-blowout target temperature THO does not exceed a predetermined amount, a combination of the fourth TC control and the third TH control is executed.

(Combination of Second TC Control and Third TH Control, Combination of Third TC Control and Second TH Control, and Combination of Third TC Control and Third TH Control)

When the rotation speed of the compressor 22 is controlled independent of both the cooler core-blowout temperature TC and the heater core-blowout temperature TH, a combination of the second TC control and the third TH control, a combination of the third TC control and the second TH control, and a combination of the third TC control and the third TH control are executed.

Hereinafter, examples of when the rotation speed of the compressor 22 is controlled independent of both the cooler core-blowout temperature TC and the heater core-blowout temperature TH will be described.

When the compressor 22 is an electric compressor, for example, the compressor 22 may be brought into any one of the following cases in (1) to (11).

(1) A case in which an upper limit for the maximum rotational speed of the compressor 22 is set to satisfy vibration noise requirement, and mainly, in cooling and heating during idle stop.
(2) A case in which the rotational speed of the compressor 22 is limited such that the discharge pressure of the compressor 22 does not exceed a predetermined value (for example, 2.6 MPa to 3 MPa).
(3) A case in which, in order to protect the O-ring of the compressor 22, the rotational speed of the compressor 22 is limited such that the discharge temperature of the compressor 22 does not exceed a predetermined value (for example, 120° C.).
(4) A case in which, in order to prevent the O-ring of the compressor 22 from becoming hardened such that the fracture of the O-ring does not occur, or the sealing performance of the O-ring does not deteriorate, the rotational speed of the compressor 22 is limited such that the temperature of intake air into the compressor 22 is not lower than a predetermined value (for example, −30° C.).
(5) A case in which the rotational speed of the compressor 22 reaches the maximum allowable rotational speed that is set to protect the shaft and the bearings of the compressor 22 or is set due to a motor driver specification, or the like.
(6) A case in which the rotation of the compressor 22 is controlled at a given rotational speed so as to maintain good efficiency.
(7) A case in which the rotational speed of the compressor 22 is gradually increased to reach the maximum rotational speed over a set time period during the warm-up and cooling of the compressor 22.
(8) A case in which the rotational speed of the compressor 22 is decreased during the acceleration of a vehicle, or when electrical power is to be concentrated on another electric device. Examples of the case where electrical power is to be concentrated on another electric device include the case where the engine 91 is started up using the travel motor, or the case where priority is given to traveling when the output of a travel battery is limited because of a cold temperature and the like.
(9) A case in which the rotational speed of the compressor 22 is maintained at a given rotational speed over a predetermined amount of time to restrict the occurrence of control hunting.
(10) A case in which the compressor 22 capable of operating only at a given rotational speed is used to simplify a motor driver.
(11) A case in which the compressor 22 operates to increase a predetermined amount of capacity in addition to air conditioning requirement such that the compressor 22 complies with the demand of another device to be heated or cooled.

When the compressor 22 is a belt-driven compressor, and a fixed displacement compressor, the rotational speed of the compressor 22 is dependent on the rotational speed of the engine 91, and only the turn-on and turn-off of the compressor 22 can be controlled, and thus the rotational speed of the compressor 22 is controlled independent of both the cooler core-blowout temperature TC and the heater core-blowout temperature TH.

The control device 60 switches the control mode among the first to fourth TC control and the first to fourth TH control in response to various conditions.

In addition to the first to fourth TC control and the first to fourth TH control, the control device 60 performs control in such a way that the blow-out air temperature TAV approaches the target blow-out air temperature TAO. For example, the air volume of the inside blower 54 or the operation of the air mix door 55 is controlled such that the blow-out air temperature TAV approaches the target blow-out air temperature TAO.

For example, when a rapid temperature change occurs due to a change in the temperature of the connected device or the surrounding temperature, the air mix door 55 is quickly operated such that a change in the blowout temperature is restricted. That is, a control delay induced by the thermal mass (the amount of heat) of the coolant and the refrigerant is compensated.

Also during a dehumidification and heating operation, when the air mix door 55 does not fully close but slightly open the heater core bypass passage 51a, preparation can be made for when a change such as the blow-out air temperature TAV being lower than the target blow-out air temperature TAO occurs.

When a change such as the blow-out air temperature TAV being lower than the target blow-out air temperature TAO occurs, the blow-out air temperature TAV can be increased by the auxiliary heater 101.

When the blow-out air temperature TAV exceeds the target blow-out air temperature TAO, the air mix door 55 is operated in such a way that the volume of air passing through the heater core bypass passage 51a is increased.

Hereinafter, a specific operation example of when the first to fourth TC control and the first to fourth TH control are applied to the engine heat-absorbing heat pump mode will be described.

(Combination of First TC Control and First TH Control)

When the cooler core 16, the coolant-coolant heat exchanger 81C, and the coolant cooler 14 are connected to one another, the heater core 17, the coolant heater 15, and the inverter 81B, and the like are connected to one another such that dehumidification is performed in the engine heat-absorbing heat pump mode, the first TC control is executed such that the cooler core-blowout temperature TC becomes 0° C., and the first TH control is executed such that the heater core-blowout temperature TH becomes a predetermined temperature (for example, 55° C.). In the first TH control, the rotational speed of the compressor 22 may be controlled.

(Combination of First TC Control and Second TH Control)

When the cooler core 16, the coolant-coolant heat exchanger 81C, and the coolant cooler 14 are connected to one another, the heater core 17 and the coolant heater 15 are connected to each other such that the temperature of the coolant heated in the coolant heater 15 is excessively increased, the second TH control is executed to reduce the flow rate of coolant in the heater core 17 such that the heater core-blowout temperature TH can be restricted from exceeding the heater core-blowout target temperature THO.

(Combination of First TC Control and Fourth TH Control)

When the cooler core 16, the coolant-coolant heat exchanger 81C, and the coolant cooler 14 are connected to one another, the heater core 17 and the coolant heater 15 are connected to each other such that dehumidification is performed in the engine heat-absorbing heat pump mode, the first TC control is executed such that the cooler core-blowout temperature TC becomes 0° C., and the fourth TH control (for example, the control of the rotational speed of the compressor 22) is executed such that the heater core-blowout temperature TH becomes a predetermined temperature (for example, 55° C.).

(Combination of Second TC Control and First TH Control)

In a state where the cooler core 16, the coolant-coolant heat exchanger 81C, and the coolant cooler 14 are connected to one another, the heater core 17, the coolant heater 15, the inverter 81B, and the like are connected to one another such that dehumidification is performed in the engine heat-absorbing heat pump mode, when the temperature of coolant in the engine 91 is lower than the cooler core-blowout target temperature TCO (for example, 10° C.), the second TC control is executed to reduce the flow rate of coolant in the cooler core 16 such that the cooler core-blowout temperature TC can approach the cooler core-blowout target temperature TCO.

In addition, the first TH control is executed in such a way that the heater core-blowout temperature TH becomes a predetermined temperature (for example, 55° C.). In the first TH control, the rotational speed of the compressor 22 may be controlled.

(Combination of Second TC Control and Second TH Control)

When the temperature of coolant in the heater core 17 is higher than or equal to a predetermined temperature (for example, 55° C.), and the temperature of coolant in the engine 91 is lower than the cooler core-blowout target temperature TCO (for example, 10° C.), the second TC control is executed such that the cooler core-blowout temperature TC can approach the cooler core-blowout target temperature TCO, and the heater core-blowout temperature TH can approach the heater core-blowout target temperature THO. That is, the rotation of the compressor 22 for cooling and dehumidification in the cooler core 16 is not required.

(Combination of Second TC Control and Fourth TH Control)

When the cooler core 16, the coolant-coolant heat exchanger 81C, and the coolant cooler 14 are connected to one another, the heater core 17, the coolant heater 15, the inverter 81B, and the like are connected to one another such that dehumidification is performed in the engine heat-absorbing heat pump mode, the second TC control is executed to reduce the flow rate of coolant in the cooler core 16 such that the cooler core-blowout temperature TC can approach the cooler core-blowout target temperature TCO, and the first TH control is executed such that the heater core-blowout temperature TH becomes a predetermined temperature (for example, 55° C.).

(Combination of Third TC Control and Third TH Control)

In a state where the cooler core 16, the coolant-coolant heat exchanger 81C, and the coolant cooler 14 are connected to one another, the heater core 17, the coolant heater 15, the inverter 81B, and the like are connected to one another such that dehumidification is performed in the engine heat-absorbing heat pump mode, when the rotational speed of the compressor 22 is controlled independent of both the cooler core-blowout temperature TC and the heater core-blowout temperature TH, the third TC control is executed such that the temperature of coolant in the cooler core 16 becomes 0° C., and the third TH control is executed such that the heater core-blowout temperature TH becomes a predetermined temperature (for example, 55° C.).

(Second TH Control Only)

When the cooler core 16, the coolant-coolant heat exchanger 81C, and the coolant cooler 14 are connected to one another, the heater core 17 and the coolant heater 15 are connected to one another such that dehumidification is performed in the engine heat-absorbing heat pump mode, the second TH control is executed such that the heater core-blowout temperature TH becomes a predetermined temperature (for example, 55° C.), and the first to fourth TC control is not executed.

In the first to fourth TH control, the heater core-blowout temperature TH approaches the heater core-blowout target temperature THO; however, the blow-out air temperature TAV may approach the target blow-out air temperature TAO.

In this embodiment, when the heat transfer devices 13 and 81 transfer heat with the coolant heated in the coolant heater 15, the control device 60 adjusts the flow rate of the coolant flowing through the heat transfer devices 13 and 81 in such a way that the temperature related to the temperature TH of the blast air (which is heated in the heater core 17) approaches the second target temperature THO (the first TH control). In addition, the control device 60 adjusts the flow rate of the refrigerant discharged from the compressor 22 in such a way that the temperature related to the temperature TC of the blast air (which has been cooled in the cooler core 16) approaches the first target temperature TCO (the fourth TC control).

Accordingly, the heat transfer devices 13 and 81 can be heated by an amount of heat that is recovered from the blast air in the cooler core 16, and the temperature of the cooler core 16 and the temperature of the heater core 17 can be properly controlled.

In this embodiment, when the coolant heated in the coolant heater 15 radiates heat to the outside air in the radiator 13, the control device 60 adjusts the flow rate of at least one of the coolant and the outside air flowing through the radiator 13 in such a way that the temperature TC, which is related to the temperature of the blast air cooled in the cooler core 16, approaches the first target temperature TCO (the third TC control). In addition, the control device 60 adjusts the flow rate of the refrigerant discharged from the compressor 22 in such a way that the temperatures related to the temperatures TH and TAV of the blast air which has been heated in the heater core 17 approach the second target temperatures THO and TAO (the fourth TH control).

Accordingly, the temperature of the cooler core 16 and the temperature of the heater core 17 can be properly controlled. In particular, since the temperature of the heater core 17 is controlled by the flow rate of the refrigerant, the temperature followability of the heater core 17 can be improved.

In this embodiment, when the coolant cooled in the coolant cooler 14 absorbs heat from the outside air in the radiator 13, the control device 60 adjusts the flow rate of at least one of the coolant and the outside air flowing through the radiator 13 in such a way that the temperatures TH and TAV, which are related to the temperature of the blast air heated in the heater core 17, approach the second target temperatures THO and TAO (the third TH control). In addition, the control device 60 adjusts the flow rate of the refrigerant discharged from the compressor 22 in such a way that the temperature related to the temperature TC of the blast air which has been cooled in the cooler core 16 approaches the first target temperature TCO (the fourth TC control).

Accordingly, the temperature of the cooler core 16 and the temperature of the heater core 17 can be properly controlled. In particular, since the temperature of the cooler core 16 is controlled by the flow rate of the refrigerant, the temperature followability of the cooler core 16 can be improved.

In this embodiment, when it is determined that the flow rate of the coolant or the outside air flowing through the radiator 13 is lower than a predetermined flow rate, and the blow-out air temperature TAV is lower than the second target temperature TAO, the first switching valve 18 and the second switching valve 19 are switched such that the coolant cooled in the coolant cooler 14 flows to the radiator 13 (the heat absorption mode). The control device 60 adjusts the flow rate of at least one of the coolant and the outside air flowing through the radiator 13 in such a way that the temperatures TH and TAV, which are related to the temperature of the blast air heated in the heater core 17, approach the second target temperature THO and TAO (the third TH control). The control device 60 adjusts the flow rate of the refrigerant discharged from the compressor 22 in such a way that the temperature related to the temperature TC of the blown out air which has been cooled in the cooler core 16 approaches the first target temperature TCO (the fourth TC control).

Accordingly, when the amount of heat is insufficient for heating, heat can be absorbed from the outside air in the radiator 13 such that the amount of heat is ensured for heating, and the temperature of the cooler core 16 and the temperature of the heater core 17 can be properly controlled.

In this embodiment, when it is determined that the flow rate of the coolant or the outside air flowing through the radiator 13 is lower than the predetermined flow rate, and the blow-out air temperature TAV is higher than or equal to the second target temperature TAO, the first switching valve 18 and the second switching valve 19 are switched such that the coolant heated in the coolant heater 15 flows to the radiator 13 (the heat radiation mode). The control device 60 adjusts the flow rate of at least one of the coolant and the outside air flowing through the radiator 13 in such a way that the temperature related to the temperature TC of the blast air which has been cooled in the cooler core 16 approaches the first target temperature TCO (the third TC control). The control device 60 adjusts the flow rate of the refrigerant discharged from the compressor 22 in such a way that the temperatures TH and TAV, which are related to the temperature of the blown out air heated in the heater core 17, approach the second target temperatures THO and TAO (the fourth TH control).

Accordingly, when the amount of heat is excessive for heating, heat can be radiated to the outside air in the radiator 13, and the temperature of the cooler core 16 and the temperature of the heater core 17 can be properly controlled.

In this embodiment, in a state where the coolant heated in the coolant heater 15 flows to the radiator 13, when it is determined that the deviation between the temperature related to the temperature TC of the blast air which has been cooled in the cooler core 16 and the first target temperature TCO does not exceed the predetermined amount, or it is assumed or determined that the deviation therebetween does not exceed the predetermined amount, the control device 60 adjusts the flow rate of at least one of the coolant and the outside air flowing through the radiator 13 in such a way that the temperature related to the temperature TC of the blast air which has been cooled in the cooler core 16 approaches the first target temperature TCO (the third TC control). In addition, the control device 60 adjusts the flow rate of the refrigerant discharged from the compressor 22 in such a way that the temperatures related to the temperatures TH and TAV of the blown out air which has been heated in the heater core 17 approach the second target temperatures THO and TAO (the fourth TH control).

In contrast, when the deviation between the temperature related to the temperature TC of the blast air which has been cooled in the cooler core 16 and the first target temperature TCO exceeds the predetermined amount, the control device 60 adjusts the flow rate of at least one of the coolant and the outside air flowing through the radiator 13 in such a way that the temperature related to the temperatures TH and TAV of the blast air which has been heated in the heater core 17 approaches the second target temperatures THO and TAO (the first TH control). In addition, the control device 60 adjusts the flow rate of the refrigerant discharged from the compressor 22 in such a way that the temperature related to the temperature TC of the blown out air which has been cooled in the cooler core 16 approaches the first target temperature TCO (the fourth TC control).

Accordingly, when the deviation between the temperature related to the temperature TC of the blast air which has been cooled in the cooler core 16 and the first target temperature TCO exceeds the predetermined amount, or it is assumed or determined that the deviation therebetween exceeds the predetermined amount, the temperature of the cooler core 16 is controlled by the flow rate of the refrigerant, and thus the temperature followability of the cooler core 16 can be improved.

For this reason, the temperature of the cooler core 16 can be restricted from being decreased, and thus frost can be restricted from occurring in the cooler core 16. As a result, the volume of air can be restricted from being decreased, and a freeze smell can be restricted from occurring. In addition, the temperature of the cooler core 16 can be restricted from being increased, and thus condensate of the cooler core 16 can be restricted from evaporating and causing unexpected foggy windows, or a nasty smell.

In this embodiment, in a state where the coolant heated in the coolant heater 15 flows to the radiator 13, when the deviations between the temperature related to the temperatures TH and TAV of the blast air which has been heated in the heater core 17 and the second target temperatures THO and TAO do not exceed the predetermined amounts, or it is assumed or determined that the deviations therebetween do not exceed the predetermined amounts, the control device 60 adjusts the flow rate of at least one of the coolant and the outside air flowing through the radiator 13 in such a way that the temperatures related to the temperatures TH and TAV of the blast air which has been heated in the heater core 17 approach the second target temperatures THO and TAO (the first TH control). In addition, the control device 60 adjusts the flow rate of the refrigerant discharged from the compressor 22 in such a way that the temperature related to the temperature TC of the blown out air which has been cooled in the cooler core 16 approaches the first target temperature TCO (the fourth TC control).

In contrast, when the deviations between the temperatures related to the temperatures TH and TAV of the blast air which has been heated in the heater core 17 and the second target temperatures THO and TAO exceed the predetermined amounts, or it is assumed or determined that the deviations therebetween exceed the predetermined amounts, the control device 60 adjusts the flow rate of at least one of the coolant and the outside air flowing through the radiator 13 in such a way that the temperature related to the temperature TC of the blast air which has been cooled in the cooler core 16 approaches the first target temperature TCO (the third TC control). In addition, the control device 60 adjusts the flow rate of the refrigerant discharged from the compressor 22 in such a way that the temperatures related to the temperatures TH and TAV of the blown out air which has been heated in the heater core 17 approach the second target temperatures THO and TAO (the fourth TH control).

Accordingly, when the deviations between the temperatures related to the temperatures TH and TAV of the blast air which has been heated in the heater core 17 and the second target temperatures THO and TAO exceed the predetermined amounts, the temperature of the heater core 17 is controlled by the flow rate of the refrigerant, and thus the temperature followability of the heater core 17 can be improved.

For this reason, a change in the temperature of the air blown into the vehicle interior can be restricted in an early stage, and thus air conditioning comfort can be improved.

In this embodiment, in a state where the coolant cooled in the coolant cooler 14 flows to the radiator 13, when the deviation between the temperature related to the temperature TC of the blast air which has been cooled in the cooler core 16 and the first target temperature TCO does not exceed the predetermined amount, or it is assumed or determined that the deviation therebetween does not exceed the predetermined amount, the control device 60 adjusts the flow rate of at least one of the coolant and the outside air flowing through the radiator 13 in such a way that the temperature related to the temperature TC of the blast air which has been cooled in the cooler core 16 approaches the first target temperature TCO. (the first TC control). In addition, the control device 60 adjusts the flow rate of the refrigerant discharged from the compressor 22 in such a way that the temperatures related to the temperatures TH and TAV of the blown out air which has been heated in the heater core 17 approach the second target temperatures THO and TAO (the fourth TH control).

In contrast, when the deviation between the temperature related to the temperature TC of the blast air which has been cooled in the cooler core 16 and the first target temperature TCO exceeds the predetermined amount, or it is assumed or determined that the deviation therebetween exceeds the predetermined amount, the control device 60 adjusts the flow rate of at least one of the coolant and the outside air flowing through the radiator 13 in such a way that the temperatures related to the temperatures TH and TAV of the blast air which has been heated in the heater core 17 approach the second target temperatures THO and TAO (the third TH control). In addition, the control device 60 adjusts the flow rate of the refrigerant discharged from the compressor 22 in such a way that the temperature related to the temperature TC of the blown out air which has been cooled in the cooler core 16 approaches the first target temperature TCO (the fourth TC control).

Accordingly, when the deviation between the temperature related to the temperature TC of the blast air which has been cooled in the cooler core 16 and the first target temperature TCO exceeds the predetermined amount, the temperature of the cooler core 16 is controlled by the flow rate of the refrigerant, and thus the temperature followability of the cooler core 16 can be improved.

For this reason, the temperature of the cooler core 16 can be restricted from being decreased, and thus frost can be restricted from occurring in the cooler core 16. As a result, the volume of air can be restricted from being decreased, and a freeze smell can be restricted from occurring. In addition, the temperature of the cooler core 16 can be restricted from being increased, and thus condensate of the cooler core 16 can be restricted from evaporating and causing unexpected foggy windows, or a nasty smell.

In this embodiment, in a state where the coolant cooled in the coolant cooler 14 flows to the radiator 13, when the deviations between the temperatures related to the temperatures TH and TAV of the blast air which has been heated in the heater core 17 and the second target temperatures THO and TAO do not exceed the predetermined amounts, the control device 60 adjusts the flow rate of at least one of the coolant and the outside air flowing through the radiator 13 in such a way that the temperatures related to the temperatures TH and TAV of the blast air which has been heated in the heater core 17 approach the second target temperatures THO and TAO (the third TH control). In addition, the control device 60 adjusts the flow rate of the refrigerant discharged from the compressor 22 in such a way that the temperature related to the temperature TC of the blown out air which has been cooled in the cooler core 16 approaches the first target temperature TCO (the fourth TC control).

In contrast, when the deviations between the temperatures related to the temperatures TH and TAV of the blast air which has been heated in the heater core 17 and the second target temperatures THO and TAO exceed the predetermined amounts, the control device 60 adjusts the flow rate of at least one of the coolant and the outside air flowing through the radiator 13 in such a way that the temperature related to the temperature TC of the blast air which has been cooled in the cooler core 16 approaches the first target temperature TCO (the first TC control). In addition, the control device 60 adjusts the flow rate of the refrigerant discharged from the compressor 22 in such a way that the temperatures related to the temperatures TH and TAV of the blown out air which has been heated in the heater core 17 approach the second target temperatures THO and TAO (the fourth TH control).

Accordingly, when the deviations between the temperatures related to the temperatures TH and TAV of the blast air which has been heated in the heater core 17 and the second target temperatures THO and TAO exceed the predetermined amounts, the temperature of the heater core 17 is controlled by the flow rate of the refrigerant, and thus the temperature followability of the heater core 17 can be improved.

For this reason, a change in the temperature of the air blown into the vehicle interior can be restricted in an early stage, and thus air conditioning comfort can be improved.

In this embodiment, the control device 60 adjusts an air volume ratio between the volume of blast air which has been cooled in the cooler core 16 and passes through the heater core 17, and the volume of blast air which has been cooled in the cooler core 16 and does not pass through the heater core 17, in such a way that the temperature related to the blow-out air temperature TAV approaches the third target temperature TAO. Accordingly, the blow-out air temperature TAV can be properly controlled.

In this embodiment, the control device 60 adjusts the volume of blast air in such a way that the temperature related to the blow-out air temperature TAV approaches the third target temperature TAO. Accordingly, the blow-out air temperature TAV can be properly controlled.

In this embodiment, the control device 60 adjusts the ratio between inside air and outside air of the blast air in such a way that the temperature related to the blow-out air temperature TAV approaches the third target temperature TAO. Accordingly, the blow-out air temperature TAV can be properly controlled.

In this embodiment, the control device 60 adjusts the amount of heat generated by the electric heater 101 in such a way that the temperature related to the blow-out air temperature TAV approaches the third target temperature TAO. Accordingly, the blow-out air temperature TAV can be properly controlled.

In this embodiment, the coolant-coolant heat exchanger 81C exchanges heat between the coolant cooled in the coolant cooler 14 and the engine coolant circulating through the engine 91. For this reason, a heat pump operation (the engine heat-absorbing heat pump mode), in which heat is drawn from the engine 91, can be realized.

In this embodiment, the coolant-coolant heat exchanger 81C is disposed on the coolant-coolant heat exchanger flow path 80C; however, instead of the coolant-coolant heat exchanger 81C, the engine 91 may be disposed on the coolant-coolant heat exchanger flow path 80C, and the coolant, the temperature of which has been adjusted in the coolant cooler 14 or the coolant heater 15, may circulate through the coolant flow channel of the engine 91.

In this embodiment, the first switching valve 18 and the second switching valve 19 switch between a state in which the coolant cooled in the coolant cooler 14 is allowed to flow to the radiator 13 and a state in which the coolant cooled in the coolant cooler 14 is allowed to flow to the heat transfer devices 13 and 81.

Accordingly, the operation mode can switch between the outside air heat-absorbing heat pump mode and the engine heat-absorbing heat pump mode (the device heat-absorbing heat pump mode). When high COP heating can be executed depending on an engine operation state, the operation mode is switched to the engine heat-absorbing heat pump mode such that fuel consumption for heating can be reduced.

In this embodiment, the first switching valve 18 and the second switching valve 19 switch between a state in which the coolant heated in the heat transfer devices 13 and 81 is allowed to flow to the coolant cooler 14 and a state in which the coolant heated in the heat transfer devices 13 and 81 is allowed to flow to the heater core 17.

Accordingly, the first switching valve 18 and the second switching valve 19 can switch between the engine waste heat-direct use mode (the device waste heat-direct use mode) and the engine heat-absorbing heat pump mode (the device heat-absorbing heat pump mode).

When the compressor 22 may not be operated depending on an engine operation state, the operation mode is switched to the engine waste heat-direct use mode such that the coolant heated by the waste heat of the engine 91 directly flows to the heater core 17. Accordingly, fuel consumption for heating can be reduced.

In this embodiment, the first switching valve 18 and the second switching valve 19 switch between a state in which the coolant heated in the coolant heater 15 is allowed to flow to the heater core 17 and a state in which the coolant heated in the heat transfer devices 13 and 81 is allowed to flow to the heater core 17.

Accordingly, the first switching valve 18 and the second switching valve 19 can switch between the engine waste heat-direct use mode (the device waste heat-direct use mode) and the outside air heat-absorbing heat pump mode.

Hereinafter, among the radiator 13 and the device 81 (81A, 81B, and 81C), a first heat transfer device refers to a heat transfer device that transfers heat with the coolant circulated by the first pump 11, and a second heat transfer device refers to a heat transfer device that transfers heat with the coolant circulated by the second pump 12.

In this embodiment, the control device 60 adjusts the amount of heat transferred between the first heat transfer devices 13 and 81 and the coolant, or the heat exchange capacity of the cooler core 16 in such a way that the temperature related to the temperature TC of the blast air which has been cooled in the cooler core 16 approaches the first target temperature TCO (the first TC control and the second TC control). In addition, the control device 60 adjusts the amount of heat transferred between the second heat transfer devices 13 and 81 and the coolant, or the heat exchange capacity of the heater core 17 in such a way that the temperatures related to the temperatures TH and TAV of the blast air which has been heated in the heater core 17 approach the second target temperatures THO and TAO (the first TH control and the second TH control).

Accordingly, both the temperature of the cooler core 16 and the temperature of the heater core 17 can be properly controlled.

In this embodiment, a coolant flow mode, in which the cooler core 16 cools blast air using the coolant cooled in the coolant cooler 14 of the refrigeration cycle 21, and the heater core 17 heats blast air using the coolant heated in the coolant heater 15 of the refrigeration cycle 21, is set.

In this coolant flow mode, the control device 60 adjusts the heat exchange capacity of the cooler core 16, or the amount of heat transferred between the second heat transfer devices 13 and 81 and the coolant in such a way that the temperature related to the temperature TC of the blast air which has been cooled in the cooler core 16 approaches the first target temperature TCO (the second TC control and the third TC control). In addition, the control device 60 adjusts the heat exchange capacity of the heater core 17, or the amount of heat transferred between the first heat transfer devices 13 and 81 and the coolant in such a way that the temperatures related to the temperatures TH and TAV of the blast air which has undergone heat exchange in the heater core 17 approach the second target temperatures THO and TAO (the second TH control and the third TH control).

Accordingly, both the temperature of the cooler core 16 and the temperature of the heater core 17 can be properly controlled.

For example, the control device 60 adjusts the amount of heat transferred between the first heat transfer devices 13 and 81 and the coolant by adjusting the flow rate of the coolant in the first heat transfer devices 13 and 81 (the first TC control and the third TH control).

For example, the control device 60 adjusts the amount of heat transferred between the first heat transfer devices 13 and 81 and the coolant by adjusting the amount of heat generated by the first heat transfer devices 13 and 81 (the first TC control and the third TH control).

For example, the control device 60 adjusts the heat exchange capacity of the cooler core 16 by adjusting the flow rate of the coolant in the cooler core 16 (the second TC control).

For example, the control device 60 adjusts the heat exchange capacity of the cooler core 16 by adjusting the volume of air blown through the cooler core 16 (the second TC control).

For example, the control device 60 adjusts the amount of heat transferred between the second heat transfer devices 13 and 81 and the coolant by adjusting the flow rate of the coolant in the second heat transfer devices 13 and 81 (the third TC control and the first TH control).

For example, the control device 60 adjusts the amount of heat transferred between the second heat transfer devices 13 and 81 and the coolant by adjusting the amount of heat generated by the second heat transfer devices 13 and 81 (the third TC control and the first TH control).

For example, the control device 60 adjusts the heat exchange capacity of the heater core 17 by adjusting the flow rate of the coolant in the heater core 17 (the second TH control).

For example, the control device 60 adjusts the heat exchange capacity of the heater core 17 by adjusting the volume of air blown through the heater core 17 (the second TH control).

In this embodiment, when the first TC control, the second TC control, or the third TC control is executed, and the first TH control, the second TH control, or the third TH control is executed, the control device 60 controls the rotational speed of the compressor 22 in a predetermined range. Accordingly, the control hunting of the compressor 22 can be prevented, and both the temperature of the cooler core 16 and the temperature of the heater core 17 can be properly controlled.

In this embodiment, when the control device 60 adjusts or starts to adjust the flow rate of the refrigerant discharged from the compressor 22 in such a way that any one temperature (hereinafter, which is referred to as a reference temperature) of the temperature related to the cooler core-blowout temperature TC, the temperature related to the heater core-blowout temperature TH, and the temperature related to the blow-out air temperature TAV approaches fourth target temperatures TCO, THO, and TAO, the control device 60 executes the first TC control, the second TC control, or the third TC control, the first TH control, the second TH control, or the third TH control in such a way that temperatures other than the reference temperatures of the temperature related to the temperature TC of the blast air cooled in the cooler core 16, the temperatures related to the temperatures TH and TAV of the blast air heated in the heater core 17, and the temperature related to the blow-out air temperature TAV approach fifth target temperatures TCO, THO, TAO.

Accordingly, temperature followability can be improved by controlling any one temperature of the cooler core-blowout temperature TC, the heater core-blowout temperature TH, and the blow-out air temperature TAV through the adjustment of the flow rate of refrigerant, and thus air conditioning comfort can be improved.

In this embodiment, the first switching valve 18 and the second switching valve 19 switch between a state in which the coolant cooled in the coolant-cooling heat exchanger 14 is allowed to flow to either the first heat transfer devices 13 and 81 or the second heat transfer devices 13 and 81 or both and a state in which the coolant heated in the coolant-heating heat exchanger 15 is allowed to flow to either the first heat transfer devices 13 and 81 or the second heat transfer devices 13 and 81 or both.

Accordingly, the first switching valve 18 and the second switching valve 19 can switch between an operating mode in which heat is absorbed from at least one of the heat transfer devices and a mode in which waste heat is transferred to at least one of the heat transfer devices.

In this embodiment, the first heat transfer device is the coolant-coolant heat exchanger 81C that exchanges heat between the coolant cooled in the coolant-cooling heat exchanger 14 and the engine coolant circulating through the engine 91.

Accordingly, in a heat pump operation in which the waste heat of the engine 91 is absorbed, the temperature of the cooler core 16 can be properly controlled. In addition, since the coolant temperature in the coolant cooler 14 can be properly increased also at low outside temperature, high COP heating can be realized.

In this embodiment, the first heat transfer device may be the engine 91 with a circulation flow path for coolant which has been cooled in the coolant-cooling heat exchanger 14, and the temperature of which is adjusted in the coolant temperature-adjusting heat exchangers 14 and 15.

In this embodiment, the first switching valve 18 and the second switching valve 19 switch between a state in which the coolant cooled in the coolant-cooling heat exchanger 14 is allowed to flow to one of the radiator 13 and the first heat transfer device 81, and is not allowed to flow to the other and a state in which the coolant cooled in the coolant-cooling heat exchanger 14 is allowed to flow to the other of the radiator 13 and the first heat transfer device 81, and is not allowed to the one.

Accordingly, when the first heat transfer device 81 heats the coolant, the first switching valve 18 and the second switching valve 19 can switch between the outside air heat-absorbing heat pump mode and the device heat-absorbing heat pump mode (the engine heat-absorbing heat pump mode).

In this embodiment, the first switching valve 18 and the second switching valve 19 switch between a state in which the coolant flowing through the first heat transfer device 81 is allowed to flow to one of the heater core 17 and the coolant-cooling heat exchanger 14, and is not allowed to flow to the other and a state in which the coolant flowing through the first heat transfer device 81 is allowed to flow to the other of the heater core 17 and the coolant-cooling heat exchanger 14, and is not allowed to flow to the one.

Accordingly, when the first heat transfer device 81 heats the coolant, the first switching valve 18 and the second switching valve 19 can switch between the engine waste heat-direct use mode (the device waste heat-direct use mode) and the engine heat-absorbing heat pump mode (the device heat-absorbing heat pump mode).

In this embodiment, the first switching valve 18 and the second switching valve 19 switch between a state in which the coolant is allowed to circulate between the heater core 17 and one of the first heat transfer device 81 and the second heat transfer device 81 and a state in which the coolant cooled in the coolant-cooling heat exchanger 14 is allowed to flow to the radiator 13.

Accordingly, the first switching valve 18 and the second switching valve 19 can switch between the engine waste heat-direct use mode (the device waste heat-direct use mode) and the outside air heat-absorbing heat pump mode.

Hereinafter, the first heat transfer device refers to the heat transfer devices 18 and 31 that transfer heat with the coolant circulated by one pump of the first pump 11 and the second pump 12, and the second heat transfer device refers to the heat transfer devices 18 and 31 that transfer heat with the coolant circulated by the other pump of the first pump 11 and the second pump 12. In addition, a first coolant-to-air heat exchanger (first heat medium-to-air heat exchanger) refers to a heat exchanger that exchanges heat between the coolant circulated by one pump of the cooler core 16 and the heater core 17 and the blast air, and a second coolant-to-air heat exchanger (second heat medium-to-air heat exchanger) refers to a heat exchanger that exchanges heat between the coolant circulated by the other pump of the cooler core 16 and the heater core 17 and the blast air.

In this embodiment, the control device 60 adjusts the amount of heat transferred between the first heat transfer devices 13 and 81 and the coolant, or the heat exchange capacity of the first coolant-to-air heat exchangers 16 and 17 in such a way that the temperatures related to the temperatures TC and TH of the blast air, the temperature of which has been adjusted in the first coolant-to-air heat exchangers 16 and 17, approach the first target temperatures TCO and THO (the first TC control, the second TC control, the first TH control, and the second TH control).

Accordingly, the temperatures of the first coolant-to-air heat exchangers 16 and 17 can be properly controlled.

For example, the control device 60 adjusts the amount of heat transferred between the first heat transfer devices 13 and 81 and the coolant by adjusting the flow rate of coolant in the first heat transfer devices 13 and 81 (the first TC control and the first TH control).

Accordingly, the vehicle interior blow-out air temperature TAV can be controlled without using the air mix door 55. For this reason, the air mix door 55 can be eliminated, and thus the size of the interior air conditioning unit 50 can be reduced.

For example, the control device 60 adjusts the amount of heat transferred between the first heat transfer devices 13 and 81 and the coolant by adjusting the amount of heat generated by the first heat transfer devices 13 and 81 (the first TC control and the first TH control).

For example, the control device 60 adjusts the heat exchange capacity of the first coolant-to-air heat exchangers 16 and 17 by adjusting the flow rate of coolant in the first coolant-to-air heat exchangers 16 and 17 (the second TC control and the second TH control).

For example, the control device 60 adjusts the heat exchange capacity of the first coolant-to-air heat exchangers 16 and 17 by adjusting the amount of air blown through the first coolant-to-air heat exchangers 16 and 17 (the second TC control and the second TH control).

Specifically, when the first coolant-to-air heat exchanger is the cooler core 16, the control device 60 performs control such that the temperature related to the temperature TC of the blast air which has been cooled in the first coolant-to-air heat exchanger 16 approaches the first target temperature TCO (the first TC control and the second TC control).

Accordingly, the temperature of the cooler core 16 can be properly controlled.

Specifically, when the first coolant-to-air heat exchanger is the heater core 17, the control device 60 performs control such that the temperatures related to the temperatures TH and TAV of the blast air which has been cooled in the first coolant-to-air heat exchanger 17 approach the first target temperature THO and TAO (the first TH control and the second TH control).

Accordingly, the temperature of the heater core 17 can be properly controlled.

This embodiment has a coolant flow mode in which one stream of coolant of the coolant cooled in the coolant cooler 14 of the refrigeration cycle 21, and the coolant heated in the coolant heater 15 of the refrigeration cycle 21 flows through the first coolant-to-air heat exchangers 16 and 17 and the first heat transfer devices 18 and 31, and the other stream of coolant flows through the second coolant-to-air heat exchangers 16 and 17 and the second heat transfer devices 18 and 31.

In this coolant flow mode, the control device 60 adjusts the amount of heat transferred between the second heat transfer devices 13 and 81 and the coolant in such a way that the temperatures related to the temperatures TC and TH of the blast air, the temperature of which has been adjusted in the first coolant-to-air heat exchangers 16 and 17, approach the first target temperatures TCO and THO (the third TC control and the third TH control).

Accordingly, also when the compressor 22 is operated independent of the temperatures of the first coolant-to-air heat exchangers 16 and 17, the temperatures of the first coolant-to-air heat exchangers 16 and 17 can be properly controlled.

In this embodiment, when the first TC control, the second TC control, the third TC control, the first TH control, the second TH control, or the third TH control is executed, the control device 60 controls the rotational speed of the compressor 22 of the refrigeration cycle 21 in a predetermined range.

Accordingly, the control hunting of the compressor 22 can be prevented, and the temperatures of the first coolant-to-air heat exchangers 16 and 17 can be properly controlled.

In this embodiment, the control device 60 switches between a first control mode and a second control mode. The first control mode is a combination of the fourth TC control and the first to third TH control, or is a combination of the fourth TH control and the first to third TC control. The second control mode is a combination of the first to third TC control and the first to third TH control.

Accordingly, in the first control mode, temperature followability can be improved by controlling the temperatures of the first coolant-to-air heat exchangers 16 and 17, or the temperatures of the second coolant-to-air heat exchangers 16 and 17 through the adjustment of the flow rate of refrigerant, and thus air conditioning comfort can be improved.

In the second mode, also when the compressor 22 is operated independent of the temperatures of the first coolant-to-air heat exchangers 16 and 17, and the temperatures of the second coolant-to-air heat exchangers 16 and 17, the temperatures of the first coolant-to-air heat exchangers 16 and 17, or the temperatures of the second coolant-to-air heat exchangers 16 and 17 can be properly controlled.

In this embodiment, the first switching valve 18 and the second switching valve 19 switch between a state in which the coolant cooled in the coolant cooler 14 is allowed to flow to either the first heat transfer devices 13 and 81 or the second heat transfer devices 13 and 81 or both and a state in which the coolant heated in the coolant-heating heat exchanger 15 is allowed to flow to either the first heat transfer devices 13 and 81 or the second heat transfer devices 13 and 81 or both.

Accordingly, the first switching valve 18 and the second switching valve 19 can switch between a state in which the coolant absorbs heat from the first heat transfer devices 13 and 81 and a state in which the coolant radiates heat to the first heat transfer devices 13 and 81. For this reason, the first switching valve 18 and the second switching valve 19 can switch between an operating mode (the device heat-absorbing heat pump mode) in which the vehicle interior is heated using the waste heat of the first heat transfer devices 13 and 81 and an operating mode (the device-heating heat pump mode) in which the first heat transfer devices 13 and 81 are heated using the waste heat of other sources (for example, the waste heat from cooling operation).

For example, the first heat transfer device is the coolant-to-outside air heat exchanger 13 that exchanges sensible heat between the coolant cooled in the coolant-cooling heat exchanger 14 and the outside air, and the second heat transfer device is the coolant-coolant heat exchanger 81C that exchanges heat between the coolant heated in the coolant-heating heat exchanger 15 and the engine coolant circulating through the engine 91.

Accordingly, the engine 91 can be heated by heat that is absorbed from the outside air, and thus engine warm-up performance can be improved such that fuel efficiency is improved.

For example, the first heat transfer device is the coolant-to-outside air heat exchanger 13 that exchanges sensible heat between the coolant cooled in the coolant-cooling heat exchanger 14 and the outside air, and the second heat transfer device is the engine 91 with the circulation flow path for coolant heated in the coolant-heating heat exchanger 15.

Accordingly, the engine 91 can be heated by heat that is absorbed from the outside air, and thus engine warm-up performance can be improved such that fuel efficiency is improved.

In this embodiment, when the first coolant-to-air heat exchanger 16 cools blast air by exchanging sensible heat between the coolant cooled in the coolant-cooling heat exchanger 14 and the blast air, and either the first heat transfer devices 13 and 81 or the second heat transfer devices 13 and 81 or both transfer heat with the coolant heated in the coolant-heating heat exchanger 15, the control device 60 adjusts the flow rate of the refrigerant discharged from the compressor 22 in such a way that the temperature related to the temperature TC of the blast air which has been cooled in the first coolant-to-air heat exchanger 16 approaches the first target temperature TCO.

Accordingly, the second heat transfer devices 13 and 81 can be heated by the waste heat (which is the sum of heat absorbed from the blast air into the vehicle interior, the waste heat of an electric device of the compressor 22 or mechanical losses of the compressor 22, and the like) from cooling operation, and temperature followability can be improved by controlling the temperature of the first coolant-to-air heat exchanger 16 through the adjustment of the flow rate of refrigerant. As a result, air conditioning comfort can be improved.

In this embodiment, when the first coolant-to-air heat exchanger 17 heats blast air by exchanging sensible heat between the coolant heated in the coolant-heating heat exchanger 15 and the blast air, and either the first heat transfer devices 13 and 81 or the second heat transfer devices 13 and 81 or both transfer heat with the coolant cooled in the coolant-cooling heat exchanger 14, the control device 60 adjusts the flow rate of the refrigerant discharged from the compressor 22 in such a way that the temperature related to the temperature TH of the blast air which has been heated in the first coolant-to-air heat exchanger 17 approaches the first target temperature THO.

Accordingly, the vehicle interior can be heated by heat that is absorbed from either the first transfer devices or the second heat transfer devices or both, and temperature followability can be improved by controlling the temperature of the first coolant-to-air heat exchanger 17 through the adjustment of the flow rate of refrigerant. As a result, air conditioning comfort can be improved.

In this embodiment, when the first coolant-to-air heat exchanger 17 heats blast air by exchanging sensible heat between the coolant heated in the coolant-heating heat exchanger 15 and the blast air, the first heat transfer device 13 is a coolant-to-outside air heat exchanger that exchanges sensible heat between the coolant and the outside air, and the second heat transfer device 81 is a device that heats the coolant, the first switching valve 18 and the second switching valve 19 switch between a state in which the coolant cooled in the coolant-cooling heat exchanger 14 is allowed to flow through the first heat transfer device 13 and a state in which the coolant cooled in the coolant-cooling heat exchanger 14 is allowed to flow through the second heat transfer device 81.

Accordingly, the first switching valve 18 and the second switching valve 19 can switch between the outside air heat-absorbing heat pump mode in which the vehicle interior is heated using heat absorbed from the outside air and the device heat-absorbing heat pump mode in which the vehicle interior is heated by heat absorbed from the second heat transfer device 81.

In this embodiment, when the second heat transfer device 81 is a device that heats the coolant, the first switching valve 18 and the second switching valve 19 switch between a state in which the coolant is allowed to circulate between the first heat transfer device 81 and the first coolant-to-air heat exchanger 17 and a state in which the coolant cooled in the coolant-cooling heat exchanger 14 is allowed to flow through the first heat transfer device 13.

Accordingly, the first switching valve 18 and the second switching valve 19 can switch between the device waste heat-direct use mode in which the coolant heated in the first heat transfer device 81 directly flows to the first coolant-to-air heat exchanger 17 such that the vehicle interior is heated and the device heat-absorbing heat pump mode in which the vehicle interior is heated through a heat pump operation in which the waste heat of the first heat transfer device 81 is drawn.

In this embodiment, when the first heat transfer device 13 is a coolant-to-outside air heat exchanger that exchanges sensible heat between the coolant and the outside air, and the second heat transfer device 81 is a device that heats the coolant, the first switching valve 18 and the second switching valve 19 switch between a state in which the coolant cooled in the coolant-cooling heat exchanger 14 is allowed to flow through the first heat transfer device 13 and a state in which the coolant is allowed to circulate between the second heat transfer device 81 and the first coolant-to-air heat exchanger 17.

Accordingly, the first switching valve 18 and the second switching valve 19 are capable of switching between the outside air heat-absorbing heat pump mode in which the vehicle interior is heated through a heat pump operation in which heat is drawn from the outside air and the device waste heat-direct use mode in which the coolant heated in the second heat transfer device 81 directly flows to the first coolant-to-air heat exchanger 17 such that the vehicle interior is heated.

For example, the first heat transfer device 81 is a rear-seat heat exchanger that exchanges sensible heat between air blown out toward occupants in a vehicle rear seat and the coolant.

Accordingly, the air blown out toward occupants in the vehicle rear seat can be cooled and heated by a single rear-seat heat exchanger 81, and thus the configuration of the rear-seat heat exchanger 81 can be simplified compared to when a cooling heat exchanger and a heating heat exchanger are independently provided. Air adjustment can be made without using the air mix door.

For example, the first heat transfer device 81 is a battery temperature-control heat exchanger that adjusts the temperature of the battery by exchanging sensible heat between the in-vehicle battery and the coolant.

Accordingly, the battery can be cooled and heated by a single battery temperature-control heat exchanger 81, and thus the configuration of the battery temperature-control heat exchanger can be simplified compared to when a heat transfer device for cooling and a heat transfer device for heating are independently provided.

In this embodiment, an example of conditions for switching between the coolant flow modes illustrated in FIGS. 24 to 28 has been described; however, a coolant flow mode may be switched to one of the coolant flow modes in the following conditions.

(Engine Coolant Temperature Conditions)

When the engine coolant temperature is lower than a predetermined temperature (for example, 40° C.), the coolant flow mode may be switched to the engine-heating heat pump mode. When the coolant temperature is higher than the engine coolant temperature on an outlet side of the coolant heater 15, the coolant flow mode may be switched to the engine-heating heat pump mode.

When the engine coolant temperature is higher than or equal to the predetermined temperature, the coolant flow mode may be switched to the device-heating heat mode. For example, when the engine coolant temperature is higher than or equal to 0° C., the coolant flow mode may be switched to the device-heating heat mode such that the battery may be warmed up. For example, when the engine coolant temperature is higher than or equal to the coolant temperature in the coolant circuit of the coolant heater 15, the coolant flow mode may be switched to the device-heating heat mode such that the coolant heater 15 is preheated.

When the engine coolant temperature is lower than a predetermined temperature (for example, which is the sum of outside air temperature and $\alpha°$ C.), the coolant flow mode may be switched to the thermal mass-using cooling mode.

When the amount of increase in the engine coolant temperature per unit time exceeds a predetermined amount in the outside air heat-absorbing heat pump mode, the coolant flow mode may be switched to the engine heat-absorbing heat pump mode.

When the amount of decrease in the engine coolant temperature per unit time exceeds a predetermined amount in the engine heat-absorbing heat pump mode, the coolant flow mode may be switched to the outside air heat-absorbing heat pump mode.

When the amount of decrease in the engine coolant temperature per unit time exceeds a predetermined amount in the engine waste heat-direct use mode, the coolant flow mode may be switched to the engine heat-absorbing heat pump mode.

(Conditions for Amount of Engine Waste Heat)

When the amount of heat (hereinafter, which is referred to as the amount of engine waste heat) transferred to the coolant from the engine 91 is less than a predetermined amount (the amount of heat absorption required for heat pump heating), the coolant flow mode may be switched to the outside air heat-absorbing heat pump mode.

When the amount of engine waste heat is greater than or equal to the predetermined amount (the amount of heat absorption required for heat pump heating), the coolant flow mode may be switched to the engine heat-absorbing heat pump mode.

When the amount of engine waste heat is greater than or equal to the predetermined amount (the amount of heat absorption required for heat pump heating), the coolant flow mode may be switched to the device heating mode.

When the amount of engine waste heat is less than the predetermined amount (the amount of heat absorption required for heat pump heating), the coolant flow mode may be switched to the thermal mass-using cooling mode.

Hereinafter, examples of calculating the amount of heat absorption required for the heat pump heating will be described. For example, the amount of heat absorption required for the heat pump heating can be estimated from the amount of heat required for heating. Specifically, the amount of heat required for heating can be calculated from a room temperature set value (manual setting by an occupant or automatic setting), a vehicle interior temperature, a vehicle speed, an outside air temperature, and the like, and the amount of heat absorption required for heat pump heating can be calculated based on the vehicle speed (a physical amount related to the speed of wind against at the radiator 13), the outside air temperature, a frost formation estimation value, and the capacity of the compressor 22.

The frost formation estimation value can be estimated based on an outside air temperature, a heating operation time, the temperature of coolant in the radiator 13, air humidity, and the like. The frost formation estimation value may be calculated based on a frost formation determination map. The capacity value of the compressor 22 can be estimated based on an intake refrigerant temperature, a discharge refrigerant temperature, and the rotational speed of the compressor 22. The capacity value of the compressor 22 may be calculated based on a map.

The amount of heat absorption required for the heat pump heating may be calculated based on a map that is represented by relationships of the amount of heat absorption between an outside air temperature, a vehicle speed, a coolant temperature, a heading demand, and current heating capacity.

A coolant flow mode may be switched to any one of the modes depending on the amount of heat generated by the device 81 instead of the amount of engine waste heat.

Hereinafter, examples of a technique of detecting the amount of engine waste heat and the amount of heat generated by the device 81 will be described. The amount of engine waste heat and the amount of heat generated by the device 81 can be estimated based on values detected by one or two coolant temperature sensors. For example, the coolant sensor is a coolant temperature sensor in the engine 91, and a coolant temperature sensor in the coolant heater 15.

The amount of engine waste heat and the amount of heat generated by the device 81 can be estimated based on the slope of change in the coolant temperature. For example, when the slope of change in the coolant temperature of the engine 91 has a negative value, and exceeds a predetermined amount, it can be assumed that the amount of engine waste heat is less than the amount of heat absorption required for the heat pump heating.

The amount of engine waste heat and the amount of heat generated by the device 81 can be estimated from a travel load. For example, the amount of engine waste heat and the amount of heat generated by the device 81 can be estimated from a vehicle-travel load.

The amount of engine waste heat can be estimated based on the amount of fuel consumption of the engine 91 and a sensor information value related to combustion. When the device 81 is an electric device, the amount of heat generated by the device 81 can be estimated from the amount of energization of the device 81. For example, the amount of heat generated by the device 81 can be estimated based on electrical power conversion efficiency, a resistance value, electrical power-to-power conversion efficiency, and the like.

(Conditions for Engine Operation State)

During the warm-up of the engine 91, the coolant flow mode may be switched to the outside air heat-absorbing heat pump mode. After it is determined that the warm-up of the engine 91 is completed, the coolant flow mode may be switched to the engine heat-absorbing heat pump mode.

When the engine is stopped, and an EV travel mode is enabled, the coolant flow mode may be switched the outside air heat-absorbing heat pump mode. The EV travel mode is a travel mode in which the vehicle uses mainly a drive force from the traveling electric motor when traveling.

When the battery (in-vehicle battery) of the plug-in hybrid vehicle is charged with electrical power from an external power source while the plug-in hybrid vehicle is parked before the start of travel, and the state of charge SOC of the battery is greater than or equal to a predetermined reference state of charge for travel as the start of travel, the plug-in hybrid vehicle enters the EV travel mode in which the plug-in hybrid vehicle uses mainly a drive force from the traveling electric motor when traveling. In contrast, when the state of charge SOC of the battery is less than the reference state of charge for travel while the plug-in hybrid vehicle travels, the plug-in hybrid vehicle enters an HV travel mode in which the plug-in hybrid vehicle uses mainly a drive force from the engine 91 when traveling.

More specifically, the EV travel mode is a travel mode in which the vehicle uses mainly a drive force output from the traveling electric motor when traveling, and when a vehicle-travel load is high, the engine 91 is brought into operation, and the engine 91 in operation assists the traveling electric motor. That is, the EV travel mode is a travel mode in which a travel drive force (drive force from the motor) output from the traveling electric motor becomes greater than a travel drive force (drive force from the engine) output from the engine 91.

In contrast, the HV travel mode is a travel mode in which the vehicle uses mainly a drive force output from the engine 91 when traveling, and when a vehicle-travel load is high, the traveling electric motor is brought into operation, and the traveling electric motor in operation assists the engine 91. That is, the HV travel mode is a travel mode in which a drive force from the engine becomes greater than a drive force from the motor.

The plug-in hybrid vehicle in this embodiment switches between the EV travel mode and the HV travel mode, and thus the amount of fuel consumption of the engine 91 is restricted, and fuel efficiency is improved compared to a typical vehicle that obtains a vehicle-travel drive force from only the engine 91. Switching between the EV travel mode and the HV travel mode is controlled by a drive force control apparatus (not illustrated).

When the vehicle is in an idle stop state, the coolant flow mode may be switched to the engine heat-absorbing heat pump mode. The idle stop state represents a state in which the engine 91 is temporarily stopped during vehicle stop at a traffic light or the like.

When the time-averaged rotational speed of the engine 91 exceeds a predetermined rotational speed, the coolant flow mode may be switched to the engine heat-absorbing heat pump mode.

When preheating is performed during vehicle stop (during the stop of the engine 91), the coolant flow mode may be switched to the engine waste heat-direct use mode. The preheating represents that the vehicle interior is heated before the engine 91 is started.

When the time-averaged rotational speed of the engine 91 exceeds a predetermined rotational speed, the coolant flow mode may be switched to the engine waste heat-direct use mode.

During the warm-up of the engine 91, the coolant flow mode may be switched to the engine-heating heat pump mode. During the stop of the engine 91 (during the EV travel mode, the idle stop, charging, or the like) the coolant flow mode may be switched to the engine-heating heat pump mode.

During the operation of the engine 91, the coolant flow mode may be switched to the device heating mode, and during the stop of the engine 91 (during vehicle stop), the coolant flow mode may be switched to the engine waste heat-direct use mode.

When the engine 91 is overheated, the coolant flow mode may be switched to the engine waste heat-direct use mode.
(Battery State-of-Charge Conditions)

When the state of charge (SOC) of the battery is greater than or equal to a predetermined amount (when the vehicle travels mainly in the EV travel), the coolant flow mode may be switched to the outside air heat-absorbing heat pump mode, the engine-heating heat pump mode, or the thermal mass-using cooling mode.

When the state of charge (SOC) of the battery is less than the predetermined amount (when the vehicle uses mainly an engine output when traveling), the coolant flow mode may be switched to the engine heat-absorbing heat pump mode, the engine waste heat-direct use mode, or the device heating mode.
(Outside Air Temperature Conditions)

When the outside air temperature is lower than a predetermined temperature (which is in a very low temperature region, for example, −20° C., or is outside an allowable heat pump operation temperature range, the coolant flow mode may be switched to the engine heat-absorbing heat pump mode.

When the outside air temperature is lower than the predetermined temperature, and a heating demand is less than a predetermined level, the coolant flow mode may be switched to the engine-heating heat pump mode.
(Low Temperature-Side Coolant Temperature Conditions)

When the coolant temperature (hereinafter, which is referred to as a low temperature-side coolant temperature) in the coolant circuit of the coolant cooler 14 is lower than a predetermined temperature (when the coolant temperature is lower than −25° C., frost is formed, or it is determined that the capacity of the radiator is insufficient) in the outside air heat-absorbing heat pump mode, the coolant flow mode may be switched to the engine heat-absorbing heat pump mode.

When the low temperature-side coolant temperature is lower than a predetermined temperature (when the coolant temperature is lower than the outside air temperature) (engine failure is suspected) in the engine heat-absorbing heat pump mode, the coolant flow mode may be switched to the outside air heat-absorbing heat pump mode or the engine waste heat-direct use mode.
(Other Conditions)

When it is assumed or determined that frost is formed in the radiator 13, the coolant flow mode may be switched to the engine heat-absorbing heat pump mode.

When configuration devices of the refrigeration cycle 21 or a component in the coolant circuit of the coolant cooler 15 is out of order, the coolant flow mode may be switched to the engine waste heat-direct use mode.

In response to a switching signal (manual switching signal) in a maintenance mode, the coolant flow mode is switched among the outside air heat-absorbing heat pump mode, the engine heat-absorbing heat pump mode, and the engine waste heat-direct use mode.

The engine-heating heat pump mode may be executed for a predetermined amount of time after the engine 91 is started. The engine-heating heat pump mode may be executed until the engine coolant temperature reaches a predetermined temperature after the engine 91 is started.

The device heating mode may be executed for a predetermined amount of time before a warm-up operation. When the device of the refrigeration cycle is out of order, and the heating of the device is demanded, the coolant flow mode may be switched to the device heating mode. When a coolant system of the radiator 13 is out of order, the coolant flow mode may be switched to the thermal mass-using cooling mode.

(Ninth Embodiment)

Figure 32:
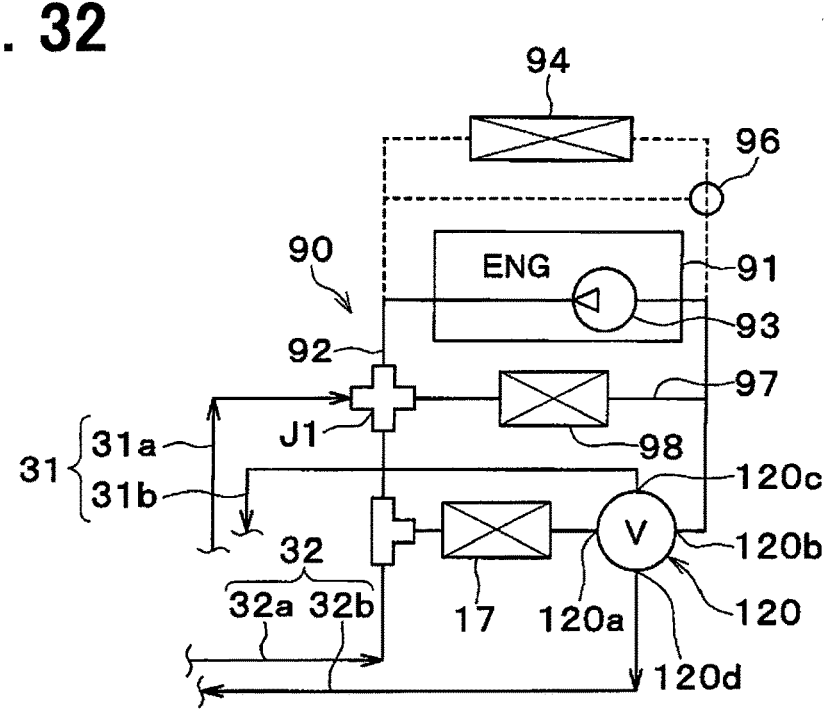
FIG. 32 is a diagram illustrating a schematic configuration of the vehicle heat management system in a ninth embodiment.

In the eighth embodiment, the engine cooling circuit 90 cooperates with the vehicle heat management system 10 via the coolant-coolant heat exchanger 81C. In contrast, in this embodiment, as illustrated in FIG. 32, the engine cooling circuit 90 cooperates with the vehicle heat management system 10 via a flow path switching valve 120.

The heater core 17 and the flow path switching valve 120 are disposed on the circulation flow path 92 of the engine cooling circuit 90. The flow path switching valve 120 is formed of a four-way valve with four coolant outlet and inlet ports 120a, 120b, 120c, and 120d.

The flow path switching valve 120 is disposed on the coolant outlet side of the heater core 17 and a coolant intake side of the third pump 93 in the circulation flow path 92. That is, the circulation flow path 92 is connected to the first coolant outlet and inlet port 120a and the second coolant outlet and inlet port 120b of the flow path switching valve 120.

An upstream portion 31a of the first-pump flow path 31 is connected to a junction J1 between the engine-accessory flow path 97 and the circulation flow path 92 of the engine cooling circuit 90, and a downstream portion 31b of the first-pump flow path 31 is connected to the third coolant outlet and inlet port 120c of the flow path switching valve 120.

An upstream portion 32a of the second pump flow path 32 is connected to the circulation flow path 92 on a coolant outlet side of the engine 91 and on a coolant inlet side of the heater core 17, and a downstream portion 32b of the second pump flow path 32 is connected to a fourth coolant outlet and inlet port 120d of the connection flow path-switching valve 120.

Figure 33:
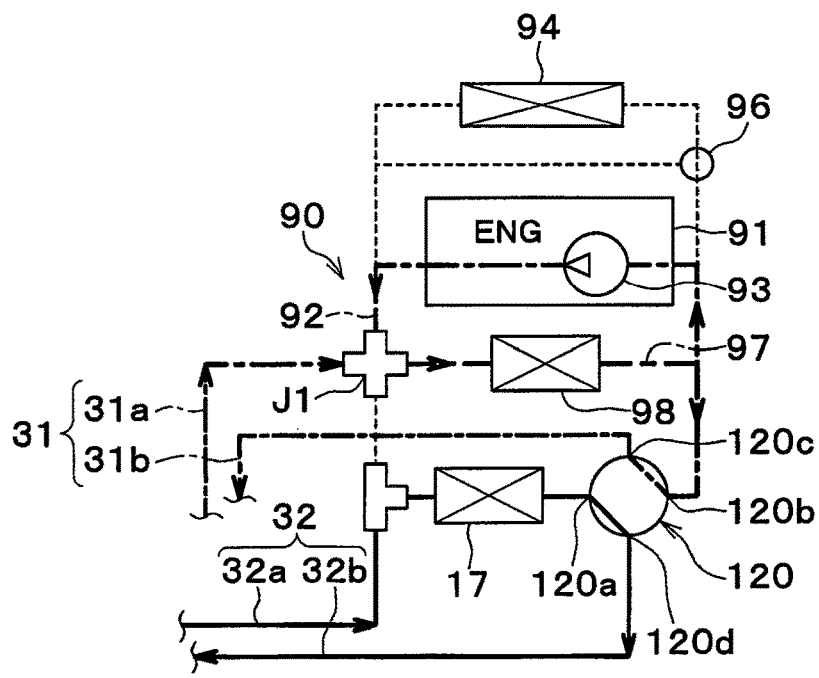
FIG. 33 is a diagram illustrating a schematic configuration of an engine heat-absorbing heat pump mode of the vehicle heat management system in the ninth embodiment.

As illustrated in FIG. 33, in the engine heat-absorbing heat pump mode, the flow path switching valve 120 switches the flow path such that the circulation flow path 92 connected to the second coolant outlet and inlet port 120b communicates with the downstream portion 31b of the first-pump flow path 31, and the circulation flow path 92 connected to the first coolant outlet and inlet port 120a communicates with the downstream portion 31b of the second pump flow path 32. Accordingly, the coolant flows as illustrated by the alternate one long and one short dashes line with arrows and the solid line with arrows in FIG. 33.

Figure 34:
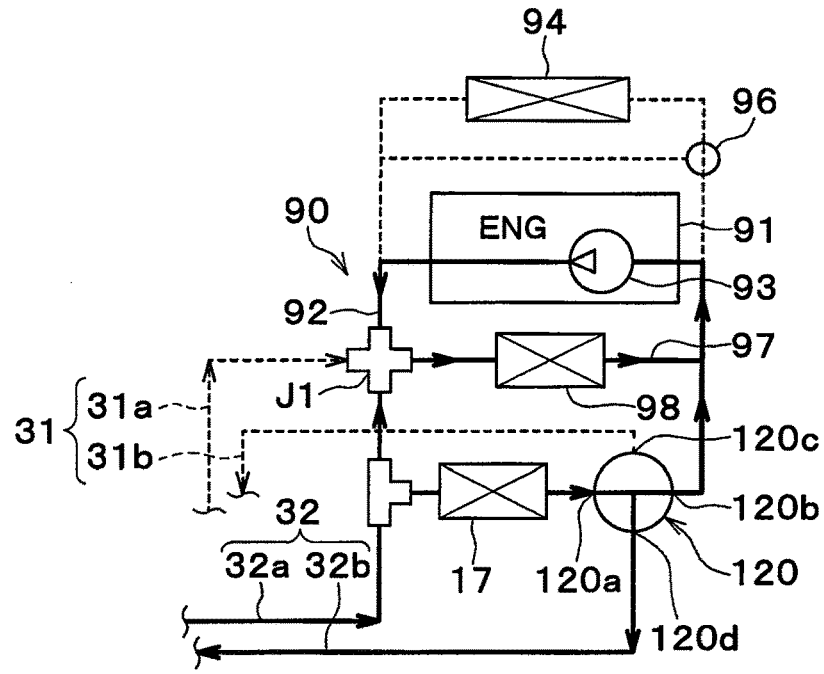
FIG. 34 is a diagram illustrating a schematic configuration of an engine-heating heat pump mode of the vehicle heat management system in the ninth embodiment.

As illustrated in FIG. 34, in the engine-heating heat pump mode, the flow path switching valve 120 switches the flow path such that the circulation flow paths 92 communicate with the downstream portion 31b of the second pump flow path 32, and the downstream portion 31b of the first-pump flow path 31 is closed.

Accordingly, the coolant flows as illustrated by the solid line with arrows in FIG. 33. In addition, the flow path switching valve 120 adjusts the ratio between the flow rates of coolant distributed to the circulation flow path 92 and the second pump flow path 32.

Figure 35:
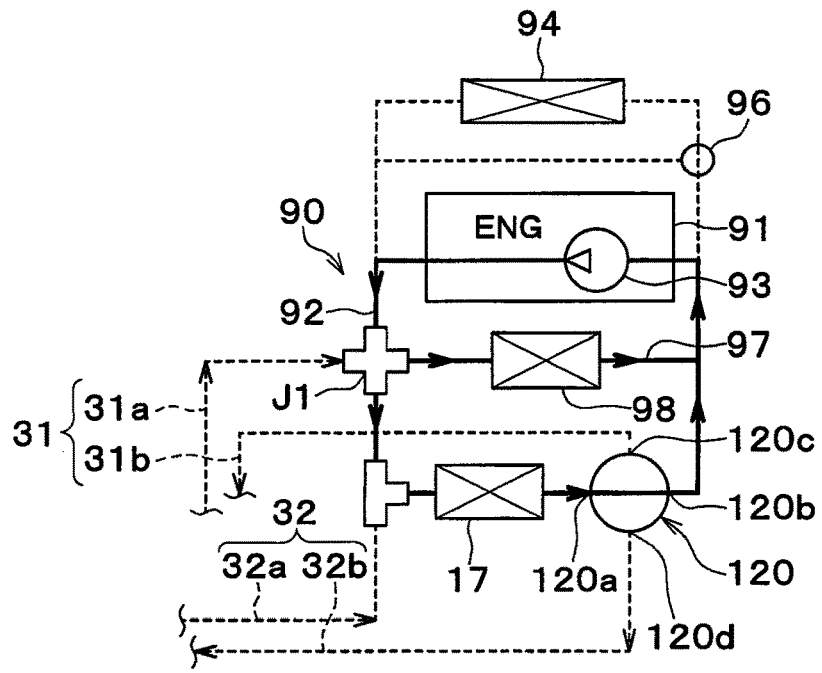
FIG. 35 is a diagram illustrating a schematic configuration of an engine waste heat-direct use mode of the vehicle heat management system in the ninth embodiment.

As illustrated in FIG. 35, in the engine waste heat-direct use mode, the flow path switching valve 120 switches the flow path such that the circulation flow paths 92 communicate with each other, and the downstream portion 31b of the first-pump flow path 31 and the downstream portion 32b of the second pump flow path 32 are closed. Accordingly, the coolant flows as illustrated by the solid line with arrows in FIG. 35.

Also in this embodiment, the same operational effects as in the eighth embodiment can be obtained.

(Tenth Embodiment)

Figure 36:
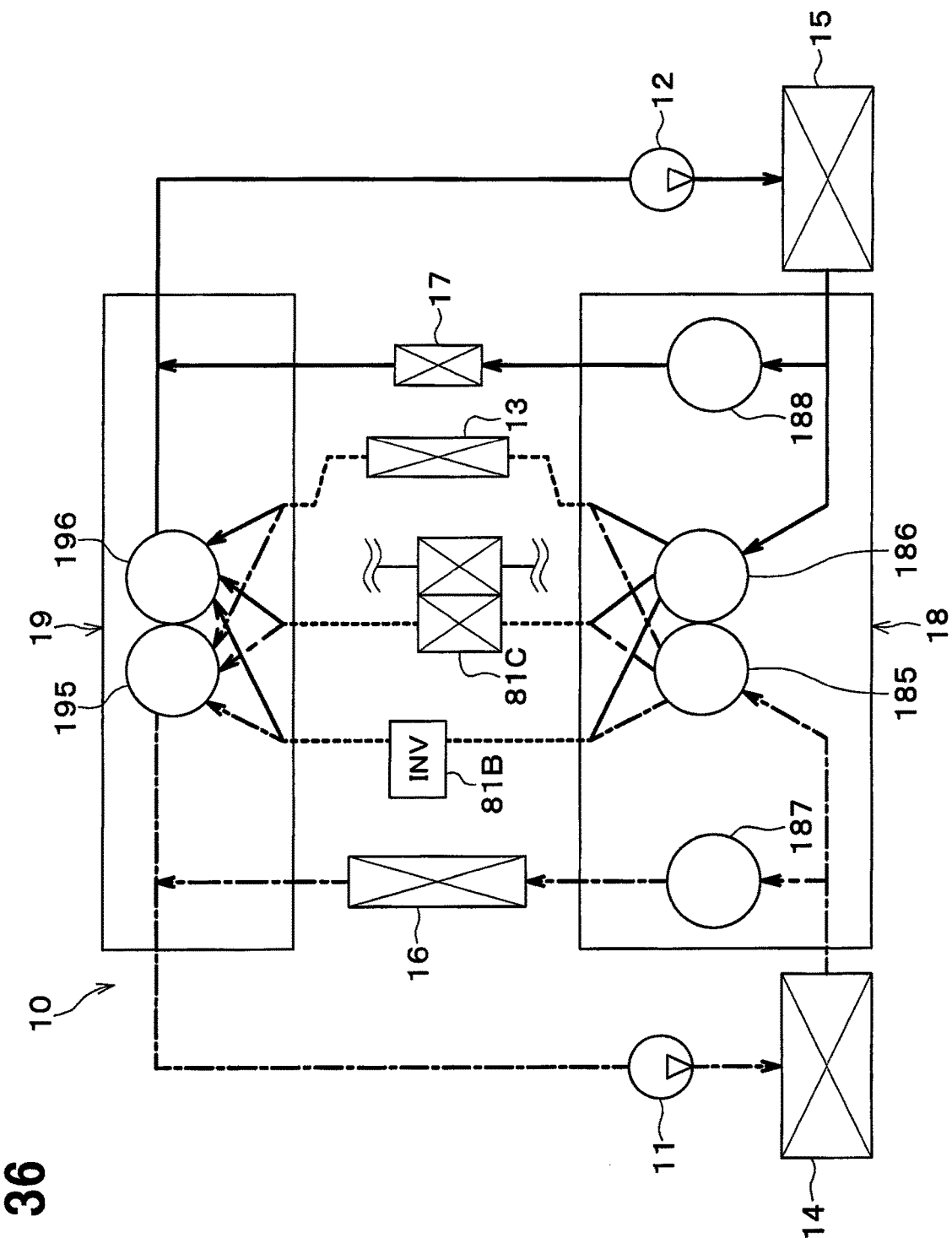
FIG. 36 is a diagram illustrating the entire configuration of the vehicle heat management system in a first example of a tenth embodiment.

In this embodiment, modification examples of the first switching valve 18 and the second switching valve 19 are described. In a first modification example illustrated in FIG. 36, the first switching valve 18 includes a first pump-side valve body 185, a second pump-side valve body 186, a cooler core-side valve body 187, and a heater core-side valve body 188.

The first pump-side valve body 185 switches between a state in which the coolant discharged from the first pump 11 is allowed to flow into each of the inverter 81B, the coolant-coolant heat exchanger 81C, and the radiator 13 and a state in which the coolant discharged from the first pump 11 is not allowed to flow into each of the inverter 81B, the coolant-coolant heat exchanger 81C, and the radiator 13, and the first pump-side valve body 185 adjusts the flow rate of the coolant.

The second pump-side valve body 186 switches between a state in which the coolant discharged from the second pump 12 is allowed to flow into each of the inverter 81B, the coolant-coolant heat exchanger 81C, and the radiator 13 and a state in which the coolant discharged from the second pump 12 is not allowed to flow into each of the inverter 81B, the coolant-coolant heat exchanger 81C, and the radiator 13, and the second pump-side valve body 186 adjusts the flow rate of the coolant.

The cooler core-side valve body 187 adjusts the flow rate of coolant flowing into the cooler core 16. The heater core-side valve body 188 adjusts the flow rate of coolant flowing into the heater core 17.

In the first modification example, the second switching valve 19 includes a first pump-side valve body 195, and a second pump-side valve body 196.

The first pump-side valve body 195 switches between a state in which the coolant flowing from the inverter 81B, the coolant flowing from the coolant-coolant heat exchanger 81C, and the coolant flowing from the radiator 13 are allowed to flow to the first pump 11 and a state in which the coolant flowing from the inverter 81B, the coolant flowing from the coolant-coolant heat exchanger 81C, and the coolant flowing from the radiator 13 are not allowed to flow to the first pump 11, and the first pump-side valve body 195 adjusts the flow rate of the coolant.

The second pump-side valve body 196 switches between a state in which the coolant flowing from the inverter 81B, the coolant flowing from the coolant-coolant heat exchanger 81C, and the coolant flowing from the radiator 13 are allowed to flow to the second pump 12 and a state in which the coolant flowing from the inverter 81B, the coolant flowing from the coolant-coolant heat exchanger 81C, and the coolant flowing from the radiator 13 are not allowed to flow to the second pump 12, and the second pump-side valve body 196 adjusts the flow rate of the coolant.

Also in this embodiment, the same operational effects as in the aforementioned embodiments can be obtained.

Figure 37:
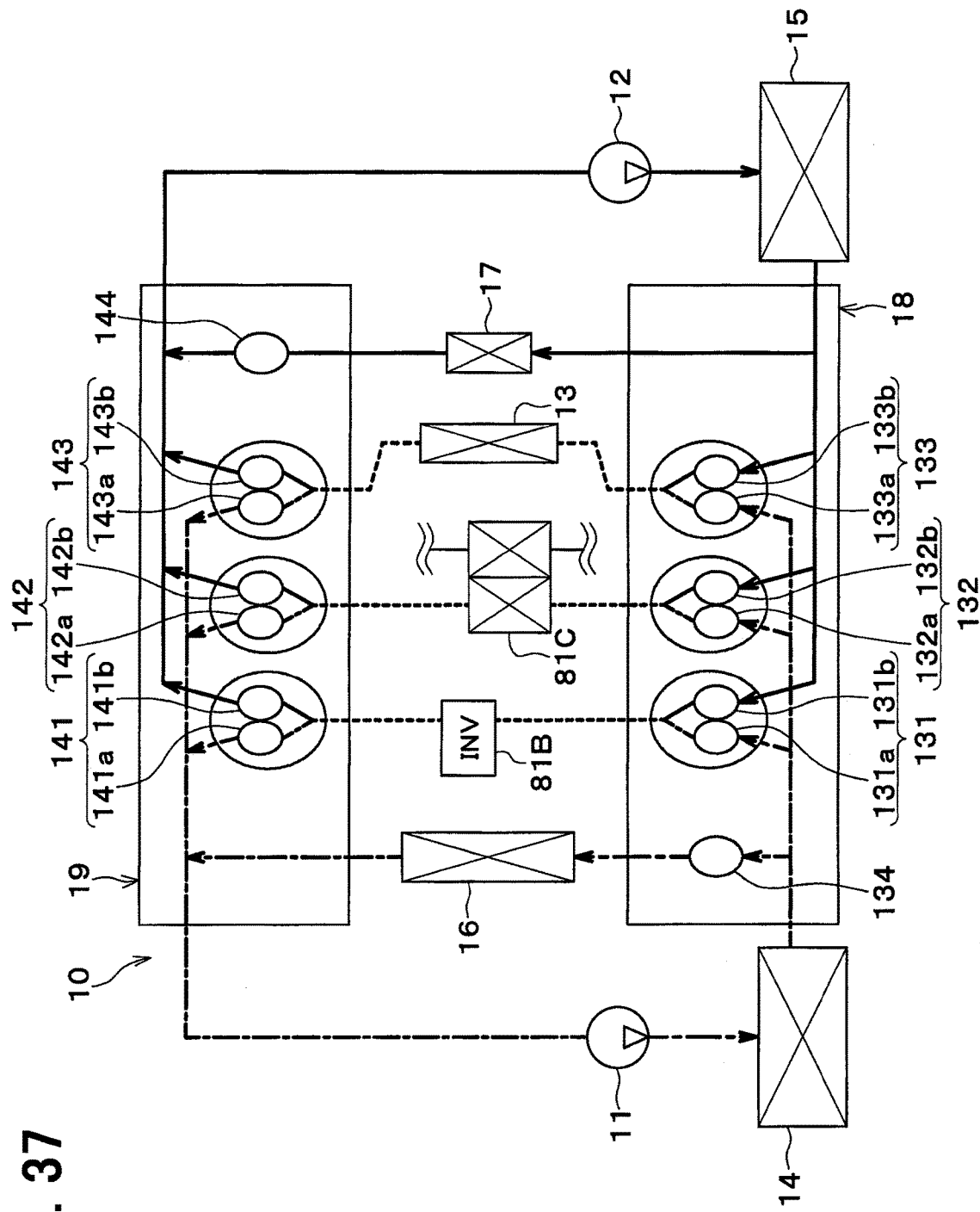
FIG. 37 is a diagram illustrating the entire configuration of the vehicle heat management system in a second example of the tenth embodiment.

In a second example illustrated in FIG. 37, the first switching valve 18 is configured to include: an inverter switching valve 131; a coolant-coolant heat exchanger switching valve 132; a radiator switching valve 133, and a cooler core switching valve 134.

The inverter switching valve 131 includes a first pump-side valve body 131a and a second pump-side valve body 131b. The first pump-side valve body 131a allows and shuts off the coolant flow to the inverter 81B from the first pump 11, and adjusts the flow rate of the coolant. The second pump-side valve body 131b allows and shuts off the coolant flow to the inverter 81B from the second pump 12, and adjusts the flow rate of the coolant.

The coolant-coolant heat exchanger switching valve 132 includes a first pump-side valve body 132a and a second pump-side valve body 132b. The first pump-side valve body 132a allows and shuts off the coolant flow to the coolant-coolant heat exchanger 81C from the first pump 11, and adjusts the flow rate of the coolant. The second pump-side valve body 132b allows and shuts off the coolant flow to the coolant-coolant heat exchanger 81C from the second pump 12, and adjusts the flow rate of the coolant.

The radiator switching valve 133 includes a first pump-side valve body 133a and a second pump-side valve body 133b. The first pump-side valve body 133a allows and shuts off the coolant flow to the radiator 13 from the first pump 11, and adjusts the flow rate of the coolant. The second pump-side valve body 133b allows and shuts off the coolant flow to the radiator 13 from the second pump 12, and adjusts the flow rate of the coolant.

The cooler core switching valve 134 allows and shuts off the coolant flow to the cooler core 16 from the second pump 12, and adjusts the flow rate of the coolant.

In the second example, the second switching valve 19 is configured to include: an inverter switching valve 141; a coolant-coolant heat exchanger switching valve 142; a radiator switching valve 143, and a heater core switching valve 144.

The inverter switching valve 141 includes a first pump-side valve body 141a and a second pump-side valve body 141b. The first pump-side valve body 141a allows and shuts off the coolant flow from the inverter 81B to the first pump 11, and adjusts the flow rate of the coolant. The second pump-side valve body 141b allows and shuts off the coolant flow from the inverter 81B to the second pump 12, and adjusts the flow rate of the coolant.

The coolant-coolant heat exchanger switching valve 142 includes a first pump-side valve body 142a and a second pump-side valve body 142b. The first pump-side valve body 142a allows and shuts off the coolant flow from the coolant-coolant heat exchanger 81C to the first pump 11, and adjusts the flow rate of the coolant. The second pump-side valve body 142b allows and shuts off the coolant flow from the coolant-coolant heat exchanger 81C to the second pump 12, and adjusts the flow rate of the coolant.

The radiator switching valve 143 includes a first pump-side valve body 143a and a second pump-side valve body 143b. The first pump-side valve body 143a allows and shuts off the coolant flow from the radiator 13 to the first pump 11, and adjusts the flow rate of the coolant. The second pump-side valve body 143b allows and shuts off the coolant flow from the radiator 13 to the second pump 12, and adjusts the flow rate of the coolant.

The cooler core switching valve 144 allows and shuts off the coolant flow to the second pump 12 from the heater core 17, and adjusts the flow rate of the coolant.

Also in this embodiment, the same operational effects as in the aforementioned embodiments can be obtained.
(Eleventh Embodiment)

In this embodiment, a method of controlling the temperature of the heat transfer device 81 and one heat exchanger, either the cooler core 16 or the heater core 17 when the heat transfer device 81 is connected to the one heat exchanger will be described.

Figure 38:
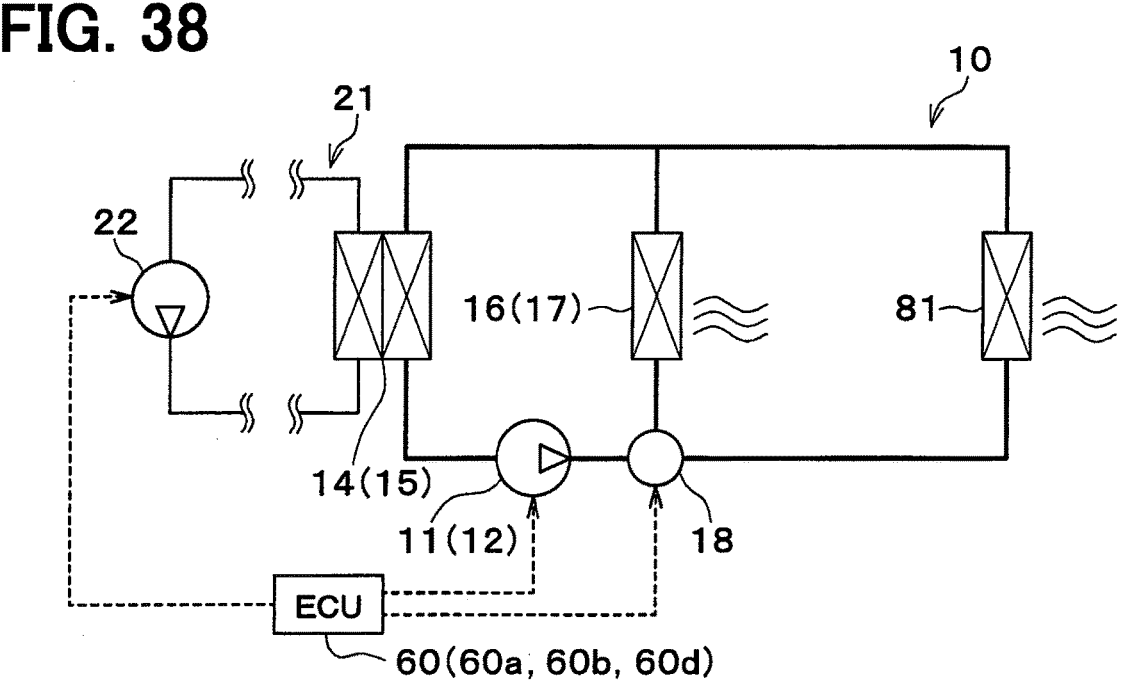
FIG. 38 is a diagram illustrating a schematic configuration of the vehicle heat management system in an eleventh embodiment.

FIG. 38 illustrates the configuration of the vehicle heat management system 10 in a simple manner when the heat transfer device 81 is connected to the cooler core 16. Reference signs in the parenthesis in FIG. 38 correspond to the configuration of when the heat transfer device 81 is connected to the heater core 17.

For example, the heat transfer device 81 is a coolant-to-air heat exchanger (heat medium-to-air heat exchanger) that adjusts the temperature of blast air into the vehicle interior by exchanging heat (sensible heat) between the coolant and the blast air. More specifically, for example, the heat transfer device 81 is a rear-seat heat exchanger that exchanges heat (sensible heat) between air blown out toward occupants in a vehicle rear seat and the coolant.

For example, the heat transfer device 81 is a battery temperature-control heat exchanger that adjusts the temperature of the battery by exchanging sensible heat between the in-vehicle battery and the coolant.

First, a method of controlling the temperature of the heat transfer device 81 and the temperature of the cooler core 16 when the heat transfer device 81 is connected to the cooler core 16 and the coolant cooler 14 will be described.

The control device 60 performs control such that the cooler core-blowout temperature TC approaches the cooler core-blowout target temperature TCO, and a temperature TC2 of the heat transfer device 81 approaches a target temperature TCO2 of the heat transfer device. When the heat transfer device 81 is a coolant-to-air heat exchanger, the temperature TC2 of the heat transfer device 81 is the temperature of blast air which has undergone heat exchange in the heat transfer device 81.

When the target temperature TCO of the cooler core 16 is different from the target temperature TCO2 of the heat transfer device 81, the temperature of the device with a low target temperature is controlled by adjusting the flow rate of refrigerant, and the temperature of the device with a high target temperature is controlled by adjusting the flow rate of coolant.

In this case, the temperature control through the adjustment of the flow rate of refrigerant has good responsiveness compared to the temperature control through the adjustment of the flow rate of coolant, and thus the temperature of the device with a low target temperature can be preferentially controlled.

When the target temperature TCO of the cooler core 16 is equal to the target temperature TCO2 of the heat transfer device 81, a device, the temperature of which is controlled through the adjustment of the flow rate of refrigerant, and a device, the temperature of which is controlled through the adjustment of the flow rate of coolant, are determined based on a deviation $\Delta T1$ between the cooler core temperature TC and the cooler core target temperature TCO, a deviation $\Delta T2$ between the temperature TC2 of the heat transfer device and the target temperature TCO2 of the heat transfer device, and an absolute value (hereinafter, which is referred to as the amount of deviation) of each of the deviations $\Delta T1$ and $\Delta T2$.

Each of the deviations $\Delta T1$ and $\Delta T2$ is obtained using Expressions F4 and F5 below.

$$\Delta T1 = TC - TCO \qquad \text{F4}$$

$$\Delta T2 = TC2 - TCO2 \qquad \text{F5}$$

In this embodiment, any one of control methods (1) to (16) to be described below is selected based on the deviations $\Delta T1$ and $\Delta T2$, and the amounts of deviation.

(1) When the deviation $\Delta T1$ and the deviation $\Delta T2$ are positive, the temperature of the device with a large amount of deviation (the absolute value of a deviation) is controlled through the adjustment of the flow rate of refrigerant, and the flow rate of coolant through both of the devices is set to be higher than or equal to a predetermined flow rate.

(2) When the deviation $\Delta T1$ is positive, and the deviation $\Delta T2$ is negative, the temperature of the device with the deviation $\Delta T1$ is controlled through the adjustment of the flow rate of refrigerant, and the temperature of the device with the deviation $\Delta T2$ is controlled through the adjustment of the flow rate of coolant.

(3) When the deviation $\Delta T1$ is negative, and the deviation $\Delta T2$ is positive, the temperature of the device with the deviation $\Delta T2$ is controlled through the adjustment of the flow rate of refrigerant, and the temperature of the device with the deviation $\Delta T1$ is controlled through the adjustment of the flow rate of coolant.

(4) When both the deviation $\Delta T1$ and the deviation $\Delta T2$ are negative, the temperature of the device with a large amount of deviation is controlled through the adjustment of the flow rate of refrigerant, and the temperature of the device with a small amount of deviation is controlled through the adjustment of the flow rate of coolant.

(5) When the deviation $\Delta T1$ is positive, and the deviation $\Delta T2$ is in a range from a positive value to a negative value, the temperature of the device with the deviation $\Delta T1$ is controlled through the adjustment of the flow rate of refrigerant, and the flow rate of coolant through the device with the deviation $\Delta T2$ begins to be reduced.

(6) When the deviation $\Delta T1$ is positive, and the deviation $\Delta T2$ is in a range from a negative value to a positive value, the temperature of the device with a large amount of deviation is controlled through the adjustment of the flow rate of refrigerant, and the temperature of the device with a small amount of deviation is controlled through the adjustment of the flow rate of coolant.

(7) When the deviation $\Delta T1$ is in a range from a positive value to a negative value, and the deviation $\Delta T2$ is a positive value, the temperature of the device with the deviation $\Delta T2$ is controlled through the adjustment of the flow rate of refrigerant, and the flow rate of coolant through the device with the deviation $\Delta T1$ begins to be reduced.

(8) When both the deviation $\Delta T1$ and the deviation $\Delta T2$ are in a range from a positive value to a negative value, the temperature of the device with a large amount of deviation is controlled through the adjustment of the flow rate of refrigerant, and the temperature of the device with a small amount of deviation is controlled through the adjustment of the flow rate of coolant.

(9) In a state where the deviation $\Delta T1$ is in a range from a positive value to a negative value, and the deviation $\Delta T2$ is in a range from a negative value to a positive value, when the flow rate of coolant through the device with the deviation $\Delta T2$ is higher than or equal to a predetermined flow rate, the temperature of the device with the deviation $\Delta T2$ is controlled through the adjustment of the flow rate of refrigerant, and the temperature of the device with the deviation $\Delta T1$ is controlled through the adjustment of the flow rate of coolant, and when the flow rate of coolant through the device with the deviation $\Delta T2$ is lower than the predetermined flow rate, the temperature of the device with the deviation $\Delta T1$ is controlled through the adjustment of the flow rate of refrigerant, and the temperature of the device with the deviation $\Delta T2$ is controlled through the adjustment of the flow rate of coolant.

(10) In a state where the deviation $\Delta T1$ is in a range from a positive value to a negative value, and the deviation $\Delta T2$ is negative, when the flow rate of coolant through the device with the deviation $\Delta T2$ is higher than or equal to a predetermined flow rate, the temperature of the device with a large amount of deviation is controlled through the adjustment of the flow rate of refrigerant, and the temperature of the device with a small amount of deviation is controlled through the adjustment of the flow rate of coolant, and when the flow rate of coolant through the device with the deviation $\Delta T2$ is lower than the predetermined flow rate, the temperature of the device with the deviation $\Delta T1$ is controlled through the adjustment of the flow rate of refrigerant, and the temperature of the device with the deviation $\Delta T2$ is controlled through the adjustment of the flow rate of coolant.

(11) In a state where the deviation $\Delta T1$ is in a range from a negative value to a positive value, and the deviation $\Delta T2$ is positive, when the flow rate of coolant through the device with the deviation $\Delta T1$ is higher than or equal to a predetermined flow rate, the temperature of the device with a large amount of deviation is controlled through the adjustment of the flow rate of refrigerant, and the flow rate of coolant through both of the devices is set to be higher than or equal to a predetermined flow rate, and when the flow rate of coolant through the device with the deviation $\Delta T1$ is lower than the predetermined flow rate, the temperature of the device with the deviation $\Delta T2$ is controlled through the adjustment of the flow rate of refrigerant, and the temperature of the device with the deviation $\Delta T1$ is controlled through the adjustment of the flow rate of coolant.

(12) In a state where the deviation $\Delta T1$ is in a range from a negative value to a positive value, and the deviation $\Delta T2$ is in a range from a positive value to a negative value, when the flow rate of coolant through the device with the deviation $\Delta T1$ is higher than or equal to a predetermined flow rate, the temperature of the device with the deviation $\Delta T1$ is controlled through the adjustment of the flow rate of refrigerant, and the temperature of the device with the deviation $\Delta T2$ is controlled through the adjustment of the flow rate of coolant, and when the flow rate of coolant through the device with the deviation $\Delta T1$ is lower than the predetermined flow rate, the temperature of the device with the deviation $\Delta T2$ is controlled through the adjustment of the flow rate of refrigerant, and the temperature of the device with the deviation $\Delta T1$ is controlled through the adjustment of the flow rate of coolant.

(13) When both the deviation $\Delta T1$ and the deviation $\Delta T2$ are in a range from a negative value to a positive value, the temperature of the device with a large amount of deviation is controlled through the adjustment of the flow rate of refrigerant, and the temperature of the device with a small amount of deviation is controlled through the adjustment of the flow rate of coolant.

(14) In a state where the deviation $\Delta T1$ is in a range from a negative value to a positive value, and the deviation $\Delta T2$ is negative, when the flow rate of coolant through the device with the deviation $\Delta T1$ is higher than or equal to a predetermined flow rate, the temperature of the device with the deviation $\Delta T1$ is controlled through the adjustment of the flow rate of refrigerant, and the temperature of the device with the deviation $\Delta T2$ is controlled through the adjustment of the flow rate of coolant, and when the flow rate of coolant through the device with the deviation $\Delta T1$ is lower than the predetermined flow rate, the temperature of the device with the deviation $\Delta T2$ is controlled through the adjustment of the flow rate of refrigerant, and the temperature of the device with the deviation $\Delta T1$ is controlled through the adjustment of the flow rate of coolant.

(15) In a state where the deviation $\Delta T1$ is negative, and the deviation $\Delta T2$ is in a range from a positive value to a negative value, when the flow rate of coolant through the device with the deviation $\Delta T1$ is higher than or equal to a predetermined flow rate, the temperature of the device with a large amount of deviation is controlled through the adjustment of the flow rate of refrigerant, and the temperature of the device with a small amount of deviation is controlled through the adjustment of the flow rate of coolant, and when the flow rate of coolant through the device with the deviation $\Delta T1$ is lower than the predetermined flow rate, the temperature of the device with the deviation $\Delta T2$ is controlled through the adjustment of the flow rate of refrigerant, and the temperature of the device with the deviation $\Delta T1$ is controlled through the adjustment of the flow rate of coolant.

(16) In a state where the deviation $\Delta T1$ is negative, and the deviation $\Delta T2$ is in a range from a negative value to a positive value, when the flow rate of coolant through the device with the deviation $\Delta T2$ is higher than or equal to a predetermined flow rate, the temperature of the device with the deviation $\Delta T2$ is controlled through the adjustment of the flow rate of refrigerant, and the temperature of the device with the deviation $\Delta T1$ is controlled through the adjustment of the flow rate of coolant, and when the flow rate of coolant through the device with the deviation $\Delta T2$ is lower than the predetermined flow rate, the temperature of the device with the deviation $\Delta T1$ is controlled through the adjustment of the flow rate of refrigerant, and the temperature of the device with the deviation $\Delta T2$ is controlled through the adjustment of the flow rate of coolant.

When the target temperature TCO of the cooler core 16 is equal to the target temperature TCO2 of the heat transfer device 81, the temperature of one (which is set arbitrarily or in advance) of the cooler core 16 and the heat transfer device 81 may be controlled through the adjustment of the flow rate of refrigerant, and the temperature of the other device may be controlled through the adjustment of the flow rate of coolant.

When the target temperature TCO of the cooler core 16 is equal to the target temperature TCO2 of the heat transfer device 81, the temperature of the device with a high thermal load, either the cooler core 16 or the heat transfer device 81, may be controlled through the adjustment of the flow rate of refrigerant, and the temperature of the device with a low thermal load may be controlled through the adjustment of the flow rate of coolant.

Hereinafter, a method of controlling the temperature of the heat transfer device 81 and the temperature of the heater core 17 when the heat transfer device 81 is connected to the heater core 17 and the coolant heater 15 will be described.

The control device 60 performs control such that the heater core-blowout temperature TH approaches the heater core-blowout target temperature THO, and a temperature TH2 of the heat transfer device 81 approaches a device target temperature THO2 of the heat transfer device. When the heat transfer device 81 is a coolant-to-air heat exchanger, the temperature TH2 of the heat transfer device 81 is the temperature of blast air which has undergone heat exchange in the heat transfer device 81.

When the target temperature THO of the heater core 17 is different from the target temperature THO2 of the heat transfer device 81, the temperature of the device with a high target temperature is controlled by adjusting the flow rate of refrigerant, and the temperature of the device with a low target temperature is controlled by adjusting the flow rate of coolant.

In this case, the temperature control through the adjustment of the flow rate of refrigerant has good responsiveness compared to the temperature control through the adjustment of the flow rate of coolant, and thus the temperature of the device with a high target temperature can be preferentially controlled.

When the target temperature THO of the heater core 17 is equal to the target temperature THO2 of the heat transfer device 81, a device, the temperature of which is controlled through the adjustment of the flow rate of refrigerant, and a device, the temperature of which is controlled through the adjustment of the flow rate of coolant, are determined based on the deviation $\Delta T1$ between the heater core temperature TH and the heater core target temperature THO, the deviation $\Delta T2$ between the temperature TH2 of the heat transfer device and the target temperature THO2 of the heat transfer device, and an absolute value (hereinafter, which is referred to as the amount of deviation) of each of the deviations $\Delta T1$ and $\Delta T2$.

Each of the deviations $\Delta T1$ and $\Delta T2$ is obtained using Expressions F6 and F7 below.

$$\Delta T1 = THO - TH \qquad \text{F6}$$

$$\Delta T2 = THO2 - TH2 \qquad \text{F7}$$

In this embodiment, any one of the aforementioned control methods (1) to (16) is selected based on the deviations $\Delta T1$ and $\Delta T2$, and the amounts of deviation.

When the target temperature THO of the heater core 17 is equal to the target temperature THO2 of the heat transfer device 81, the temperature of one (which is set arbitrarily or in advance) of the heater core 17 and the heat transfer device 81 may be controlled through the adjustment of the flow rate of refrigerant, and the temperature of the other device may be controlled through the adjustment of the flow rate of coolant.

When the target temperature THO of the heater core 17 is equal to the target temperature THO2 of the heat transfer device 81, the temperature of the device with a high thermal load, either the heater core 17 or the heat transfer device 81, may be controlled through the adjustment of the flow rate of refrigerant, and the device with a low thermal load may be controlled through the adjustment of the flow rate of coolant.

Hereinafter, the cooler core 16 or the heater core 17 is referred to as the first coolant-to-air heat exchanger, and the heat transfer devices 13 and 81 connected to the first coolant-to-air heat exchangers 16 and 17 are referred to as the first the heat transfer devices.

In this embodiment, the control device 60 adjusts the flow rate of refrigerant in such a way that the temperatures related to the temperatures TC and TH of the blast air which undergoes sensible heat exchange in the first coolant-to-air heat exchangers 16 and 17 approach the first target temperatures TCO and THO. In addition, the control device 60 adjusts the flow rate of coolant in such a way that the temperatures related to the temperatures TC2 and TH2 of the first heat transfer devices 13 and 81 approach the second target temperatures TCO2 and THO2.

Accordingly, also when the first coolant-to-air heat exchangers 16 and 17 and the first heat transfer devices 13 and 81 are disposed in the same coolant circuit, the temperatures of both the first coolant-to-air heat exchangers 16 and 17 and the first heat transfer devices 13 and 81 can be properly controlled.

For example, when the first coolant-to-air heat exchanger is the heater core 17 that heats blast air, and the first target temperature THO is higher than the second target temperature THO2, the control device 60 adjusts the flow rate of refrigerant in such a way that the temperature related to the temperature TH of the blast air which has been heated in the heater core 17 approaches the first target temperature THO. In addition, the control device 60 adjusts the flow rate of coolant in such a way that the temperature related to the temperature TH2 of the first heat transfer devices 13 and 81 approaches the second target temperature THO2.

In contrast, when the second target temperature THO2 is higher than the first target temperature THO, the control device 60 adjusts the flow rate of refrigerant in such a way that the temperature related to the temperature TH2 of the first heat transfer devices 13 and 81 approaches the second target temperature THO2. In addition, the control device 60 adjusts the flow rate of coolant in such a way that the temperature related to the temperature TH of the blast air which has been heated in the heater core 17 approaches the first target temperature THO.

Accordingly, the devices, either the heater core 17 or first heat transfer devices 13 and 81, that demands high temperature followability, can be controlled through the adjustment of the flow rate of refrigerant.

When the first coolant-to-air heat exchanger is the cooler core 17 that cools blast air, and the first target temperature TCO is lower than the second target temperature TCO2, the control device 60 adjusts the flow rate of refrigerant in such a way that the temperature related to the temperature TC of the blast air which has been cooled in the cooler core 16 approaches the first target temperature TCO. In addition, the control device 60 adjusts the flow rate of coolant in such a way that the temperature related to the temperature TC2 of the first heat transfer devices 13 and 81 approaches the second target temperature TCO2.

In contrast, when the second target temperature THO2 is lower than the first target temperature THO, the control device 60 adjusts the flow rate of refrigerant in such a way that the temperature related to the temperature TC2 of the first heat transfer devices 13 and 81 approaches the second target temperature TCO2. In addition, the control device 60 adjusts the flow rate of coolant in such a way that the temperature related to the temperature TC of the blast air which has been cooled in the coolant-to-air heat exchanger 16 approaches the first target temperature TCO.

Accordingly, the devices, either the cooler core 16 or first heat transfer devices 13 and 81, the demands high temperature followability can be controlled through the adjustment of the flow rate of refrigerant.

For example, the control device 60 adjusts the flow rate of refrigerant in such a way that the temperatures related to the temperatures TC and TH of the blast air which has undergone sensible heat exchange in the first coolant-to-air heat exchangers 16 and 17 approach the first target temperatures TCO and THO. In addition, the control device 60 adjusts the flow rate of coolant in such a way that the temperatures related to the temperatures TC2 and TH2 of the first heat transfer devices 13 and 81 approach the second target temperatures TCO2 and THO2.

In this case, the temperatures of the first coolant-to-air heat exchangers 16 and 17 can be controlled prior to controlling the temperatures of the first heat transfer devices 13 and 81.

For example, the control device 60 switches between the first control mode and the second control mode depending on whether a first deviation $\Delta T1$ and a second deviation $\Delta T2$ are positive or negative.

The first control mode is a control mode in which the flow rate of refrigerant is adjusted in such a way that the temperatures related to the temperatures TC and TH of the blast air which has undergone sensible heat exchange in the first coolant-to-air heat exchangers 16 and 17 approach the first target temperatures TCO and THO, and the flow rate of coolant is adjusted in such a way that the temperatures related to the temperatures TC2 and TH2 of the first heat transfer devices 13 and 81 approach the second target temperatures TCO2 and THO2.

The second control mode is a control mode in which the flow rate of refrigerant is adjusted in such a way that the temperatures related to the temperatures TC2 and TH2 of the first heat transfer devices 13 and 81 approach the second target temperatures TCO2 and THO2, and the flow rate of coolant is adjusted in such a way that the temperatures related to the temperatures TC and TH of the blast air which has undergone sensible heat exchange in the first coolant-to-air heat exchangers 16 and 17 approach the first target temperatures TCO and THO.

When the blast air has been cooled in the first coolant-to-air heat exchangers 16 and 17, the first deviation $\Delta T1$ is a deviation that is obtained by subtracting the first target temperature TCO from the temperature related to the temperature TC of the blast air which has undergone sensible heat exchange in the first coolant-to-air heat exchangers 16 and 17.

When the blast air has been heated in the first coolant-to-air heat exchangers 16 and 17, the first deviation $\Delta T1$ is a deviation that is obtained by subtracting the temperature related to the temperature TH of the blast air which has undergone sensible heat exchange in the first coolant-to-air heat exchangers 16 and 17 from the first target temperature THO.

When the coolant receives heat in the first heat transfer devices 13 and 81, the second deviation $\Delta T2$ is a deviation that is obtained by subtracting the second target temperature TCO2 from the temperature related to the temperature TC2 of the first heat transfer devices 13 and 81.

When the coolant radiates heat in the first heat transfer devices 13 and 81, the second deviation $\Delta T2$ is a deviation that is obtained by subtracting the temperature related to the temperature TH2 of the first heat transfer devices 13 and 81 from the second target temperature THO2.

Accordingly, the devices, either the first coolant-to-air heat exchangers 16 and 17 or the first heat transfer devices 13 and 81, that demand high temperature followability can be controlled through the adjustment of the flow rate of refrigerant.

Specifically, in a state where the positive or negative sign of the first deviation $\Delta T1$ is the same as that of the second deviation $\Delta T2$, in a state where the signs of the first deviation $\Delta T1$ and the second deviation $\Delta T2$ change from being positive to being negative, in a state where the signs of the first deviation $\Delta T1$ and the second deviation $\Delta T2$ change from being negative to being positive, or in a state where the first deviation $\Delta T1$ is positive, and the sign of the second deviation $\Delta T2$ changes from being negative to being positive, when the absolute value of the first deviation $\Delta T1$ is greater than that of the second deviation $\Delta T2$, the first control mode is executed, and when the absolute value of the second deviation $\Delta T2$ is greater than that of the first deviation $\Delta T1$, the second control mode is executed.

Specifically, when the first deviation $\Delta T1$ is positive, and the second deviation $\Delta T2$ is negative, the first control mode is executed, and when the first deviation $\Delta T1$ is negative, and the second deviation $\Delta T2$ is positive, the second control mode is executed.

Specifically, when the first deviation $\Delta T1$ is positive, and the sign of the second deviation $\Delta T2$ changes from being positive to being negative, the first control mode is executed, and when the sign of the first deviation ΔT1 changes from being positive to being negative, and the second deviation ΔT2 is positive, the second control mode is executed.

Specifically, in a state where the sign of the first deviation ΔT1 changes from being negative to being positive, the second deviation ΔT2 is positive, and the flow rate of coolant through the first coolant-to-air heat exchangers 16 and 17 is higher than or equal to a first predetermined flow rate, when the absolute value of the first deviation ΔT1 is greater than that of the second deviation ΔT2, the first control mode is executed, and when the absolute value of the second deviation ΔT2 is greater than that of the first deviation ΔT1, the second control mode is executed.

In contrast, when the sign of the first deviation ΔT1 changes from being negative to being positive, the second deviation ΔT2 is positive, and the flow rate of coolant through the first coolant-to-air heat exchangers 16 and 17 is lower than the first predetermined flow rate, the second control mode is executed.

Specifically, in a state where the sign of the first deviation ΔT1 changes from being negative to being positive, and the sign of the second deviation ΔT2 changes from being positive to being negative, or in a state where the sign of the first deviation ΔT1 changes from being negative to being positive, and the second deviation ΔT2 is negative, when the flow rate of coolant through the first coolant-to-air heat exchangers 16 and 17 is higher than or equal to a second predetermined flow rate, the first control mode is executed.

In contrast, in a state where the sign of the first deviation ΔT1 changes from being negative to being positive, and the sign of the second deviation ΔT2 changes from being positive to being negative, or in a state where the sign of the first deviation ΔT1 changes from being negative to being positive, and the second deviation ΔT2 is negative, when the flow rate of coolant through the first coolant-to-air heat exchangers 16 and 17 is lower than the second predetermined flow rate, the second control mode is executed.

Specifically, in a state where the sign of the first deviation ΔT1 changes from being positive to being negative, and the sign of the second deviation ΔT2 changes from being negative to being positive, or in a state where the sign of the first deviation ΔT1 is negative, and the sign of the second deviation ΔT2 changes from being negative to being positive, when the flow rate of coolant through the first heat transfer devices 13 and 81 is higher than or equal to a third predetermined flow rate, the second control mode is executed.

In contrast, in a state where the sign of the first deviation ΔT1 changes from being positive to being negative, and the sign of the second deviation ΔT2 changes from being negative to being positive, or in a state where the sign of the first deviation ΔT1 is negative, and the sign of the second deviation ΔT2 changes from being negative to being positive, when the flow rate of coolant through the first heat transfer devices 13 and 81 is lower than the third predetermined flow rate, the first control mode is executed.

Specifically, in a state where the first deviation ΔT1 is negative, the sign of the second deviation ΔT2 changes from being positive to being negative, and the flow rate of coolant through the first coolant-to-air heat exchangers 16 and 17 is higher than or equal to a fourth predetermined flow rate, when the absolute value of the first deviation ΔT1 is greater than that of the second deviation ΔT2, the first control mode is executed, and when the absolute value of the second deviation ΔT2 is greater than that of the first deviation ΔT1, the second control mode is executed.

In contrast, when the first deviation ΔT1 is negative, the sign of the second deviation ΔT2 changes from being positive to being negative, and the flow rate of coolant through the first coolant-to-air heat exchangers 16 and 17 is lower than the fourth predetermined flow rate, the second control mode is executed.

Specifically, in a state where the sign of the first deviation ΔT1 changes from being positive to being negative, the second deviation ΔT2 is negative, and the flow rate of coolant through the first heat transfer devices 13 and 81 is higher than or equal to a fifth predetermined flow rate, when the absolute value of the first deviation ΔT1 is greater than that of the second deviation ΔT2, the first control mode is executed, and when the absolute value of the second deviation ΔT2 is greater than that of the first deviation ΔT1, the second control mode is executed.

In contrast, when the sign of the first deviation ΔT1 changes from being positive to being negative, the second deviation ΔT2 is negative, and the flow rate of coolant through the first heat transfer devices 13 and 81 is lower than the fifth predetermined flow rate, the first control mode is executed.

For example, the control device 60 switches between the first control mode and the second control mode, depending on the amount of heat exchange or the demanded amount of heat exchange between coolant through the first coolant-to-air heat exchangers 16 and 17 and blast air, and the amount of heat transfer or the demanded amount of heat transfer between coolant and the first heat transfer devices 13 and 81.

Specifically, when the amount of heat exchange or the demanded amount of heat exchange between coolant through the first coolant-to-air heat exchangers 16 and 17 and blast air is greater than the amount of heat transfer or the demanded amount of heat transfer between coolant and the first heat transfer devices 13 and 81, or it is assumed that the amount of heat exchange or the demanded amount of heat exchange therebetween is greater than the amount of heat transfer or the demanded amount of heat transfer therebetween, the control device 60 adjusts the flow rate of refrigerant in such a way that the temperatures related to the temperatures TC and TH of the blast air which has undergone sensible heat exchange in the first coolant-to-air heat exchangers 16 and 17 approach the first target temperatures TC and THO. In addition, the control device 60 adjusts the flow rate of coolant in such a way that the temperatures related to the temperatures TC2 and TH2 of the first heat transfer devices 13 and 81 approach the second target temperatures TCO2 and THO2.

In contrast, when the amount of heat transfer or the demanded amount of heat transfer between coolant and the first heat transfer devices 13 and 81 is greater than the amount of heat exchange or the demanded amount of heat exchange between coolant through the first coolant-to-air heat exchangers 16 and 17 and blast air, or it is assumed that the amount of heat transfer or the demanded amount of heat transfer therebetween is greater than the amount of heat exchange or the demanded amount of heat exchange therebetween, the control device 60 adjusts the flow rate of refrigerant in such a way that the temperatures related to the temperatures TC2 and TH2 of the first heat transfer devices 13 and 81 approach the second target temperatures TCO2 and THO2. In addition, the control device 60 adjusts the flow rate of coolant in such a way that the temperature related to the temperature TH of blast air which has undergone sensible heat exchange in the first coolant-to-air heat exchangers 16 and 17 approaches the first target temperature THO.

Accordingly, the temperatures of the devices, either the first coolant-to-air heat exchangers 16 and 17 or the first heat transfer devices 13 and 81, the thermal load of which is high or assumed to be high, are controlled through the adjustment of the flow rate of refrigerant such that temperature followability can be improved.

(Other Embodiments)

The aforementioned embodiments can be properly combined together. For example, the aforementioned embodiments can be modified in various forms as described below.

(1) In the aforementioned embodiments, the operation of the outside blower 20 is controlled such that the volume of outside air passing through the radiator 13 is adjusted; however, the operation of a radiator shutter (not illustrated) may be controlled such that the volume of outside air passing through the radiator 13 is adjusted. The radiator shutter is an outside air passage opening and closing unit that opens and closes outside air flow passages.

(2) In this embodiments, coolant is used as a heat medium for adjusting the temperature of a temperature adjustment-target device; however, various media such as oil may be used as heat media.

A nanofluid may be used as a heat medium. The nanofluid is a fluid into which nanoparticles with a particle size in the order of nanometer are mixed. The mixture of nanoparticles into the heat medium can offer the following operational effects in addition to an operational effect of lowering the solidifying point of coolant (so-called antifreezing fluid) containing ethylene glycol.

That is, the following operational effects can be obtained: an operational effect of improving thermal conductivity in a specific temperature band; an operational effect of increasing the heat capacity of the heat medium; an operational effect of preventing the rusting of metal pipes or degradation of rubber pipes; and an operational effect of increasing the fluidity of the heat medium at a very low temperature.

These operational effects are changed in various forms due to the constituents, particle shapes, and mixing ratio of nanoparticles and additives to nanoparticles.

Since the thermal conductivity can be improved in this manner, even when a small amount of heat medium is used compared to the coolant containing ethylene glycol, an equivalent level of cooling efficiency can be obtained.

Since the heat capacity of the heat medium can be increased, the amount of stored cold energy (stored cold energy due to sensible heat) of the heat medium can be increased.

Since the amount of stored cold energy is increased, even if the compressor 22 is not operated, the cooling and heating temperature of the device can be adjusted using the stored cold energy for a certain amount of time. Accordingly, the power of the vehicle heat management system can be saved.

The aspect ratio of a nanoparticle is preferably greater than or equal to 50. The reason for this is that a sufficient thermal conductivity can be obtained. The aspect ratio is a shape index that represents the ratio of the width to the height of a nanoparticle.

The nanoparticle containing any one of Au, Ag, Cu, and C can be used. Specifically, the following can be used as constituent atoms of the nanoparticle: an Au nanoparticle, an Ag nanowire, a carbon nanotube (CNT), a graphene, a graphite core shell nanoparticle (particle with a structure such as a carbon nanotube to surround the aforementioned atom), a CNT containing Au nanoparticles, and the like.

(3) In the refrigeration cycle 21 in this embodiments, a fluorocarbon refrigerant is used as the refrigerant; however, the type of the refrigerant is not limited to the fluorocarbon refrigerant, and carbon dioxide natural refrigerants or hydrocarbon refrigerants may be used.

In this embodiments, the refrigeration cycle 21 is a subcritical refrigeration cycle in which the pressure of high-pressure side refrigerant does not exceed a critical pressure of the refrigerant; however, the refrigeration cycle may be a supercritical refrigeration cycle in which the pressure of high-pressure side refrigerant exceeds the critical pressure of the refrigerant.

(4) In this embodiments, the heat management system 10 and the vehicle air conditioning apparatus are applied to a hybrid vehicle; however, the heat management system 10 and the vehicle air conditioning apparatus may be applied to an electric vehicle or the like without an engine which obtains a vehicle-travel drive force from a traveling electric motor.

Figure 39:
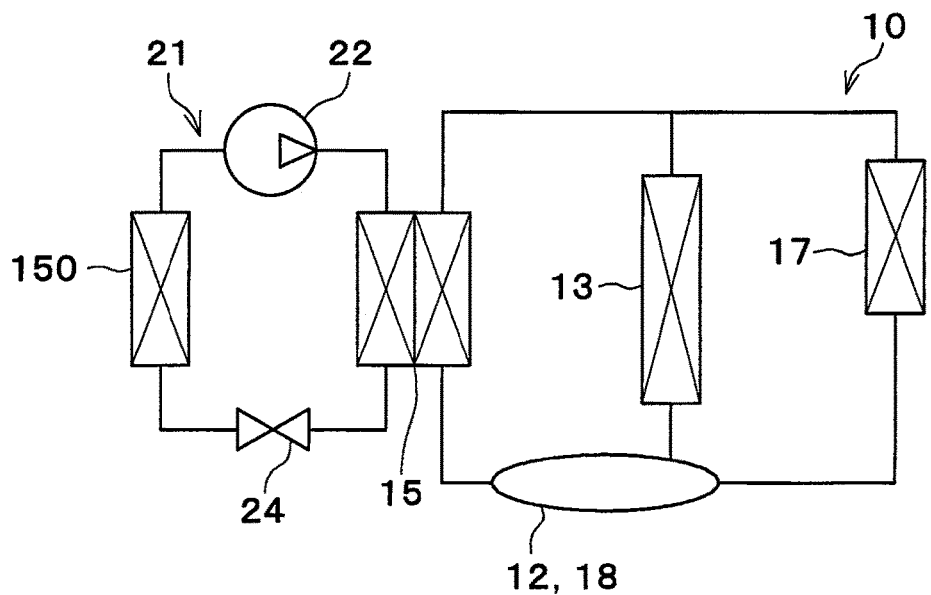
FIG. 39 is a diagram illustrating the entire configuration of the vehicle heat management system in another embodiment.

(5) As illustrated in FIG. 39, in the aforementioned embodiments, an evaporator 151 may be provided instead of the coolant cooler 14 and the cooler core 16. The evaporator 151 is an air-cooling heat exchanger that cools blast air into the vehicle interior by exchanging heat between a low-pressure side refrigerant of the refrigeration cycle 21 and the blast air into the vehicle interior.

What is claimed is:

1. A vehicle air conditioning apparatus comprising:
   a first pump and a second pump that take in and discharge a heat medium;
   an adjusting heat exchanger that adjusts a temperature of the heat medium by causing the heat medium to undergo heat exchange;
   a heat medium-to-air heat exchanger that adjusts a temperature of blast air flowing into a vehicle interior by exchanging heat between the heat medium, the temperature of which has been adjusted in the adjusting heat exchanger, and the blast air;
   a heat medium-to-outside air heat exchanger that exchanges sensible heat between the heat medium, the temperature of which has been adjusted in the adjusting heat exchanger, and outside air;
   a compressor that takes in and discharges a refrigerant;
   a condenser that condenses the refrigerant and heats the heat medium by exchanging heat between the refrigerant discharged from the compressor and the heat medium circulated by the second pump;
   a decompression unit that decompresses and expands the refrigerant flowing from the condenser;
   an evaporator that evaporates the refrigerant and cools the heat medium by exchanging heat between the refrigerant decompressed and expanded by the decompression unit and the heat medium circulated by the first pump;
   an air-cooling heat exchanger that cools the blast air by exchanging heat between the heat medium cooled in the evaporator and the blast air;
   an air-heating heat exchanger that heats the blast air by exchanging sensible heat between the heat medium heated in the condenser and the blast air;
   at least one processor coupled to a corresponding memory, the at least one processor being programmed to
      control at least one of the first pump and the second pump to adjust a flow rate of at least one of the heat medium and the outside air flowing through the heat medium-to-outside air heat exchanger such that a temperature of the blast air, which has been adjusted in the heat medium-to-air heat exchanger, is adjusted toward a first target temperature, and control the compressor to adjust the flow rate of the refrigerant discharged from the compressor such that the temperature of the blast air cooled in the air-cooling heat exchanger is adjusted toward a second target temperature; and a switching unit which switches between a state in which the heat medium cooled in the evaporator is allowed to flow to the heat medium-to-outside air heat exchanger and a state in which the heat medium heated in the condenser is allowed to flow to the heat medium-to-outside air heat exchanger;

wherein the adjusting heat exchanger includes the evaporator and the condenser, wherein the heat medium-to-air heat exchanger includes the air-cooling heat exchanger and the air-heating heat exchanger, wherein the heat medium-to-outside air heat exchanger is a heat exchanger which exchanges sensible heat between the heat medium heated in the condenser and the outside air such that the heat medium radiates heat to the outside air, wherein the at least one processor is further programmed to adjust the flow rate of at least one of the heat medium and the outside air flowing through the heat medium-to-outside air heat exchanger such that the temperature of the blast air, which has been adjusted in at least one heat exchanger of the air-cooling heat exchanger and the air-heating heat exchanger and which is blown out into the vehicle interior, is adjusted toward the first target temperature, and wherein the at least one processor is further programmed to, based on a determination that the flow rate of the heat medium or the outside air flowing through the heat medium-to-outside air heat exchanger is lower than a predetermined flow rate, and that the temperature of the blast air, which has been adjusted in at least one of the air-cooling heat exchanger and the air-heating heat exchanger and which is blown out into the vehicle interior, is lower than the second target temperature:

control the switching unit to switch to the state in which the heat medium cooled in the evaporator is allowed to flow to the heat medium-to-outside air heat exchanger, control the flow rate of at least one of the heat medium and the outside air flowing through the heat medium-to-outside air heat exchanger such that the temperature of the blast air cooled in the air-cooling heat exchanger is adjusted toward the first target temperature, and control the flow rate of the refrigerant discharged from the compressor such that the temperature of the blast air, which has been adjusted in at least one of the air-cooling heat exchanger and the air-heating heat exchanger and which is blown out into the vehicle interior, is adjusted toward the second target temperature.

2. The vehicle air conditioning apparatus according to claim 1, further comprising:

an air-volume ratio adjustment unit that adjusts an air volume ratio between a volume of blast air, which has been cooled in the air-cooling heat exchanger and passes through the air-heating heat exchanger, and a volume of blast air, which has been cooled in the air-cooling heat exchanger and does not pass through the air-heating heat exchanger, such that the temperature of the blast air, which has been adjusted in the air-cooling heat exchanger and the air-heating heat exchanger and which is blown out into the vehicle interior, approaches a third target temperature.

3. The vehicle air conditioning apparatus according to claim 1, further comprising:

an air volume control unit that controls a volume of the blast air such that the temperature of the blast air, which has been adjusted in at least one heat exchanger of the air-cooling heat exchanger and the air-heating heat exchanger and which is blown out into the vehicle interior, approaches a third target temperature.

4. The vehicle air conditioning apparatus according to claim 1, further comprising:

an inside air-to-outside air ratio adjustment unit that adjusts a ratio of inside air to outside air in the blast air such that the temperature of the blast air, which has been adjusted in at least one heat exchanger of the air-cooling heat exchanger and the air-heating heat exchanger and which is blown out into the vehicle interior, approaches a third target temperature.

5. The vehicle air conditioning apparatus according to claim 1, further comprising:

an electric heater that heats the blast air by heat generated when electric power is supplied; and an electric heater control unit that controls an amount of heat generated by the electric heater such that the temperature of the blast air, which has been adjusted in at least one heat exchanger of the air-cooling heat exchanger and the air-heating heat exchanger and which is blown out into the vehicle interior, approaches a third target temperature.

6. A vehicle air conditioning apparatus comprising:

a first pump and a second pump that take in and discharge a heat medium;

an adjusting heat exchanger that adjusts a temperature of the heat medium by causing the heat medium to undergo heat exchange;

a heat medium-to-air heat exchanger that adjusts a temperature of blast air flowing into a vehicle interior by exchanging heat between the heat medium, the temperature of which has been adjusted in the adjusting heat exchanger, and the blast air;

a heat medium-to-outside air heat exchanger that exchanges sensible heat between the heat medium, the temperature of which has been adjusted in the adjusting heat exchanger, and outside air;

a compressor that takes in and discharges a refrigerant;

a condenser that condenses the refrigerant and heats the heat medium by exchanging heat between the refrigerant discharged from the compressor and the heat medium circulated by the second pump;

a decompression unit that decompresses and expands the refrigerant flowing from the condenser;

an evaporator that evaporates the refrigerant and cools the heat medium by exchanging heat between the refrigerant decompressed and expanded by the decompression unit and the heat medium circulated by the first pump;

an air-cooling heat exchanger that cools the blast air by exchanging heat between the heat medium cooled in the evaporator and the blast air;

an air-heating heat exchanger that heats the blast air by exchanging sensible heat between the heat medium heated in the condenser and the blast air;

at least one processor coupled to a corresponding memory, the at least one processor being programmed to control at least one of the first pump and the second
pump to adjust a flow rate of at least one of the heat
medium and the outside air flowing through the heat
medium-to-outside air heat exchanger such that a
temperature of the blast air, which has been adjusted
in the heat medium-to-air heat exchanger, is adjusted
toward a first target temperature, and control the compressor to adjust the flow rate of the
refrigerant discharged from the compressor such that
the temperature of the blast air cooled in the air-
cooling heat exchanger is adjusted toward a second
target temperature; and a switching unit which switches between a state in which
the heat medium cooled in the evaporator is allowed to
flow to the heat medium-to-outside air heat exchanger
and a state in which the heat medium heated in the
condenser is allowed to flow to the heat medium-to-
outside air heat exchanger;

wherein the adjusting heat exchanger includes the evaporator and the condenser, wherein the heat medium-to-air heat exchanger includes
the air-cooling heat exchanger and the air-heating heat
exchanger, wherein the heat medium-to-outside air heat exchanger is
a heat exchanger which exchanges sensible heat
between the heat medium heated in the condenser and
the outside air such that the heat medium radiates heat
to the outside air, wherein the at least one processor is further programmed
to adjust the flow rate of at least one of the heat medium
and the outside air flowing through the heat medium-
to-outside air heat exchanger such that the temperature
of the blast air, which has been adjusted in at least one
heat exchanger of the air-cooling heat exchanger and
the air-heating heat exchanger and which is blown out
into the vehicle interior, is adjusted toward the first
target temperature, and wherein the at least one processor is further programmed
to, based on a determination that the flow rate of the
heat medium or the outside air flowing through the heat
medium-to-outside air heat exchanger is lower than a
predetermined flow rate, and that the temperature of the
blast air, which has been adjusted in at least one of the
air-cooling heat exchanger and the air-heating heat
exchanger and which is blown out into the vehicle
interior, is lower than the second target temperature:
control the switching unit to switch to the state in which
the heat medium cooled in the evaporator is allowed
to flow to the heat medium-to-outside air heat
exchanger, control the flow rate of at least one of the heat medium
and the outside air flowing through the heat medium-
to-outside air heat exchanger such that the tempera-
ture of the blast air heated in the air-heating heat
exchanger is adjusted toward the second target tem-
perature, and control the flow rate of the refrigerant discharged from
the compressor such that the temperature of the blast
air cooled in the air-cooling heat exchanger is
adjusted toward the first target temperature.

7. The vehicle air conditioning apparatus according to
claim 6, further comprising:

an air-volume ratio adjustment unit that adjusts an air
volume ratio between a volume of blast air, which has
been cooled in the air-cooling heat exchanger and
passes through the air-heating heat exchanger, and a
volume of blast air, which has been cooled in the
air-cooling heat exchanger and does not pass through
the air-heating heat exchanger, such that the tempera-
ture of the blast air, which has been adjusted in the
air-cooling heat exchanger and the air-heating heat
exchanger and which is blown out into the vehicle
interior, approaches a third target temperature.

8. The vehicle air conditioning apparatus according to
claim 6, further comprising:

an air volume control unit that controls a volume of the
blast air such that the temperature of the blast air, which
has been adjusted in at least one heat exchanger of the
air-cooling heat exchanger and the air-heating heat
exchanger and which is blown out into the vehicle
interior, approaches a third target temperature.

9. The vehicle air conditioning apparatus according to
claim 6, further comprising:

an inside air-to-outside air ratio adjustment unit that
adjusts a ratio of inside air to outside air in the blast air
such that the temperature of the blast air, which has
been adjusted in at least one heat exchanger of the
air-cooling heat exchanger and the air-heating heat
exchanger and which is blown out into the vehicle
interior, approaches a third target temperature.

10. The vehicle air conditioning apparatus according to
claim 6, further comprising:

an electric heater that heats the blast air by heat generated
when electric power is supplied; and an electric heater control unit that controls an amount of
heat generated by the electric heater such that the
temperature of the blast air, which has been adjusted in
at least one heat exchanger of the air-cooling heat
exchanger and the air-heating heat exchanger and
which is blown out into the vehicle interior, approaches
a third target temperature.

11. A vehicle air conditioning apparatus comprising:

a first pump and a second pump that take in and discharge
a heat medium;

an adjusting heat exchanger that adjusts a temperature of
the heat medium by causing the heat medium to
undergo heat exchange;

a heat medium-to-air heat exchanger that adjusts a tem-
perature of blast air flowing into a vehicle interior by
exchanging heat between the heat medium, the tem-
perature of which has been adjusted in the adjusting
heat exchanger, and the blast air;

a heat medium-to-outside air heat exchanger that
exchanges sensible heat between the heat medium, the
temperature of which has been adjusted in the adjusting
heat exchanger, and outside air;

a compressor that takes in and discharges a refrigerant;

a condenser that condenses the refrigerant and heats the
heat medium by exchanging heat between the refrig-
erant discharged from the compressor and the heat
medium circulated by the second pump;

a decompression unit that decompresses and expands the
refrigerant flowing from the condenser;

an evaporator that evaporates the refrigerant and cools the
heat medium by exchanging heat between the refrig-
erant decompressed and expanded by the decompres-
sion unit and the heat medium circulated by the first
pump;

an air-cooling heat exchanger that cools the blast air by
exchanging heat between the heat medium cooled in
the evaporator and the blast air;

an air-heating heat exchanger that heats the blast air by
exchanging sensible heat between the heat medium
heated in the condenser and the blast air;

at least one processor coupled to a corresponding memory, the at least one processor being programmed to control at least one of the first pump and the second pump to adjust a flow rate of at least one of the heat medium and the outside air flowing through the heat medium-to-outside air heat exchanger such that a temperature of the blast air, which has been adjusted in the heat medium-to-air heat exchanger, is adjusted toward a first target temperature, and control the compressor to adjust the flow rate of the refrigerant discharged from the compressor such that the temperature of the blast air cooled in the air-cooling heat exchanger is adjusted toward a second target temperature; and a switching unit which switches between a state in which the heat medium cooled in the evaporator is allowed to flow to the heat medium-to-outside air heat exchanger and a state in which the heat medium heated in the condenser is allowed to flow to the heat medium-to-outside air heat exchanger;

wherein the adjusting heat exchanger includes the evaporator and the condenser, wherein the heat medium-to-air heat exchanger includes the air-cooling heat exchanger and the air-heating heat exchanger, wherein the heat medium-to-outside air heat exchanger is a heat exchanger which exchanges sensible heat between the heat medium heated in the condenser and the outside air such that the heat medium radiates heat to the outside air, wherein the at least one processor is further programmed to adjust the flow rate of at least one of the heat medium and the outside air flowing through the heat medium-to-outside air heat exchanger such that the temperature of the blast air, which has been adjusted in at least one heat exchanger of the air-cooling heat exchanger and the air-heating heat exchanger and which is blown out into the vehicle interior, is adjusted toward the first target temperature, and wherein the at least one processor is further programmed to, based on a determination that the flow rate of the heat medium or the outside air flowing through the heat medium-to-outside air heat exchanger is lower than a predetermined flow rate, and that the temperature of the blast air, which has been adjusted in at least one of the air-cooling heat exchanger and the air-heating heat exchanger and which is blown out into the vehicle interior, is lower than the second target temperature:

control the switching unit to switch to the state in which the heat medium heated in the condenser is not allowed to flow to the heat medium-to-outside air heat exchanger.

12. The vehicle air conditioning apparatus according to claim 11, further comprising:

an air-volume ratio adjustment unit that adjusts an air volume ratio between a volume of blast air, which has been cooled in the air-cooling heat exchanger and passes through the air-heating heat exchanger, and a volume of blast air, which has been cooled in the air-cooling heat exchanger and does not pass through the air-heating heat exchanger, such that the temperature of the blast air, which has been adjusted in the air-cooling heat exchanger and the air-heating heat exchanger and which is blown out into the vehicle interior, approaches a third target temperature.

13. The vehicle air conditioning apparatus according to claim 11, further comprising:

an air volume control unit that controls a volume of the blast air such that the temperature of the blast air, which has been adjusted in at least one heat exchanger of the air-cooling heat exchanger and the air-heating heat exchanger and which is blown out into the vehicle interior, approaches a third target temperature.

14. The vehicle air conditioning apparatus according to claim 11, further comprising:

an inside air-to-outside air ratio adjustment unit that adjusts a ratio of inside air to outside air in the blast air such that the temperature of the blast air, which has been adjusted in at least one heat exchanger of the air-cooling heat exchanger and the air-heating heat exchanger and which is blown out into the vehicle interior, approaches a third target temperature.

15. The vehicle air conditioning apparatus according to claim 11, further comprising:

an electric heater that heats the blast air by heat generated when electric power is supplied; and an electric heater control unit that controls an amount of heat generated by the electric heater such that the temperature of the blast air, which has been adjusted in at least one heat exchanger of the air-cooling heat exchanger and the air-heating heat exchanger and which is blown out into the vehicle interior, approaches a third target temperature.

16. A vehicle air conditioning apparatus comprising:

a first pump and a second pump that take in and discharge a heat medium;

an adjusting heat exchanger that adjusts a temperature of the heat medium by causing the heat medium to undergo heat exchange;

a heat medium-to-air heat exchanger that adjusts a temperature of blast air flowing into a vehicle interior by exchanging heat between the heat medium, the temperature of which has been adjusted in the adjusting heat exchanger, and the blast air;

a heat medium-to-outside air heat exchanger that exchanges sensible heat between the heat medium, the temperature of which has been adjusted in the adjusting heat exchanger, and outside air;

a compressor that takes in and discharges a refrigerant;

a condenser that condenses the refrigerant and heats the heat medium by exchanging heat between the refrigerant discharged from the compressor and the heat medium circulated by the second pump;

a decompression unit that decompresses and expands the refrigerant flowing from the condenser;

an evaporator that evaporates the refrigerant and cools the heat medium by exchanging heat between the refrigerant decompressed and expanded by the decompression unit and the heat medium circulated by the first pump;

an air-cooling heat exchanger that cools the blast air by exchanging heat between the heat medium cooled in the evaporator and the blast air;

an air-heating heat exchanger that heats the blast air by exchanging sensible heat between the heat medium heated in the condenser and the blast air;

at least one processor coupled to a corresponding memory, the at least one processor being programmed to control at least one of the first pump and the second pump to adjust a flow rate of at least one of the heat medium and the outside air flowing through the heat medium-to-outside air heat exchanger such that a temperature of the blast air, which has been adjusted in the heat medium-to-air heat exchanger, is adjusted toward a first target temperature, and control the compressor to adjust the flow rate of the refrigerant discharged from the compressor such that the temperature of the blast air cooled in the air-cooling heat exchanger is adjusted toward a second target temperature; and a switching unit which switches between a state in which the heat medium cooled in the evaporator is allowed to flow to the heat medium-to-outside air heat exchanger and a state in which the heat medium heated in the condenser is allowed to flow to the heat medium-to-outside air heat exchanger;

wherein the adjusting heat exchanger includes the evaporator and the condenser, wherein the heat medium-to-air heat exchanger includes the air-cooling heat exchanger and the air-heating heat exchanger, wherein the heat medium-to-outside air heat exchanger is a heat exchanger which exchanges sensible heat between the heat medium heated in the condenser and the outside air such that the heat medium radiates heat to the outside air, wherein the at least one processor is further programmed to adjust the flow rate of at least one of the heat medium and the outside air flowing through the heat medium-to-outside air heat exchanger such that the temperature of the blast air, which has been adjusted in at least one heat exchanger of the air-cooling heat exchanger and the air-heating heat exchanger and which is blown out into the vehicle interior, is adjusted toward the first target temperature, and wherein the at least one processor is further programmed to, based on a determination that the flow rate of the heat medium or the outside air flowing through the heat medium-to-outside air heat exchanger is lower than a predetermined flow rate, and that the temperature of the blast air, which has been adjusted in at least one of the air-cooling heat exchanger and the air-heating heat exchanger and which is blown out into the vehicle interior, is lower than the second target temperature:

control the switching unit to switch to the state in which the heat medium cooled in the evaporator is allowed to flow to the heat medium-to-outside air heat exchanger, control the flow rate of the refrigerant discharged from the compressor such that the temperature of the blast air cooled in the air-cooling heat exchanger is adjusted toward the first target temperature, and control the flow rate of at least one of the heat medium and the outside air flowing through the heat medium-to-outside air heat exchanger such that the temperature of the blast air, which has been adjusted in at least one of the air-cooling heat exchanger and the air-heating heat exchanger and which is blown out into the vehicle interior, is adjusted toward the second target temperature.

17. The vehicle air conditioning apparatus according to claim 16, further comprising:

an air-volume ratio adjustment unit that adjusts an air volume ratio between a volume of blast air, which has been cooled in the air-cooling heat exchanger and passes through the air-heating heat exchanger, and a volume of blast air, which has been cooled in the air-cooling heat exchanger and does not pass through the air-heating heat exchanger, such that the temperature of the blast air, which has been adjusted in the air-cooling heat exchanger and the air-heating heat exchanger and which is blown out into the vehicle interior, approaches a third target temperature.

18. The vehicle air conditioning apparatus according to claim 16, further comprising:

an air volume control unit that controls a volume of the blast air such that the temperature of the blast air, which has been adjusted in at least one heat exchanger of the air-cooling heat exchanger and the air-heating heat exchanger and which is blown out into the vehicle interior, approaches a third target temperature.

19. The vehicle air conditioning apparatus according to claim 16, further comprising:

an inside air-to-outside air ratio adjustment unit that adjusts a ratio of inside air to outside air in the blast air such that the temperature of the blast air, which has been adjusted in at least one heat exchanger of the air-cooling heat exchanger and the air-heating heat exchanger and which is blown out into the vehicle interior, approaches a third target temperature.

20. The vehicle air conditioning apparatus according to claim 16, further comprising:

an electric heater that heats the blast air by heat generated when electric power is supplied; and an electric heater control unit that controls an amount of heat generated by the electric heater such that the temperature of the blast air, which has been adjusted in at least one heat exchanger of the air-cooling heat exchanger and the air-heating heat exchanger and which is blown out into the vehicle interior, approaches a third target temperature.

* * * * *